United States Patent
Lee et al.

(10) Patent No.: US 9,595,831 B2
(45) Date of Patent: Mar. 14, 2017

(54) NETWORK SYSTEM

(75) Inventors: Hoonbong Lee, Seoul (KR); Junho Ahn, Seoul (KR); Koonseok Lee, Seoul (KR); Yanghwan Kim, Seoul (KR); Kangwoon Cheon, Seoul (KR)

(73) Assignee: LG Electronics Inc., Seoul (KR)

( * ) Notice: Subject to any disclaimer, the term of this patent is extended or adjusted under 35 U.S.C. 154(b) by 464 days.

(21) Appl. No.: 13/824,109

(22) PCT Filed: Aug. 4, 2011

(86) PCT No.: PCT/US2011/046583
§ 371 (c)(1),
(2), (4) Date: Mar. 15, 2013

(87) PCT Pub. No.: WO2012/036799
PCT Pub. Date: Mar. 22, 2012

(65) Prior Publication Data
US 2013/0221749 A1    Aug. 29, 2013

(30) Foreign Application Priority Data

Sep. 17, 2010 (KR) .................... 10-2010-0091435
Sep. 17, 2010 (KR) .................... 10-2010-0091436
(Continued)

(51) Int. Cl.
*G05D 3/12* (2006.01)
*H02J 4/00* (2006.01)
(Continued)

(52) U.S. Cl.
CPC ................ *H02J 4/00* (2013.01); *H02J 3/008* (2013.01); *H02J 3/14* (2013.01);
(Continued)

(58) Field of Classification Search
CPC ................ H02J 3/008; H02J 3/14; H02J 4/00
(Continued)

(56) References Cited

U.S. PATENT DOCUMENTS 7,274,975 B2 * 9/2007 Miller .................... G06Q 50/06
700/295
2003/0178894 A1  9/2003 Ghent
(Continued)

FOREIGN PATENT DOCUMENTS

JP         9-84146 A    3/1997
JP     2001-29684 A    2/2001
(Continued)

*Primary Examiner* — Jared Fureman
*Assistant Examiner* — Joel Barnett
(74) *Attorney, Agent, or Firm* — Dentons US LLP

(57) ABSTRACT

A network system is provided. The network system includes: at least one component of an energy supply unit supplying energy and an energy management unit managing the energy supply unit. An amount of energy used or energy charge of the energy supply unit is adjustable. An amount of energy used or energy charge when the component is controlled on the basis of information related to at least usage charge may be less than that when the component is controlled not on the basis of the information related to at least usage charge. Also, the energy supply unit has a power saving mode to determine a driving method or a driving time of the energy supply unit on the basis of the information related to energy charge.

23 Claims, 35 Drawing Sheets

(30) Foreign Application Priority Data

| | | |
|---|---|---|
| Sep. 17, 2010 | (KR) | 10-2010-0091437 |
| Nov. 26, 2010 | (WO) | PCT/IB2010/003388 |
| Jan. 6, 2011 | (KR) | 10-2011-0001546 |
| Apr. 12, 2011 | (KR) | 10-2011-0033952 |
| Apr. 12, 2011 | (KR) | 10-2011-0033953 |

(51) Int. Cl.
  *H02J 3/00*  (2006.01)
  *H02J 3/14*  (2006.01)

(52) U.S. Cl.
  CPC ..... *H02J 2003/146* (2013.01); *Y02B 70/3225* (2013.01); *Y04S 20/222* (2013.01); *Y04S 20/224* (2013.01); *Y04S 50/10* (2013.01); *Y10T 307/50* (2015.04)

(58) Field of Classification Search
  USPC .............. 307/43; 706/15; 700/297; 715/771; 713/340; 719/318; 340/540
  See application file for complete search history.

(56) References Cited

U.S. PATENT DOCUMENTS

| | | | |
|---|---|---|---|
| 2004/0138981 | A1 | 7/2004 | Ehlers et al. |
| 2007/0043478 | A1* | 2/2007 | Ehlers et al. .................. 700/276 |
| 2008/0106146 | A1 | 5/2008 | Baek et al. |
| 2008/0167756 | A1* | 7/2008 | Golden .................. G05B 15/02 700/297 |
| 2008/0224892 | A1 | 9/2008 | Bogolea et al. |
| 2010/0088261 | A1* | 4/2010 | Montalvo ....................... 706/15 |
| 2010/0089909 | A1 | 4/2010 | Besore |
| 2010/0125364 | A1* | 5/2010 | Ebrom et al. ................. 700/275 |
| 2010/0191487 | A1 | 7/2010 | Rada et al. |
| 2011/0106328 | A1* | 5/2011 | Zhou .................... G05B 13/024 700/291 |

FOREIGN PATENT DOCUMENTS

| | | | |
|---|---|---|---|
| JP | 2004-72900 | A | 3/2004 |
| JP | 2007-523580 | A | 8/2007 |
| KR | 10-2007-0002539 | A | 1/2007 |
| KR | 10-0739201 | B1 | 7/2007 |
| KR | 20070098172 | A | 10/2007 |
| KR | 10-2009-0116848 | A | 11/2009 |
| KR | 10-0960503 | B1 | 6/2010 |
| KR | 10-0969855 | B1 | 7/2010 |
| WO | 2010/031029 | A1 | 3/2010 |

* cited by examiner

Fig. 24

| COURSE POWER SAVING MODE | WASHING POWER | WASHING WATER TEMPERATURE | RINSING COUNT |
|---|---|---|---|
| FIRST COURSE POWER SAVING MODE | STRONG | 25°C | THREE TIMES |
| SECOND COURSE POWER SAVING MODE | MEDIUM | 40°C | TWO TIMES |
| THIRD COURSE POWER SAVING MODE | WEAK | 40°C | FOUR TIMES |
| FOURTH COURSE POWER SAVING MODE | WEAK | 25°C | THREE TIMES |
| | | | Option |

Fig. 25

| SELECTED COURSE | CHARGE POWER SAVING MODE | REFERENCE CHARGE | TIME |
|---|---|---|---|
| BASIC COURSE | FIRST CHARGE POWER SAVING MODE | 1,000WON | 10:00~11:00 |
| | SECOND CHARGE POWER SAVING MODE | 1,200WON | 09:45~10:45 |
| | THIRD CHARGE POWER SAVING MODE | 1,300WON | 09:00~10:00 |
| | FOURTH CHARGE POWER SAVING MODE | 1,700WON | 08:20~09:20 |

Option

130

260

NETWORK SYSTEM

CROSS-REFERENCE TO RELATED APPLICATIONS

This Application is a 35 U.S.C. §371 National Stage Entry of International Application No. PCT/US2011/046583 filed Aug. 4, 2011 and claims the benefit of Korean Application Nos. 10-2010-0091435 filed Sep. 17, 2010; 10-2010-091436 filed Sep. 17, 2010; 10-2010-0091437 filed Sep. 17, 2010; 10-2011-0001546 filed Jan. 6, 2011; 10-2011-0033953 filed Apr. 12, 2011; 10-2011-0033952 filed Apr. 12, 2011 and PCT Application No. PCT/IB2010/003388 filed Nov. 26, 2011, all of which are incorporated by reference in their entirety herein.

TECHNICAL FIELD

The present disclosure relates to a network system.

BACKGROUND ART

A supplier simply supplies an energy source such as electricity, water, and gas and a user simply uses the supplied energy source. Therefore, effective energy management is difficult in terms of energy production, energy distribution, or energy use. Accordingly, a network system for effectively managing energy is required.

DISCLOSURE OF THE INVENTION

Technical Problem

Embodiments provide a network system for effectively managing energy.

Technical Solution

In one embodiment, a network system includes: at least one component of an energy supply unit supplying energy and an energy management unit managing the energy supply unit, wherein an amount of energy used or energy charge of the energy supply unit is adjustable; an amount of energy used or energy charge when the component is controlled on the basis of information related to at least usage charge may be less than that when the component is controlled not on the basis of the information related to at least usage charge; and the energy supply unit has a power saving mode to determine a driving method or a driving time of the energy supply unit on the basis of the information related to energy charge.

The details of one or more embodiments are set forth in the accompanying drawings and the description below. Other features will be apparent from the description and drawings, and from the claims.

Advantageous Effects

According to the present invention, since energy source is efficiently produced, used, distributed, and stored, effect energy management can be possible.

Also, since an electric product in home is driven and controlled using energy information, energy charges or power consumption can be reduced.

BRIEF DESCRIPTION OF THE DRAWINGS

FIG. 24 is a view illustrating a display unit of a course power saving mode according to a sixth embodiment.

FIG. 25 is a view illustrating a display unit of a cost saving mode according to a seventh embodiment.

BEST MODE FOR CARRYING OUT THE INVENTION

Reference will now be made in detail to the embodiments of the present disclosure, examples of which are illustrated in the accompanying drawings.

Figure 1:
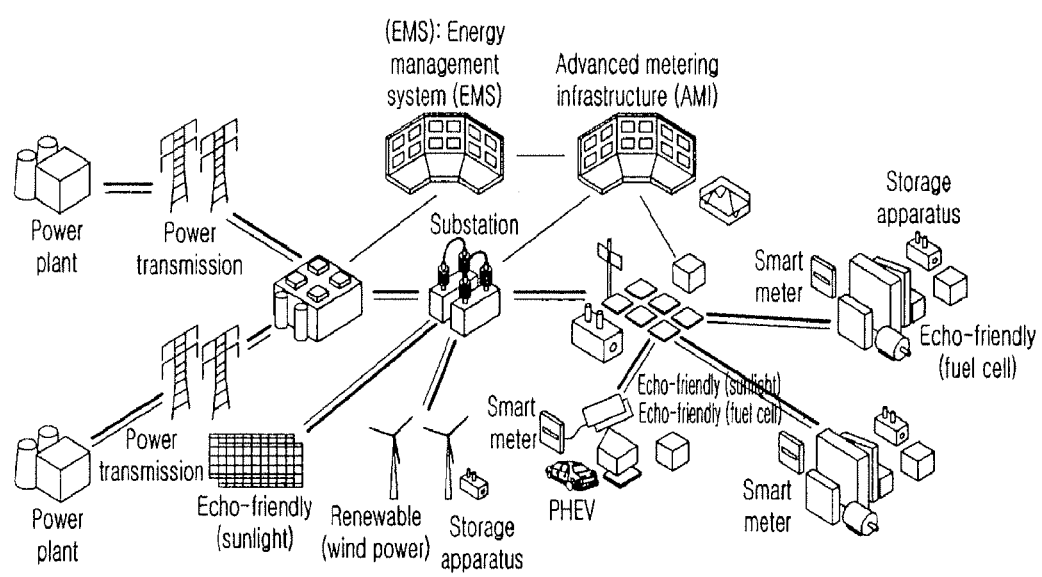
FIG. 1 is a view schematically showing an example of a network system according to the present disclosure.

FIG. 1 is a view schematically showing an example of a network system according to the present disclosure.

The network system is a system for managing an energy source such as electricity, water or gas. The energy source means one of which amount generated or used can be metered. Therefore, even a source not mentioned above may be used as the energy source. Hereinafter, electricity will be described as an example of the energy source, and details of this specification may be identically applied to other energy sources.

Referring to FIG. 1, a network system according to an embodiment includes a power plant for producing electricity. The power plant may include a power plant for producing electricity through a thermal power generation or nuclear power generation and a power plant using water power, sunlight power, wind power or the like which is eco-friendly energy.

The electricity produced in the power plant is transmitted to a sub-control center through a power transmission line, and the sub-control center transmits the electricity to a substation so that the electricity is distributed to customers such as houses or offices.

Electricity produced by the eco-friendly energy is also transmitted to the substation so as to be distributed to each of the customers. The electricity transmitted from the substation is distributed to each of the offices or houses through electricity power storage, or is directly distributed to each of the offices or houses.

In a house using a home area network (HAN), electricity may be produced by itself through sunlight, fuel cells built in a plug-in hybrid electric vehicle (PHEV), or the like. Also, the produced electricity may be stored or distributed, or surplus electricity may be resold to the outside world.

The network system may include a smart meter for detecting the amount of electricity used in each customer (house, office or the like) in real time, and an advanced metering infrastructure (AMI) for metering the amount of electricity used in a plurality of customers.

The network system may further include an energy management system (EMS) for managing energy. The EMS may generate information on operations of one or more components with respect to energy (production of energy, distribution of energy, usage of energy, storage of energy, and the like). The EMS may generate at least a command for the operations of the components.

In this specification, a function or solution performed by the EMS may be referred to as an energy management function or energy management solution.

In the network system, one or more EMSs may be provided as a separate configuration, or the EMS may be included as an energy management function or energy management solution in one or more components.

Figure 2:
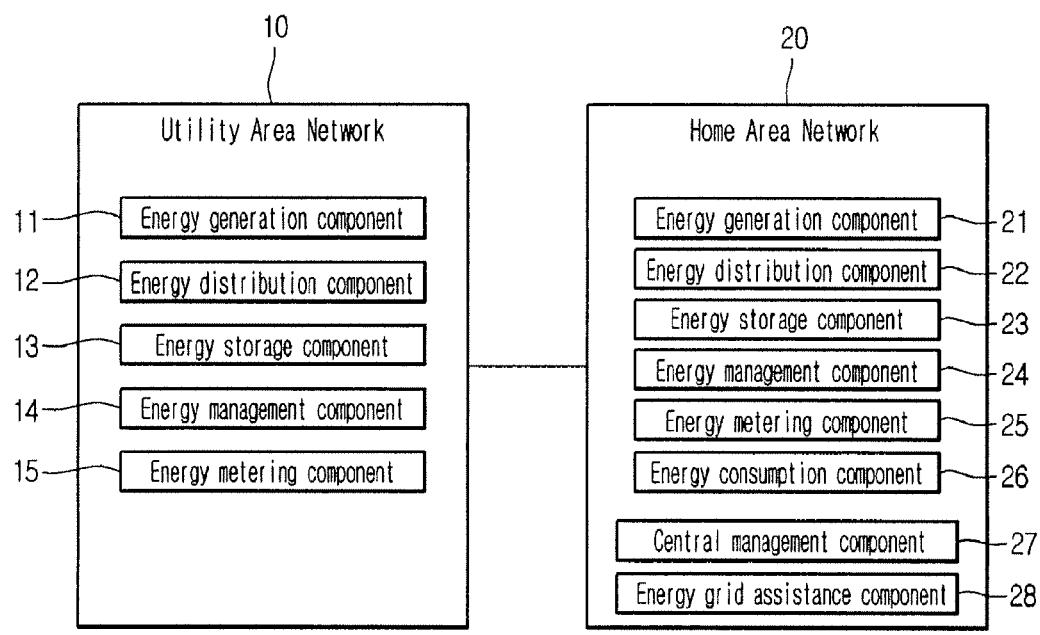
FIG. 2 is a block diagram schematically showing an example of the network system according to the present disclosure.

FIG. 2 is a block diagram schematically showing an example of the network system according to the present disclosure.

Referring to FIGS. 1 and 2, the network system according to the present disclosure is configured by a plurality of components. For example, the components of the network system are a power plant, a substation, a sub-control center, an EMS, electric home appliances, a smart meter, a storage battery, a web server, an AMI, a home server, and the like.

In the present disclosure, each of the components may be configured by a plurality of sub-components. As an example, in a case of one component is an electric home appliance, sub-components may be a microcomputer (MICOM), a heater, a display and the like. That is, all that perform a specific function may be components in the present disclosure, and such components constitute the network system of the present disclosure. Two components may communicate with each other by means of a communication unit. One network may be one component or may be configured by a plurality of components.

In this specification, the network system in which communication information is related to an energy source may be referred to as an energy grid.

A network system according to an embodiment may include a utility area network (UAN) 10 and a home area network (HAN) 20. The UAN 10 and the HAN 20 may perform wired or wireless communication by means of a communication unit, and may perform two-way communication.

In this specification, the term "home" means not only a household as a lexical meaning but also a group in which specific components such as buildings or companies gather. Also, the term "utility" means a group in which specific components outside the home gather.

The UAN 10 includes an energy generation component 11 for generating energy, an energy distribution component 12 for distributing or transmitting energy, an energy storage component 13 for storing energy, an energy management component 14 for managing energy, and an energy metering component 15 for metering information related to energy.

In a case where one or more components that constitute the UAN 10 consume energy, the components that consume the energy may be energy consumption components.

The energy consumption component is a component corresponding to the energy consumption component 26 that constitutes the HAN 20. The energy consumption component may be the same component as the energy consumption component 26 or may be another component distinguished from the energy consumption component 26.

The energy generation component 11 may be a power plant as an example. The energy distribution component 12 distributes or transmits energy generated in the energy generation component 11 and/or energy stored in the energy storage component 13 to the energy consumption component 26 that consumes the energy. The energy distribution component 12 may be a power transmitter, substation, sub-control center, or the like.

The energy storage component 13 may be a storage battery, and the energy management component 14 generates information for driving one or more of the energy generation component 11, the energy distribution component 12, the energy storage component 13 and the energy consumption component 26, related to energy. The energy management component 14 may generate at least a command for the operation of a specific component.

The energy management component 14 may be an EMS. The energy metering component 15 may meter information related to the generation of energy, the distribution of energy, the usage of energy, the storage of energy, and the like. The energy metering component 15 may be an AMI as an example. The energy management component 14 may be a separate configuration, or may be included in another component as an energy management function.

The UAN 10 may communicate with the HAN 20 by a terminal component (not shown). That is, information generated or transferred in a specific component that constitutes the UAN 10 may be transmitted to the HAN 20 through the terminal component, or information generated or transferred in another component that constitutes the HAN 20 may be received to the UAN 10 through the terminal component. The terminal component may be a gate way as an example. The terminal component may be provided to one or more of the UAN 10 and the HAN 20.

The terminal component may be a component necessary for transmitting/receiving information between the UAN and the HAN.

Two components that constitute the UAN 10 may communicate with each other by means of a communication unit.

The HAN 20 includes an energy generation component 21 for generating energy, an energy distribution component 22 for distributing energy, an energy storage component 23 for storing energy, an energy management component 24 for managing energy, an energy metering component 25 for metering information related to energy, an energy consumption component 26 for consuming energy, a central management component 27 for controlling a plurality of components, and an energy grid assistance component 28.

The energy generation component 21 may be a home power generator, and the energy storage component 23 may be a storage battery. The energy management component 24 may be an EMS. As an example, the energy generation component 21 may be a solar cell, a fuel cell, a wind power generator, a power generator using subterranean heat, a power generator using seawater, or the like.

The energy storage component 23 may perform storage using energy generated from the energy generation component 21. Therefore, in view of the use of energy, the energy storage component 23 and the energy generation component 11 may be an energy using component that uses energy together with the energy consumption component 26. That is, the energy using component may include at least an energy consumption component, an energy generation component and an energy storage component. In a case where the energy management component uses energy, it may be included in the energy using component.

In view of the supplied energy, the energy storage component 23, the energy consumption component and the energy generation component 11 may be an energy supplied component to which energy is supplied.

The energy metering component 25 may meter information related to the generation of energy, the distribution of energy, the usage of energy, the storage of energy, and the like. The energy metering component 25 may be a smart meter as an example. The energy consumption component 26 may be, as an example, an electric home appliance or a heater, motor, display or the like, which constitutes the electric home appliance. In this embodiment, there is no limitation in the kind of the energy consumption component 26.

Specifically, the energy generation component 21 may be another component of the UAN 10, which generates energy to be supplied to the HAN 20.

The energy management component 24 may be provided as a separate configuration or may be included in another component as an energy management function. As an example, the energy management function may be performed by a control component that controls the energy consumption component. In a case where the control component performs the energy management function, it may be an energy management component.

Specifically, the energy management component 14 that constitutes the UAN 10 or the energy management component 24 that constitutes the HAN 20 may be built in one or more of the plurality of components that constitute the networks 10 and 20, or may exist as a separate device. The energy management component 24 may recognize the information related to energy (energy information) and the state information of a component controlled by the energy management component 24.

The energy generation component 21, the energy distribution component 22 and the energy storage component 23 may be individual components, or may constitute a single component.

The central management component 27 may be, as an example, a home server for controlling a plurality of electric home appliances.

The energy grid assistance component 28 is a component having a primary function while performing an additional function for the energy grid. For example, the energy grid assistance component 28 may be a web service providing component (e.g., a computer or the like), mobile device, television, or the like.

The mobile device may receive energy information or additional information (described later), and control the operation of at least the energy consumption component 26 using the received information.

Two components that constitute the HAN 20 may communicate with each other by means of a communication unit.

The energy generation components 11 and 21, the energy distribution components 12 and 22, the energy storage components 13 and 23, the energy management components 14 and 24, the energy metering components 15 and 25, the energy consumption component 26 and the central management component 27 may independently exist, or two or more of them may constitute a single component.

For example, the energy management component 14 or 24, the energy metering component 15 or 25 and the central management component 27 may exist as single components so as to be configured as a smart meter, an EMS and a home server, which perform their functions, respectively. Alternatively, the energy management component 14 or 24, the energy metering component 15 or 25 and the central management component 27 may constitute a single system.

When a function is performed, it may be sequentially performed in a plurality of components and/or communication units. For example, an energy management function may be sequentially performed in the energy management component, the energy metering component and the energy consumption component.

In the network system, a plurality of UANs 10 may communicate with a single HAN 20, and a single UAN 10 may communicate with a plurality of HANs 20.

The component with a specific function, which constitutes the UAN and the HAN, may be configured as a plurality of components. For example, the energy generation component, the energy consumption component or the like may be configured as a plurality of components.

In this specification, each of the components that constitute the UAN and HAN may having a function performing component that performs its own function, or each of the components itself may be a function performing component.

As an example, in a case where the energy consumption component is an electric product, the electric product has a function performing component such as a heater, compressor, motor or display. As another example, in a case where the energy consumption component is a heater, compressor, motor, display or the like, the energy consumption component itself is a function performing component.

Figure 3:
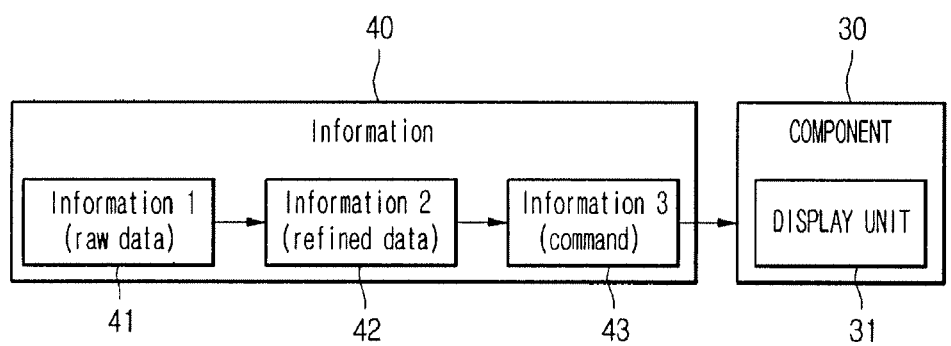
FIG. 3 is a block diagram showing an information transmission process on the network system according to the present disclosure.

FIG. 3 is a block diagram showing an information transmission process on the network system according to the present disclosure.

Referring to FIG. 3, in the network system according to the present disclosure, a specific component 30 may receive information related to energy (hereinafter, referred to as energy information 40) by means of a communication unit. The specific component 30 may further receive additional information (environment information, time information and the like) by means of the communication unit. In this instance, the information may be received from another component. That is, at least energy information is contained in the received information.

The specific component 30 may be a component that constitutes the UAN 10 or a component that constitutes the HAN 20.

As described above, the energy information 40 may be one of information related to electricity, water, gas and the like. Hereinafter, information related to electricity will be described as an example of the energy information, but information related to other energy sources may be identically applied.

For example, the kind of information related to the electricity may include time-based pricing, curtailment, grid emergency, grid reliability, energy increment, operation priority, and the like.

The information may be divided into scheduled information previously produced based on previous information, and real-time information changed in real time. The scheduled information and the real-time information may be divided by whether or not predict information after the current time (in the future).

The energy information 40 may be transmitted/received as a true or false signal such as a Boolean signal on the network system, or may be transmitted/received as a real price. Alternatively, the energy information 40 may be transmitted/received by being divided into a plurality of levels.

The energy information 40 may be divided into time of use (TOU) information, critical peak pattern (CPP) information or real time pattern (RTP) information according to the change in the pattern of data with respect to time.

According to the TOU information, a data is changed step by step depending on time. According to the CPP information, a data is changed step by step or in real time depending on time, and emphasis is displayed at a specific point of time. According to RTP information, a data is changed in real time depending on time.

In a case where the energy information is time-based pricing information as an example, the time-based pricing information is changed. The time-based pricing information may be transmitted/received as a true or false signal such as a Boolean signal on the network system, or may be transmitted/received as a real price. Alternatively, the time-based pricing information may be transmitted/received by being divided into a plurality of levels.

In a case where the specific component 30 receives a true or false signal such as a Boolean signal, one signal may be recognized as an on-peak signal, and the other signal may be recognized as an off-peak signal.

Alternatively, the specific component 30 may recognize information on at least one drive, which contains the time-based information, and may recognize an on-peak or off-peak signal by comparing the value of the recognized information with the value of reference information.

For example, in a case where the specific component 30 recognizes information divided into levels or real pricing information, it recognizes an on-peak or off-peak signals by comparing the value of the recognized information with the value of reference information.

In this case, the value of the information on drive may be at least one of time-based pricing, electric energy, the variation of time-based pricing, the variation of electric energy, the average of time-based pricing and the average of electric energy. The value of reference information may be at least one of an average, the average between maximum and minimum values of power information during a predetermined period of time and the reference variation of power information during the predetermined period of time (e.g., the slope of consumed electric energy per unit time).

The value of reference information may be determined in real time or may be previously determined. The value of reference information may be determined on the UAN or may be determined on the HAN (a customer's direct input or an input from the energy management component, the central management component or the like).

In a case where the specific component 30 (e.g., the energy consumption component) recognizes an on-peak signal (e.g., at a point of time of recognition), an output may be determined as zero (stop or maintenance of a stop state) or may be decreased. If necessary, the output may be restored or increased. The driving scheme of the specific component may be previously determined before the specific component is operated, or may be changed when the specific component recognizes an on-peak signal posterior to the start of operation.

Alternatively, in a case where the specific component 30 recognizes an on-peak signal (e.g., at a point of time of recognition), the output is maintained under an operable condition. In this case, the operable condition means that the value of the information on drive is less than a predetermined reference. The value of the information on drive may be time-based pricing, consumed electric energy, operation time, or the like. The predetermined reference may be a relative or absolute value.

The predetermined reference may be determined in real time or may be previously determined. The predetermined reference may be determined on the UAN or may be determined on the HAN (a customer's direct input or an input from the energy management component, the central management component or the like).

Alternatively, in a case where the specific component 30 recognizes high-cost information, the output of the specific component may be maintained or increased when the difference between a state information value and a reference value is within a predetermined range. For example, in a case where a compressor of a refrigerator is not operated in a low-cost section, the temperature of a cool chamber or freezing chamber is increased. Therefore, the compressor is necessarily turned on when the temperature of the cool chamber or freezing chamber approaches a reference temperature. In a case where a high-cost section comes after the compressor is turned on, the compressor maintains a current output when the difference between the temperature of the cool chamber or freezing chamber and the reference temperature is within a predetermined range. In a case where a user selects a button for cancelling power saving in the state that the specific component 30 recognizes the high-cost information, the output of the specific component may be maintained.

Alternatively, in a case where the specific component 30 recognizes an on-peak signal (e.g., at a point of time of recognition), the output may be increased. However, although the output is increased at the point of time when the specific component recognizes the on-peak signal, the total output amount of the specific component during the entire drive period may be decreased or maintained as compared with that when the specific component is operated at a normal output level. Alternatively, although the output is increased at the point of time when the specific component recognizes the on-peak signal, the total consumed power or total time-based pricing of the specific component during the entire operation period may be decreased as compared that when the specific component is operated at a normal output level.

In a case where the specific component 30 recognizes an off-peak signal (e.g., at a point of time of recognition), the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output (change in the state of cool air that is a medium for performing the function of the refrigerator). In a case where the specific component is a washing machine or washer, hot water may be stored by driving a heater earlier than the time when the heater is to be operated (storage of hot water that is an additional medium for performing the function of the washing machine or washer). Alternatively, in a case where the specific component is a refrigerator, cool air may be stored in a separate supercooling chamber by increasing an output as compared with the existing output. Alternatively, in a case where the specific component recognizes an off-peak signal (e.g., at a point of time of recognition), electricity may be stored.

The curtailment information is information related to a mode in which the specific component is stopped or a small amount of time-based pricing is taken. As an example, the curtailment information may be transmitted/received as a true or false signal such as a Boolean signal on the network system.

If the specific component 30 recognizes curtailment information, the output may be determined as zero (stop or maintenance of a stop state) or may be decreased as described above.

The grid emergency information is information related to a power failure or the like. As an example, the grid emergency information may be transmitted/received as a true or false signal such as a Boolean signal on the network system. The information related to a power failure or the like has a relation with the reliability of a component using energy.

In a case where the specific component 30 recognizes grid emergency information, it may be immediately shut down.

The grid reliability information is information related to the supply amount of electricity supplied or information related to the quality of electricity. The grid reliability information may be transmitted/received as a true or false signal such as a Boolean signal on the network system, or may be determined by a component (e.g., an electric home appliance) through the frequency of AC power supplied to the component.

That is, if a frequency lower than the frequency of AC power supplied to the component is sensed, it may be determined that the amount of electricity supplied is small (information on the deficiency of the amount of electricity supplied). If a frequency higher than the frequency of AC power supplied to the component is sensed, it may be determined that the amount of electricity supplied is large (information on the excess of the amount of electricity supplied).

In a case where the specific component recognizes shortage of the amount of electricity or poor quality of electricity in the grid reliability information, an output may be determined as zero (stop or maintenance of a stop state) or may be decreased. If necessary, the output may be restored or increased.

On the other hand, in a case where the specific component recognizes the information on the excess of the amount of electricity supplied, the output may be increased, or the operation may be converted from an off-state to an on-state.

The energy increment information is information related to a state that surplus electricity is generated because the amount of electricity used by a component is less than that of power generation. As an example, the energy increment information may be transmitted/received as a true or false signal such as a Boolean signal on the network system.

In a case where the specific component 30 recognizes energy increment information, the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case where the specific component 30 is the energy storage component 13 or 23, the energy storage component 13 or 23 may store electricity by receiving the electricity supplied from the UAN, for example, when electricity storage cost is smaller than a predetermined value.

However, in a case where the energy storage component 23 is connected to the energy generation component 21 that constitutes the HAN, it may continuously store energy generated by the energy generation component 21 until the electricity storage is completed. That is, the energy generated while the energy generation component 21 generates energy may be stored in the energy storage component 23.

The presence of completion of the electricity storage is determined while the energy storage component 13 or 23 stores electricity. In a case where the electricity storage is completed, the electricity supply for the electricity storage is cut off. Specifically, the presence of completion of the electricity storage may be determined using a sensor that senses the voltage, temperature or current of the energy storage component 13 or 23. The cutoff of the electricity supply may be performed using a switch (or circuit breaker) provided to a supply stage through which the electricity is supplied to the energy storage unit 13 or 23.

The electricity storage cost may be cost consumed in the electricity storage for a specific time period or electricity cost at a specific time.

As an example, in a case where the electricity storage cost is in an off-peak section (in a case where the specific component recognizes low-cost information which will be described later), the energy storage component 13 or 23 may store electricity. Alternatively, in a case where an on-peak section corresponds to an allowance section (in a case where the specific component recognizes high-cost information which will be described later), the energy storage component 13 or 23 may store in the on-peak section. In this instance, the allowance section is a section in which a power consumption information value is less than a predetermined reference. The power consumption information value may be a electricity cost, a power consumption amount, a time range, or the like. The predetermined reference may be a predetermined cost, a predetermined power consumption amount, a predetermined time, or the like. The predetermined reference may be a relative value or absolute value, and may be changed automatically or manually.

The energy storage component 13 or 23 may store a counter electromotive force generated when an energy consumption component that is rotatably operated or a motor provided to the energy consumption component is stopped (rotated).

Alternatively, the energy storage component 13 or 23 may store electricity using an energy consumption component that is rotatably operated or a motor provided to the energy consumption component. For example, in a case where the energy consumption component is a refrigerator, the energy storage component 13 or 23 may store electricity generated when a fan motor provided to the refrigerator is rotated (the fan motor may serve as a power generator or may be connected to the power generator). Alternatively, in a case where the energy consumption component is a washing machine, the energy storage component 13 or 23 may store electricity generated when a motor that rotates a drum for accommodating the laundry is rotated. In a case where the energy consumption component is a cooking appliance, the energy storage component 13 or 23 may store electricity generated when a motor for rotating a cooling fan is rotated. In a case where the energy consumption component is an air cleaner, the energy storage component 13 or 23 may store electricity generated when a motor for rotating a fan is rotated. That is, in this embodiment, in a case where a motor is provided regardless of the kind of the energy consumption component, the energy storage component 13 or 23 may store electricity generated when the motor is rotated. Alternatively, in a case where a power generator is connected to a fan rotated by the flow of air (natural flow or forcible flow), the energy storage component 13 or 23 may store electricity generated by the power generator.

The electricity stored in the energy component 13 or 23 may be supplied to one or more energy consumption components 26. In a case where electricity cost is higher than a reference value, the electricity stored in the energy component 13 or 23 may be supplied to the energy consumption component 26. As an example, in a case where the electricity cost is an on-peak (in a case where the specific component recognizes the high-cost information), the electricity stored in the energy storage component 13 or 23 may be supplied to the energy consumption component 26. In a case where the electricity cost is an off-peak (in a case where the specific component recognizes the low-cost information) but is close to the on-peak, the electricity stored in the energy storage component 13 or 21 may be supplied to the energy consumption component. If the electricity stored in the energy storage component 13 or 23 is less than a predetermined value, electricity generated in the energy generation component 11 is supplied to the energy consumption component. Thus, it is possible to prevent the operation of the energy consumption component from being stopped due to the cutoff of the electricity supply while the energy consumption component is operated.

In a case where the supply of electricity generated in the energy generation component 11 is cut off by interruption of electric power, the electricity stored in the energy component 13 or 23 may be supplied to the energy consumption component. In a case where the energy consumption component is an electric product, the electricity stored in the energy storage component 13 or 23 may be supplied to a communication unit or control unit provided to the electric product.

The electricity stored in the energy component 13 or 23 may be supplied to a portion of a plurality of energy consumption components. As an example, the stored electricity may be supplied to an electric product such as a refrigerator required in continuous operation among a plurality of electric products. Alternatively, the stored electricity may be supplied to an energy consumption component with relatively low power among a plurality of energy consumption components that constitute one electric product. It will be apparent that the stored electricity is supplied to an energy consumption component with high power. Alternatively, when a course using a relatively small amount of power is performed among a plurality of courses in which an electric product is performed, the stored electricity may be supplied. It will be apparent that the stored electricity may be supplied even when a course using a large amount of power is performed.

Meanwhile, in a case where electricity is generated and stored by a fan or motor as described above, the electricity stored in the energy storage component 13 or 23 may be supplied to an energy consumption unit with relatively low power. As an example, the electricity stored in the energy storage component 13 or 23 may be supplied to an LED lamp, a display, a control unit, a communication unit, a low-power heater, or the like. Alternatively, in a case where the energy consumption component performs a plurality of courses, the electricity stored in the energy storage component 13 or 23 may be supplied to the energy consumption component in a course that requires low power.

The energy storage component 23 may be built in connected to one energy consumption component. Alternatively, a plurality of energy storage components 23 may be built in or connected to a plurality of energy consumption components, respectively. Alternatively, a plurality of energy storage components 23 may be built in or connected to one energy consumption component. The plurality of energy storage components 23 may be connected to one another to share the stored electricity.

Among the information related to energy, the on-peak information, the curtailment information and information on the deficiency of the amount of electricity supplied may be recognized as high-cost information considered that energy cost is relatively expensive. In this instance, the section in which the high-cost information is recognized by the specific component may referred to as a low-cost section.

On the other hand, among the information related to energy, the off-peak information, the energy increment information and the information on the excess of the amount of electricity supplied may be recognized as low-cost information considered that energy cost is relatively cheap. In this instance, the section in which the low-cost information is recognized by the specific component may be referred to as a low-cost section.

The information related to the fluctuation of the energy cost (high-cost or low-cost information) may be recognized as information for determining a power saving driving scheme of the specific component (e.g., the energy consumption component). That is, the information related to the fluctuation of the energy cost may be recognized by dividing a time slot (time period) based on energy cost or pricing period (pricing zone) for determining a driving scheme of the specific component into at least two or more.

A high period means a high price time period (period of high cost) or a high pricing period and a low period means a low price time period (period of low cost) and a low pricing period.

As an example, in a case where the information related to energy is recognized as a Boolean signal, the time slot (time period) based on energy cost or pricing period (pricing zone) for determining a driving scheme of the specific component may be divided into two. In a case where the information related to energy is divided into a plurality of levels or recognized as real-time information, the time period or pricing period may be divided into three or more.

Meanwhile, the information related to energy cost corresponding to at least time may be recognized as information for determining a power saving driving scheme of the specific component. That is, the information related to energy cost may be recognized by dividing a time slot (time period) or pricing zone (time period) into at least two or more. As described above, the divided time period or pricing period may be determined based on the kinds of the recognized information (the Bloolean signal, the plurality of levels and the real-time information).

In other words, the information related to fluctuation of energy cost may be recognized by dividing a determination factor for driving the specific component into two or more, and functions on time and energy cost may be included in the determination factor.

In a case where the information related to energy cost is divided into two levels or more, the driving scheme of the specific component may be determined according to the information divided into levels.

On the other hand, in a case where the recognized information related to energy cost is not divided based on a specific reference (e.g., real-time cost information), it is compared with predetermined information, and the driving scheme of the specific component may be determined based on the compared result.

Here, the predetermined information may be reference information (e.g. reference value) for dividing the information related to energy cost, and the compared result may be whether not the information related to energy cost is more or less than the reference value.

Specifically, each of the kinds of information related to energy may be divided into first information 41 that is raw information, second information 42 that is refined information, and third information 43 that is information for performing the function of the specific component. That is, the first information is a raw data, the second information is a refined data, and the third information is a command for performing the function of the specific component.

The information related to energy is included a signal, and the signal is transmitted. In this instance, one or more of the first to third information may be transmitted several times while the content of the information is not converted but only the signal including the information is converted.

For example, as shown in FIG. 3, a component that receives a signal including the first information may convert only the signal and transmit a new signal including the first information to another component.

Therefore, it is described in this embodiment that the conversion of signal is a different concept from the conversion of information. In this instance, it can be readily understood that when the first information is converted into the second information, the signal including the first information is also converted into the signal including the second information.

However, the third information may be transmitted several times in the state that the content of the third information is converted or in the state that only the signal including the third information is converted while the content of the third information is identically maintained.

Specifically, in a case where the first information is raw information on time-based pricing, the second information may be refined information on the time-based pricing. The refined information on the time-based pricing is information in which the time-based pricing is divided into a plurality of levels or analysis information. The third information is a command generated based on the second information.

The specific component may generate, transmit or receive one or more of the first to third information. The first to third information are not necessarily transmitted or received in sequence. Only a plurality of pieces of third information without the first and second information may be transmitted in sequence or parallel. Alternatively, the first and third information may be transmitted or received together, the second and third information may be transmitted or received together, or the first and second information may be transmitted or received together.

As an example, in a case where the specific component receives the first information, it may transmit the second information or may transmit the second and third information.

In a case where the specific information receives only the third information, it may generate and transmit new third information.

Meanwhile, in the relation between two pieces of information, one is a message and the other is a response for the message. Thus, each of the components that constitute the network system may transmit or receive a message. In a case where each of the components receives a message, it may respond to the message. Therefore, in the case of an individual component, the transmission of a message is a relative concept with the response for the message.

The message may include a data (first or second information) and/or a command (third information).

The command (third information) may include a command for storing the data, a command for generating the data, a command for processing the data (including the generation of an additional data), a command for generating an additional command, a command for transmitting the additionally generated command, a command for transmitting a received command, and the like.

In this specification, the response for the received message means storage of the data, processing of the data (including generation of an additional data), generation of a new command, transmission of the newly generated command, simple transmission of a received command (including generation of a command for transmitting the received command to another component), operation, transmission of the stored information, transmission of an acknowledge message (acknowledge character or negative acknowledge character), or the like.

For example, in a case where the message is first information, the specific component that receives the first information may generate second information by processing the first information, or may generate the second information and new third information, as a response for the message.

The specific component that receives the message may provide a response related to energy. Here, the term "response" may be understood as a concept including an operation through which the specific component can perform a function. As an example, the HAN 20 may perform an operation related to energy by receiving a message.

The response (operation) related to energy, provided by the specific component, will be described in detail. For example, the specific component may be an energy consumption component.

The energy consumption component may be driven so that the energy cost when it is driven based on the recognition for energy information is reduced as compared with that when it is driven without the recognition for energy information.

The specific component may include a plurality of modes in which it is driven to perform its own function. The plurality of modes are a first mode and a second mode in which energy cost is relatively saved as compared with that in the first mode. The specific component may be driven in at least one of the first and second modes.

Here, the first mode may be a general mode and the second mode may be a power saving mode. Alternatively, the first and second modes may all be power saving modes.

The general mode may be understood as a mode in which the function of the specific component is performed without recognition of energy information. On the other hand, the power saving mode may be understood as a mode in which the function of the specific component is performed based on the recognition of energy information so as to save energy cost.

In a case where the first and second modes are power saving modes, the first mode may be specified as a driving scheme for saving energy cost and the second mode may be specified as a driving scheme in which the energy cost in the second mode is more saved than that in the first mode.

Meanwhile, in a case where the specific component (e.g., the energy consumption component) is driven, at least a portion is recognized in a driving scheme including at least drive time and course. In this case, an unrecognized portion may be generated so as to save energy cost, and a recognized portion may be converted into another scheme.

For example, at least a portion of the driving scheme may be recognized under the control of the energy management component, the control of the energy consumption component, or the like. In a case where a specific driving scheme is further required so as to save energy cost, an unrecognized portion of the driving scheme may be newly generated, and a recognized portion may be converted into another scheme so as to save energy.

It will be apparent that the process of generating the unrecognized portion may be omitted. In this case, the process of converting the recognized portion into another scheme. On the other hand, the process of converting the recognized portion into another scheme may be omitted. In this case, the process of newly generating the unrecognized portion may be performed.

The drive time may include a drive start time or drive end time. The course may include a drive period of the specific component and the power of the specific component.

The generated scheme or converted scheme may be a scheme recommended by the specific component so as to save energy cost. Here, the specific component may be an energy consumption component (control component) or the energy management component.

As an example, in a case where the recognized scheme is a specific drive time, the specific drive time may be converted into another time so as to save energy cost, and a specific course may be generated.

On the other hand, in a case where the recognized scheme is a specific course, the specific course may be converted into another course so as to save energy cost, and a specific time may be generated.

Under the control described above, a change in time or power may be made with respect to the output function of the specific component based on time.

The generated scheme or converted scheme may be performed within a set range. That is, in the process of recognizing at least a portion of the driving scheme, the generation or conversion of the driving scheme may be performed within a predetermined reference in which the recognized portion appears (e.g., restriction set by a user, constraint set under the control of the energy management component or energy consumption component, or the like).

Therefore, in a case where the set range is out of the predetermined reference, it is restricted to generate the unrecognized portion or to convert the recognized portion into another scheme.

Another embodiment is proposed.

Cost information may further included in the recognized driving scheme. That is, in a case where the cost information is recognized, a portion related to the drive time or course may be generated. The generated driving scheme may be recommended.

Meanwhile, a response of the specific component based on the information related to the fluctuation of the energy cost (high-cost or low-cost information), e.g., a power control for power saving driving, may be performed. An output decrease (including an output of zero) or output increase may be included in the output control.

It is as described above that the output is decreased or zero, maintained or increased based on the recognition for the information (on-peak or off-peak) related to energy cost.

If high-cost information is recognized, the output may be zero or decreased. Specifically, the output in the recognition of the high-cost information may be decreased as compared with that in the recognition of low-cost information. As described above, the decrease of the output may be previously determined before the specific component is operated, or may be changed when the high-cost information is recognized posterior to the start of the operation of the specific component.

In a case where the output of the specific component is zero or decreased, the function to be performed by the specific component may be lost as compared with a normal case. Therefore, a response for restoring the lost function may be performed.

As an example, after the output of the specific component is decreased, the specific component may be controlled so that the total operation time of the specific component is increased or so that the output is increased in at least a time period.

In other words, if specific reference information related to energy information is recognized in a period after the output of the specific component is controlled, the response for controlling the output may be released. Here, the term "period" may be divided based on a point of time when the high-cost information is recognized.

The total operation time may be understood as a time approaching a specific target in the process of performing the function of the specific component. As an example, in a case where the specific component is an electric appliance (washing machine, drying machine, cooking appliance or the like) intermittently driven (or driven in a specific course), the total operation time may be understood as a time until a corresponding course is completed.

On the other hand, in a case where the specific component is an electric appliance (refrigerator, water purifier, or the like) driven at normal times, the total operation time may be understood as a time approaching a target set for performing the function of the specific component. For example, the set target may be a target temperature, a target amount of ice produced, or a target amount of clean water in the refrigerator.

The total operation time may be increased as compared with the operation time set before the output of the specific component is decreased. In a case where the output of the specific component is not decreased, the total operation time may be increased as compared with the operation time of the specific component. However, although the total operation time of the specific component is increased, the specific component is controlled so that the total energy cost generated through the drive of the specific component can be saved as compared with that when the output of the specific component is not decreased.

If the high-cost information is recognized, the output of the specific component may be increased.

However, although the output is increased at a point of time when the high-cost information is recognized, the total output of the specific component during the entire driving period may be decreased or maintained as compared with that when the specific component is operated under a normal output. Alternatively, although the output is increased at a point of time when the high-cost information is recognized, the total power consumption or total time-based pricing of the specific component during the entire driving period may be decreased as compared with that when the specific component is operated under the normal output.

If the low-cost information is recognized, the output of the specific component may be increased. For example, in a case where the operation reservation of the specific component is set up, the driving of the specific component may be started before the setup time, or a component having a large output in a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case of a specific condition (additional condition) is generated based on the information related to the fluctuation of the energy cost (high-cost or low-cost information), the response of the specific component, e.g., the output control for power saving driving, may be limited. That is, the output of the specific component may be maintained.

Here, the term "limitation" may be understood as the release of the output control performed or not performed.

The specific condition includes a case where influence on energy cost is minute even though the output control of the specific component is not performed or a case where it is necessary to prevent a function to be performed by the specific component from being degraded when the output of the specific component is controlled.

Whether or not the influence on the energy cost is minute may be determined based on a predetermined reference (time-based pricing, power consumption or information on operation time). The predetermined reference may be a relative or absolute value.

The case where the function to be performed by the specific component is degraded may be considered as a case where the specific component is a defrosting heater, for example.

In a case where it is controlled to decrease the output in a high-cost time period and to increase the output in the low-cost time period, the driving of the defrosting heater is more frequently performed than that during a normal time (setup period). In this case, the temperature of a storage room in the refrigerator is increased, and thus, the control of the output can be limited.

Meanwhile, the specific component 30 may include a display unit 31 for displaying information. In this embodiment, the term "information display" means that visual, auditory, olfactory and tactile information is known to the outside. The display unit 31 may include a touch screen for selecting or inputting information. Alternatively, the specific component 30 may include a separate input unit for inputting information by cable or radio.

All the information (energy information or additional information except the energy information) described above may be displayed in the display unit 31. One of the energy information and additional information may be displayed, or two or more pieces of information may be simultaneously displayed. That is, two or more pieces of information may be simultaneously displayed in the display unit 31. As an example, in a case where two or more pieces of information are simultaneously displayed, any one of the information is selected. Then, the selected screen may be enlarged, and the unselected screen may reduced. As another example, if any one of the two or more pieces of information is selected, the selected screen may be enlarged, and the unselected screen may disappear. In a case where specific information is selected and the selected screen is enlarged, information more specific that the previous information or information different from the previous information may be displayed on the enlarged screen. For example, in a case where the selected information is a character, graphic information may be displayed on the enlarged screen, or two or more pieces of information may be sequentially displayed on the enlarged screen. In a case where two or more pieces of information are displayed in the display unit 31, two or more relative positions may be varied.

Information except energy cost information and energy cost may be displayed in the display unit 31. The energy cost information may include current cost, past cost or estimated cost in the future. The energy cost information may include not only information on cost information in a specific period or time but also information on cost used with respect to the operation of a component, cost used in the present, cost to be used (estimation cost), or the like.

The information except the energy cost information may include information on energy reduction, emergency situation, grid safety, power generation quantity, operation priority, energy consumption, energy supply amount, information (e.g., cost change rate, average cost, level or the like)

newly generated based on two or more pieces of information (one or more pieces of energy cost information and/or information except the one or more pieces of energy cost information), and the like. In this instance, the energy consumption may be energy consumption used two or more HANs, and may be simultaneously or selectively displayed.

The information on energy consumption may include information on past consumption, current consumption and estimated consumption in the future. The information on energy consumption may include information on accumulated consumption for a specific period (time), average consumption, increasing rate of consumption, decreasing rate of consumption, maximum consumption, minimum consumption, and the like.

The additional information may include one or more of environment information, time information, information related to the one or more components, information related to another component and information related to a user using the one or more components. The environment information may include one or more of information related to carbon dioxide emission rate, concentration of carbon dioxide in air, temperature, humidity, precipitation, presence of rainfall, amount of solar radiation, amount of wind.

In addition to the information described above, information refined based on at least one information or newly generated information may also be displayed in the display unit 31.

In a case where the specific component 30 is the energy storage component 13 or 23, the presence of use of the stored electricity, the remaining amount of the store electricity and the like may be displayed. If the remaining amount of the stored electricity is less than a predetermined value, alarm information may be displayed.

The information displayed in the display unit 31 may include one or more of information on number, character, sentence, figure, shape, symbol, image and light. The information displayed in the display unit 31 may include one or more of information on graph for each time or period, level, table. One or more of the shape, color, brightness, size, position, alarm period, alarm time of the information displayed in the display unit 31 may be varied.

A currently operable function (or menu) may be displayed in the display unit 31. Alternatively, among a plurality of functions, operable and inoperable function may be divided by size, color, position and the like, and then displayed in the display unit 31. Alternatively, in a case where separate input units are provided, only an input units for selecting an operable function may be activated, or an input unit for selecting an operable function and an input unit for selecting an inoperable function may be displayed in different colors.

The target or display method of information displayed in the display unit 31 may be set and changed by a user, or may be changed automatically.

In a case where a condition for informing the user of information is satisfied, specific information may be displayed in the display unit 31. It will be apparent that a portion of a plurality pieces of information may be continuously displayed in the state that a component is turned on. The display time of the information may be changed or set automatically or manually.

If specific information (one or more pieces of information) is selected using the input unit, the selected information may be displayed. If a user contacts a portion of a component, e.g., an input unit, a handle, a display or the like, regardless of information display selection, or operates one or more buttons or knobs that constitute the input unit, a portion of the information may be displayed. In this instance, the information to be displayed may be set or changed. It will be apparent that a sensing unit for sensing a user's contact may be provided to the component. Alternatively, the specific information may be displayed by installation environment or variation of outdoor environment. Alternatively, the specific information may be displayed when the specific component receives new information. Alternatively, the specific information may be displayed when the kind or state of the specific component is changed. As an example, if a light emitting unit is turned off in an off-peak section and an on-peak section comes, the light emitting unit may be turned on. Alternatively, the specific information may be automatically displayed when the operation or state of the component is changed. As an example, in a case where the mode of the component is changed, information related to the changed mode may be automatically displayed.

Meanwhile, the display unit 31 may be separably connected or fixed to the component 30. In a case where the display unit 31 is separable from the component 30, it may perform wired or wireless communication with the component 30 (or control unit of the component). In a case where the display unit 31 is fixed to the component 30, it may also perform wired or wireless communication with the component 30.

In a case where the display unit 31 is separable from the component 30, a communication unit and an input unit for inputting or selecting information may be provided to the display unit 31. Thus, information can be inputted or selected through the input unit in the state that the display unit 31 is separated from the component 30. The communication unit may be provided to the component 30, and only the display unit 31 may be separated from the component 30. The display unit 31 may be the energy management component 24, the energy metering component 25 or the central management component 27, or may be a separate control apparatus.

In a case where the display unit 31 is provided with a communication unit, a communication unit may also provided to the component 30. In a case where the display unit 31 and the component 30 are in the state that they are communicated with each other and information is transmitted/receive through a communication signal, the display unit 31 may be used. That is, in a case where the intensity of a signal is secured so that information can be included in the communication signal, the display unit 31 may be in an available state. On the other hand, in a case where the display unit 31 is not communicated with the component 30 or information is not included in the communication signal due to the weak intensity of the signal, the display unit may be in an unavailable state. One of the display unit 31 and the component 30 transmits a communication signal, and the other of the display unit 31 and the component 30 transmits a response signal. The presence of use of the display unit 31 may be determined by the presence of reception of the communication and response signals and the signal intensity. That is, in a case where any one of the display unit 31 and the component 30 does not receive a signal or the intensity of received signal is less than a reference intensity, it may be determined that the display unit 31 is unavailable. Any one of the display unit 31 and the component 30 may increase the intensity of a transmission signal until it receives a response signal of which intensity is more than the reference intensity.

Information for informing the user of the presence of use of the display unit 31 may be displayed in the display unit 31 or the component 30. If it is recognized that the display unit 31 is unavailable, the component 30 may be controlled to increase its unique performance, to perform a door locking function or to limit its operation. Alternatively, the power of the component may be off while maintaining the power of a communication apparatus (modem) required to perform communication in the network system. Alternatively, the power of the component may be off while maintaining only a memory function for storing the state information of the component.

Meanwhile, sensors may be provided to the respective display unit 31 and component 30 so as to sense the presence of mounting of the display unit 31. As an example, the presence of mounting of the display unit 31 may be determined when the component 30 is operated. Each of the sensors may be a vibration sensor for sensing vibration. If the display unit 31 is mounted on the component 30, vibration generated in the operation of the component 30 can be transferred to the display unit 31. Therefore, in a case where the difference between the values of vibrations respectively sensed by the sensors is less than a predetermined value, it may be recognized that the display unit 31 is mounted on the component 30. If it is recognized that the display unit 31 is mounted on the component 30, the operation of the component 30 may be controlled so that vibration or noise generated in the operation of the component 30 is decreased. As an example, in a case where the component 30 is a washing machine or drier, the rotation speed of a motor may be decreased. In a case where the component 30 is a refrigerator, the driving period of a compressor may be decreased. On the contrary, if it is recognized that the display unit 31 is separated from the component 30, the component may be controlled to increase its unique performance, to perform a door locking function or to limit its operation.

As another example, each of the sensor may be a temperature sensor. In a case where the difference between the values of temperatures respectively sensed by the sensors is less than a predetermined value, it may be recognized that the display unit 31 is mounted on the component 30.

In the state that the display unit 31 is separated from the component 30, an auxiliary display unit may be provided to the component 30 so as to enable the operation of the component 30. The presence of operation of the auxiliary display unit may be determined based on the presence of use of the display unit 31. As an example, if the display unit 31 is separated from the component 30 or is unavailable, the auxiliary display unit may be turned on.

Figure 4:
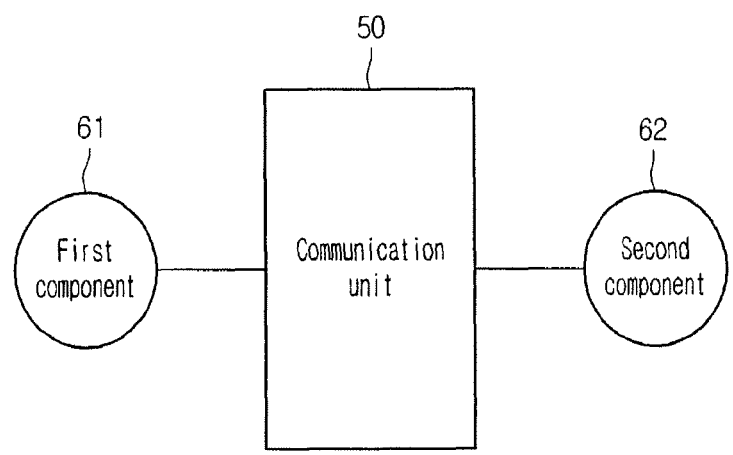
FIG. 4 is a view showing the communication structure of two components that constitute the network system according to a first embodiment.
Figure 5:
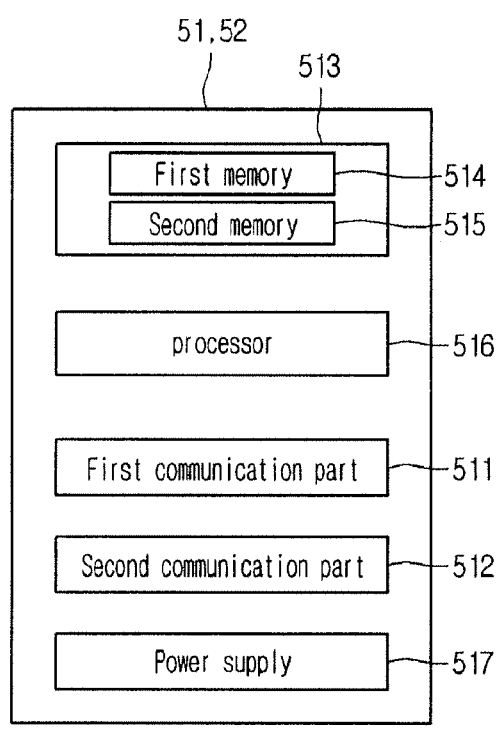
FIG. 5 is a block diagram showing the detailed configuration of a communication device that constitutes a communication unit.

FIG. 4 is a view showing the communication structure of two components that constitute the network system according to a first embodiment. FIG. 5 is a block diagram showing the detailed configuration of a communication device that constitutes a communication unit.

Referring to FIGS. 2, 4 and 5, first and second component 61 and 62 that constitute the network system may perform wired or wireless communication by means of a communication unit 50. The first and second components 61 and 62 may perform unidirectional or bidirectional communication.

In a case where the two components 61 and 62 perform wired communication, the communication unit 50 may be a simple communication line or power line communication means. It will be apparent that the power line communication means may include communicators (e.g., a modem or the like) respectively connected to the two components.

In a case where the two components 61 and 62 perform wireless communication, the communication unit 50 may include a first communicator 51 connected to the first component 61 and a second communicator 52 connected to the second component 62. In this case, the first and second communicators 51 and 52 perform wireless communication with each other.

As an example, if any one of the first and second communicators is powered on, one of the two communicators may transmit a network participation request signal, and the other of the two communicators may transmit a permission signal. As another example, if any one of the first and second communicators is powered on, the powered-on communicator may transmit a network participation request signal to a communicator previously participated in the network, and the communicator that receives the request signal may transmit a permission signal to the powered-on communicator.

In a case where a communicator that recognizes energy information determines that an error occurs in the received information in the state that a specific component participates in the network, the information is re-requested. For example, in a case where the first communicator receives energy information from the second communicator but an error occurs in the received information, the first communicator may request the second communicator to re-transmit the energy information. If the first communicator does not receive normal information for a predetermined time or number of times, it is determined that the first communicator has an error. In this case, information for informing a user of the error may be displayed in the first communicator or the first component 61.

The first component 61 may be a component that constitutes the UAN 10 or a component that constitutes the HAN 20.

The second component 62 may be a component that constitutes the UAN 10 or a component that constitutes the HAN 20.

The first and second components 61 and 62 may be the same kind of component or different kinds of components.

Components may be joined in the UAN 10 or the HAN 20.

Specifically, addresses may be assigned to a plurality of components, e.g., first and second components, respectively. Here, the addresses are necessary for performing communication between the components and can be mapped to at least a group.

The address may be understood as values respectively converted from the unique code of the first or second component. That is, at least a portion of the components that constitute the network system may have an unchangeable/unique code, and the code may be converted into an address for building a network.

In other words, product codes for at least some of the plurality of components capable of constituting first and second networks may be converted into different network codes based on the constituted networks.

As an example, the product code may be a unique code determined in production of electric appliances or a code separately provided for the registration of a network. The product code may be converted into an identity (ID) for identifying a network to which the electric appliance is to be registered.

The first and second networks may be networks that constitute the UAN 10 or networks that constitute the HAN 20. On the other hand, the first and second networks may be the UAN 10 and the HAN 20, respectively. Alternatively, the first and second networks may be the HAN 20 and the UAN 10, respectively.

A first component and a second component for allowing the first component to participate in the network may be included in the plurality of components that constitute the network. For example, the first component may be an electric appliance and the second component may be a server.

Any one of the first and second components transmits a request signal for participating in the network, and the other of the first and second components may transmit a permission signal.

That is, a signal may be transmitted/received between the first and second components, and whether or not to participate in the network may be determined based on the transmission time or number of the signal.

As an example, the first component transmits a test signal to the second component, and it is determined whether or not a response signal from the second component is transmitted to the first component. In a case where the response signal is not transmitted, the first component re-transmits the test signal, and it is re-determined whether or not a response signal from the second component is transmitted to the first component. By repeating such a process, if the transmission number of the test signal exceeds the setting number of the test signal, it may be determined that the second component does not participate in the network.

Meanwhile, the first component may transmit the test signal to the second component. If a response signal from the second component is not transmitted within a setup time, it may be determined that the second component does not participate in the network.

The first and second communicators 51 and 52 may have the same structure. Hereinafter, the first and second communicators 51 and 52 will be referred to as a communicator 51 and 52.

The communicator 51 and 52 may include a first communication part 511 for communication with the first component 61, a second communication part 512 for communication with the second component 62, a memory 513 for storing information received from the first component 61 and information received from the second component 62, a processor 516 for performing information processing, and a power supply 517 for supplying power to the communicator 51 and 52.

Specifically, the communication language (or scheme) of the first communication part 511 may be identical to or different from that of the second communication part 512.

Two kinds of information respectively received from the two components may be stored in the memory 513. The two kinds of information may be stored in a single sector or may be respectively stored in sectors. In any case, an area in which the information received from the first component 61 may be referred to as a first memory 514, and an area in which the information received from the second component 62 may be referred to as a second memory 515.

The processor 516 may generate first information or generate second and third information based on information received from the component or another communicator.

As an example, in a case where the communicator 51 and 52 receives the first information, it may generate information or sequentially generate the information and the second information by processing a data. Alternatively, in a case where the communicator 51 and 52 receives the first information, it may generate the second and third information by processing a data. In a case where the communicator 51 and 52 receives the third information, it may new third information.

For example, in a case where the second component is an energy consumption component (electric home appliance, component that constitutes the electric home appliance, or the like), the second communicator may generate a command for reducing energy consumption. In a case where the second component is an energy generation component, energy distribution component or energy storage component, the second communicator 52 may generate a command for energy generation time, generation amount, energy distribution time, distribution amount, energy storage time, storage amount or the like. In this case, the second communicator 52 serves as an energy management component.

The power supply 517 may receive electricity supplied from the components 61 and 62 or may receive electricity supplied from a separate power source. Alternatively, the power supply 517 may be a battery or the like.

Figure 6:
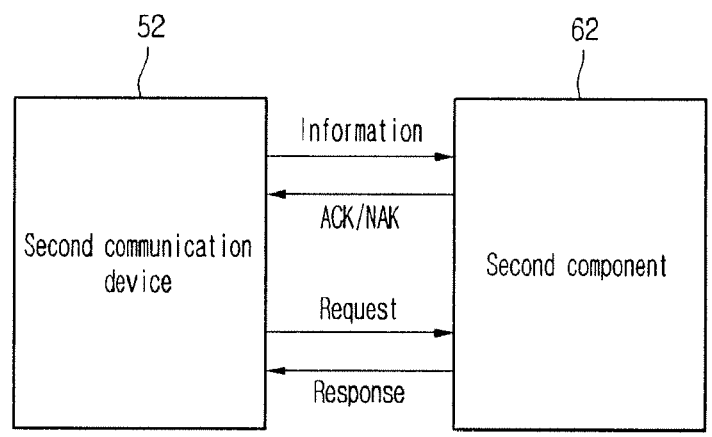
FIG. 6 is a view showing a communication performing process between a specific component and a communication device according to the first embodiment.

FIG. 6 is a view showing a communication performing process between a specific component and a communication device according to the first embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 6, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

The information received from the first communicator 51 is stored in the memory 513. The second communicator 52 transmits a message to the second component 62 as a response for the message. In this instance, the message transmitted to the second component 62 relates to new information different from the information previously stored in the memory 513, or information generated in the processor 516.

Then, the second component 62 transmits an acknowledge character (ack) or negative acknowledge character (Nak) to the second communicator 52 as a response for the message. The second component 62 performs a function (generation of a command, operation, or the like) based on the received information, or waits for performing the function.

Meanwhile, the second communicator 52 requests component information to the second component 62 in real time or by periods. As an example, the component information may be component state information or information on a component unique code, a manufacturer, a service name code, an electricity use amount, and the like. Then, the second component 62 transmits component information to the second communicator 52 as a response for the request. The component information is stored in the memory 513 of the second communicator 52.

If the second communicator 52 receives a message for requesting the component information from the first communicator 51, it transmits the component information stored in the memory 513 to the first communicator 51 as a response for the message. Alternatively, the second communicator 52 transmits the component information stored in the memory 513 to the first communicator 51 in real time or by periods.

The second communicator 52 may transmit the information of the first component, stored in the memory, to the first component together with the information received from the first component. Alternatively, the second communicator 52 may transmit the information of the first component, stored in the memory, to the first component, separately from transmitting the information received from the first component.

The second communicator 52 stores the information of the second component 62 in the memory 513. Hence, in a case where the second communicator 52 receives a message for requesting the component information from the first communicator 51, it transmits the component information stored in the memory 513 directly to the first communicator 51 without a request for information to the second component 62, and thus, the communication load of the second component 62 can be reduced. That is, the second component becomes a virtual component.

Figure 7:
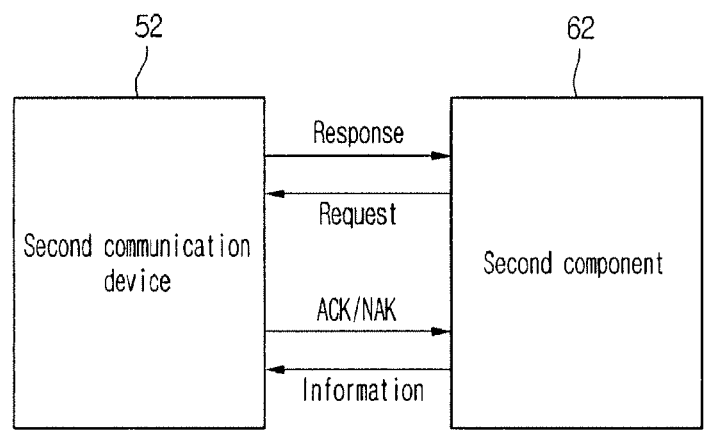
FIG. 7 is a view showing a communication performing process between a specific component and a communication device according to a second embodiment.

FIG. 7 is a view showing a communication performing process between a specific component and a communication device according to a second embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 7, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

If the second communicator 52 receives a message for requesting information from the second component 62, it transmits a message to the second component 62 as a response for the message for requesting the information. In this instance, the message transmitted to the second component 62 relates to new information different from the information previously stored in the memory 513, or information generated in the processor 516. Alternatively, the information transmitted to the second component 62 may be information received from the first component.

The second component 62 performs a function based on the received information or waits for performing the function.

Meanwhile, the second component 62 transmits component information to the second component 62 in real time or by periods. As an example, the component information may be component state information or information on a component unique code, a manufacturer, a service name code, an electricity use amount, and the like.

As described above, the electric use amount may be detected by the smart meter. In a case where the electricity use amount is included in the information of the second component 62, the correction of an actual electricity use amount may be performed by comparing the information of the second component 62 with the information of the smart meter.

Then, the second communicator 52 stores the information of the second component 62 in the memory 513, and transmits an acknowledge character (ack) or negative acknowledge character (Nak) to the second component 62 as a response for the message.

If the second communicator 52 receives a message for requesting component information from the first communicator 51, it transmits the information of the second component 62, stored in the memory 513, to the first communicator 51 as a response for the message. Alternatively, the second communicator 52 the information of the second component 62, stored in the memory 513, to the first communicator 51 in real time or by periods.

The second communicator 52 stores the information of the second component 62 in the memory 513. Hence, in a case where the second communicator 52 receives the message for requesting the component information from the first communicator 51, it transmits the information stored in the memory 513 directly to the first communicator 51 without transmitting a request for information to the second component 62, and thus, the communication load of the second component 62 can be reduced. That is, the second communicator 52 becomes a virtual component.

<Applications>

In the following descriptions, the first and second components may be reversed to each other, and therefore, overlapping descriptions will be omitted. For example, in a case where the first component is an electric home appliance and the second component is an energy management component, description in a case where the first component is an energy management component and the second component is an electric home appliance will be omitted.

Information transmitted/received by each of the components may be all the information described above. Particularly, specific information may be transmitted/received for each of the components.

The energy generation components 11 and 21 may transmit/receive information related to energy generation amount, and the like. The energy distribution components 12 and 22 may transmit/receive information related to energy distribution amount, distribution time, and the like. The energy storage components 13 and 23 may transmit/receive information related to energy storage amount, storage time, and the like. The energy metering components 15 and 25 may transmit/receive information related to energy consumption amount, and the like. The energy management components 14 and 24 may transmit/receive information related to energy generation, distribution, storage, consumption, cost, reliability, emergency situation, and the like.

(1) Case where Second Component is One Component of HAN

The second component 62 may be an energy consumption component 26, e.g., a heater, motor, compressor, display or the like. In this case, the first component 61 may be a MICOM or energy consumption component 26 as an example. The MICOM or energy consumption component 26 may transmit a message for reducing energy consumption to another energy consumption component 26. Then, the another energy consumption component 26 may perform an operation for reducing energy, for example.

As another example, the energy consumption component 26 may be an electric home appliance. In this case, the first component 61 may be an energy storage component 23, an energy consumption component 26 (electric home appliance), an energy management component 24, an energy metering component 25, a central management component 27, a web server component 28, or a component that constitutes the UAN 10.

In this instance, an energy management function may be included or not included in the first component 61 except the energy management component 24.

In a case where an energy management function or solution is not included in the first component 61, it may be included in the communication unit or may be included in the MICOM of the second component 62. In this case, the energy management function is related to the consumption of energy.

As still another example, the second component 62 may be an energy generation component 21, an energy distribution component 22 or an energy storage component 23. In this case, the first component 61 may be an energy management component 24, a central management component 27, a web server component 28 or a component that constitutes the UAN 10.

A message may be transmitted to the second component 62. Here, the message may include energy generation time, generation amount or the like, energy distribution time, distribution amount or the like, and energy storage time, storage amount or the like.

In this instance, an energy management function may be included or not included in the first component 61 except the energy management component 24.

In a case where an energy management function or solution is not included in the first component 61, it may be included in the communication unit. In this case, the energy management function is related to the generation, distribution and storage of energy.

As still another example, the second component may be an energy metering component 25. In this case, the first component 61 may be a central management component 27, a web server component 28 or a component that constitutes the UAN 10.

An energy management function may be included or not included in the energy metering component. In a case where the energy management function is included in the energy metering component 25, the energy metering component 25 performs the same operation as the EMS.

In a case where an energy management function or solution is included in the energy metering component 25, it may be included in the communication unit or may be included in the second component 62.

As still another example, the second component 62 may be a central management component 27. In this case, the first component 61 may be a web server component 28 or a component that constitutes the UAN 10.

(2) Case where Second Component is One Component of UAN

The first component 61 may be a component that constitutes the UAN 10. In this case, the first and second components 61 and 62 may be the same kind of component or different kinds of components.

An energy management function may be included in the first component 61, the second component 62 or the communication unit.

The energy management function included in a specific component or the energy management function included in the energy management component 14 may be related to generation amount, distribution amount, storage amount, energy use amount of a component that constitutes the HAN 20.

In this specification, an example capable of constituting the network system has been described. However, any component not mentioned in this specification may be a first or second component that performs communication through the communication unit. For example, an automobile may be a second component, and the energy management component 24 may be a first component.

(3) Case where One of First and Second Components Communicates with Third Component Although the communication between two components has been described in the aforementioned examples, each of the first and second components may perform communication with one or more components (a third component to an n-th component).

In this case, the relation of the first or second component that performs communication with the third component and the like may be one of the aforementioned examples.

For example, the first component may be a component that constitutes the UAN, the second component may be an energy management component 24 that communicates with the first component, and the third component may be an energy consumption component 26 that communicates with the second component. In this instance, one or more of the three components may communicate with another component.

In this specification, the first to n-th components may be components that constitute the UAN or components that constitute the HAN. Alternatively, a portion of the components may be components that constitute the UAN, or another portion of the components may be components that constitute the HAN.

Hereinafter, third and fourth embodiments will be described. A difference between these embodiments and the aforementioned embodiments will be mainly described, and descriptions and reference numerals will be quoted to elements of these embodiments identical to those of the aforementioned embodiments.

Figure 8:
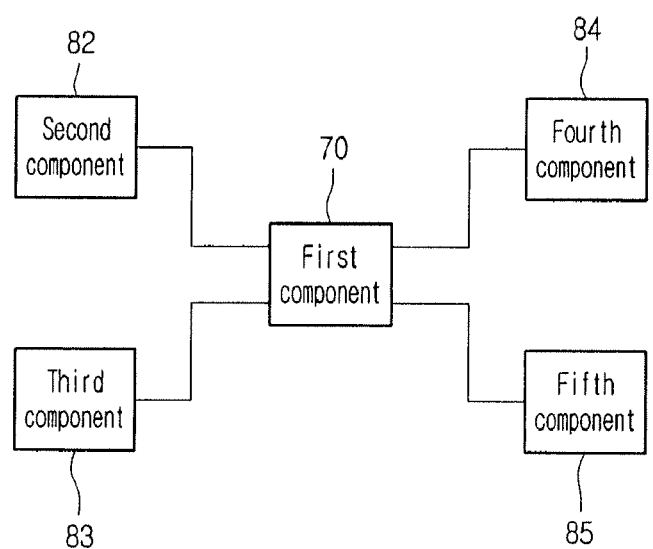
FIG. 8 is a view showing the communication structure of components that constitute the network system according to a third embodiment.
Figure 9:
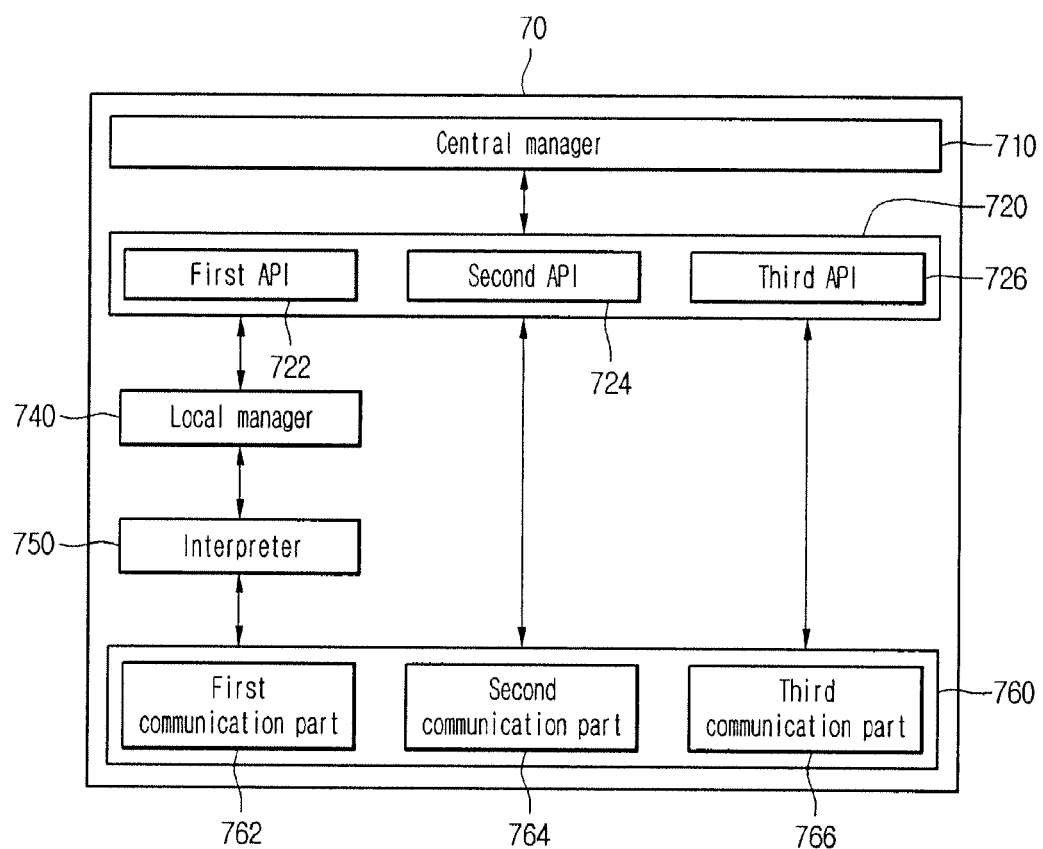
FIG. 9 is a block diagram showing the detailed configuration of a first component in FIG. 8.

FIG. 8 is a view showing the communication structure of components that constitute the network system according to a third embodiment. FIG. 9 is a block diagram showing the detailed configuration of a first component in FIG. 8.

Referring to FIGS. 8 and 9, a first component 70 may communicate with second to fifth components 82, 83, 84 and 85. Hereinafter, it will be described as an example that the first component 70 is a central management component (home server), the second and third components 82 and 83 are energy consumption components (electric home appliances), the fourth component 84 is an energy metering component (smart meter), and the fifth component 85 is a component that constitutes the UAN. The components may communicate with each other by means of a communication unit. In the network system illustrated in FIG. 8, each of the components is directly connected to the first component 70 to communicate with the first component 70. However, in a case where each of the components 82, 83, 84 and 85 is connected to new components to communicate with the new components, the network system may be extended and operated by the new components.

The second and third components 82 and 83 may be the same kind of component or different kinds of components. In this embodiment, it will be described as an example that the second and third components 82 and 83 are different kinds of energy consumption components.

The first component 70 may simply transmit information received from the fourth component 84 and/or the fifth component 85 to the second component 82 and/or the third component 83, or may process the received information and transmit the processed information.

The first component 70 may simply transmit information received from the second component 82 and/or the third component 83 to the fourth component 84 and/or the fifth component 85 (a signal may be converted), or may process the received information and transmit the processed information (the information is converted.

The first component 70 includes a communication unit 760 for performing communication with another component, a central manager 710 for managing the entire operation and/or information processing of the first component, and an application programming interface 720 (hereinafter, referred to as an ॺ PI? for performing an interface between the communication unit 760 and the central manager 710 (specifically, application software).

The communication unit 760 includes a first communication part 762 for performing communication with the second and third components 82 and 83, a second communication part 764 for performing communication with the fourth component 84, and a third communication part 766 for performing communication with the fifth component 85.

In this instance, the first and second communication parts 762 and 764 may use different communication protocols from each other. As an example, the first communication part 762 may use Zigbee and the second communication part 764 may use Wi-fi. In this embodiment, the kind of communication protocol or method used by the first and second communication parts 762 and 764 is not limited. The third communication component 766 may use Internet communication as an example.

The API 720 includes a first API 722, a second API 724 and a third API 726. The third API 726 is an interface between the central manager 710 and the third communication part 766, and the first API 722 is an interface between the first communication part 762 and the central manager 710. The second API 724 is an interface between the second communication part 762 and the central manager 710.

The first component 70 further includes a local manager 740 and an interpreter 750. In a case where the information to be transmitted/received between the API 720 and the communication unit 760 is information related to operations of energy consumption components (electric home appliances), the local manager 740 outputs information corresponding to the respective energy consumption components. The interpreter 750 interprets information transmitted from the local manager 740 to the communication unit 760 or information received in the communication unit 760. The information outputted from the interpreter 750 is used to set or get values of information related to the respective energy consumption components.

The local manager 740 includes a memory (not shown) in which information related to one or more energy consumption components is stored. Alternatively, the local manager 740 may be connected to a memory in which information related to one or more energy consumption components is stored. The information related to each of the energy consumption components may include operation information of each of the energy consumption components and information for controlling the energy consumption components. The information related to each of the energy consumption components may further include software download information for operating each of the energy consumption components and information for remote controlling/monitoring.

As an example, in a case where a plurality of energy consumption components include a washing machine, a refrigerator and a cooking appliance, information related to each of the energy consumption components is stored in the memory. The information related to each of the energy consumption components may be changed as components connected to the network system are changed.

If a signal is transmitted from the API 720 to the local manager 740, information corresponding to a specific energy consumption component is outputted. In a case where a plurality of energy consumption components exist, information on the plurality of energy consumption components is outputted. The interpreter 750 interprets the information transmitted from the local manager 740 into a machine language so as to transmit the information to the energy consumption components. The machine language may be a signal used to set or get the operation information of the energy consumption components.

The information transmission process in the first component 70 will be described.

As an example, the first component 70 may receive energy information (e.g., an energy reduction signal: first command) from the forth component 45 through the second communication part 764. The received energy information is transmitted to the central manager 710 through the second API 724. In the process of information transmission between the second API 724 and the central manager 710, only a signal including the information is converted, and the content of the information is not converted.

Since the energy information is information related to the energy consumption reduction of the energy consumption components, the central manager 710 transmits information (second command) related to operations of the energy consumption components to the API 720. As an example, the central manager 710 transmits information necessary for turning off power of the washing machine or refrigerator. Then, the information is transmitted from the first API 722 to the local manager 740.

The local manager 740 transmits information (third command) for controlling the operation of each of the energy consumption components to the interpreter 750 based on the information transmitted from the first API 722. As an example, in a case where the information transmitted from the first API 722 is information having different kinds of energy consumption components as targets, the local manager 740 transmits information related to the control of each of the energy consumption components to the interpreter 750. In this case, since the local manager 740 receives the second command and outputs the third command, the information inputted to the local manager 740 is converted and outputted by the local manager 740.

Subsequently, the interpreter 750 interprets the information transmitted from the local manager 740 into a machine language (signal). Then, the converted signal is transmitted to the target energy consumption components (second and third components) through the first communication part 762. Then, the energy consumption components (second and third components) are finally turned off so as to reduce energy.

Although it has been described above that the first component receives information through the second communication part, the first component may receive information through the third component so that the information related to the energy consumption components is outputted.

Meanwhile, the second and third components 82 and 83 may transmit their own operation information to the first component 70. Since the information transmitted from the second and third components 82 and 83 is information related to operations of the energy consumption components, the signal received in the first communication part 762 is transmitted to the central manager 710 via the interpreter 750, the local manager 760 and the first API 722. In such an information transmission process, the information related to the second and third components 82 and 83 is stored in the local manager 740. In this embodiment, since the information related to the energy consumption components is stored in the local manager, the local manager may be understood as a virtual energy consumption component (abstraction model).

The central manager 710 may transmit the received information to the second communication part 764 and/or the third communication part 766.

The operation of the first component will be described. The information received through the communication unit 760 may be transmitted directly to the API 720, or may be converted (via the interpreter and the local manager) and then transmitted to the API 720, based on the kind of information (or the type of signal).

The information transmitted from the central manager 740 may be transmitted directly to the communication unit 760, or may be converted and then transmitted to the communication unit 760.

As another example, the interpreter may be included in the local manager 740, and the information received through the communication unit 760 is transmitted to the local manager 740. However, converted information may be outputted, or information may be outputted as it is without converting the information.

Meanwhile, in a case where the information transmitted to the API 720 through the second or third communication part 764 or 766 is information (raw data or refined data) related to time-based pricing, the central manager 710 determines the presence of on-peak time. In the case of the on-peak time, the central manager 710 may transmit the information (first command) for controlling the operations of the energy consumption components to the API 720. Then, the information is converted through the local manager 740, and the converted information (second command) is transmitted to the energy consumption components through the first communication part 762. Alternatively, the central manager 710 may transmit the information related to the time-based pricing to the first communication part 762 through the second API 724 without determining the presence of on-peak time. In this case, the information may be converted or not converted. That is, in a case where the central manager directly receives first information (raw data), it may transmit the first information as it is, or convert the first information into a second information (refined data) and then transmit the second information.

Figure 10:
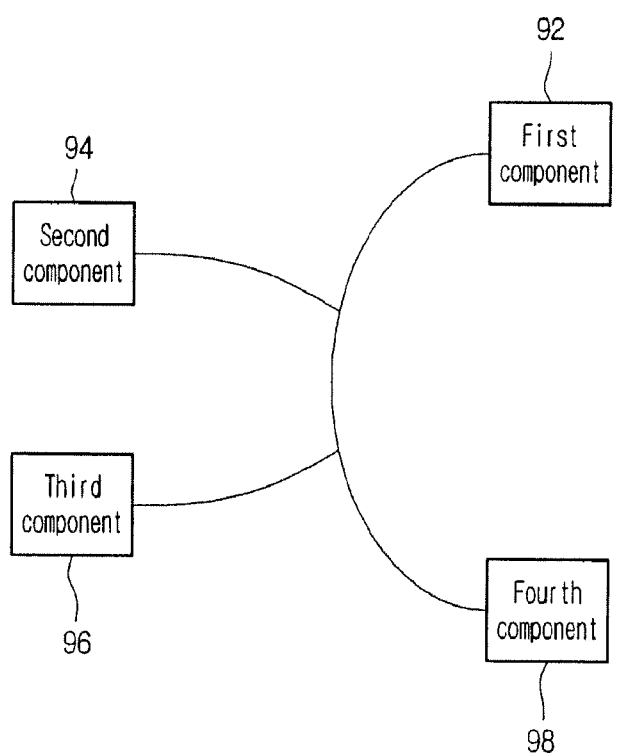
FIG. 10 is a view showing the communication structure of components that constitute the network system according to a fourth embodiment.
Figure 11:
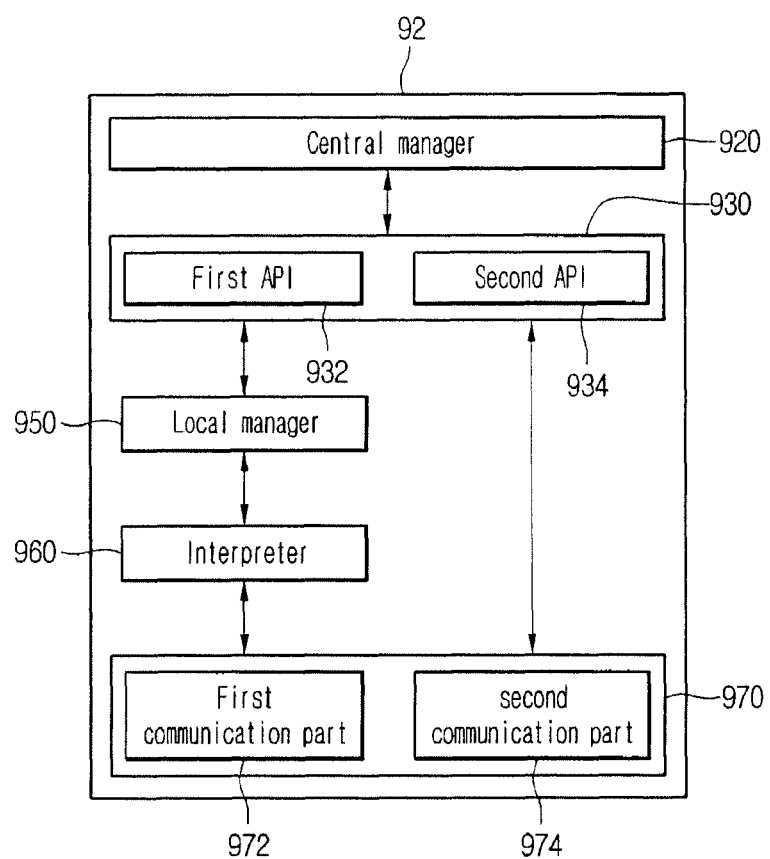
FIG. 11 is a block diagram showing the detailed configuration of a first component in FIG. 10.

FIG. 10 is a view showing the communication structure of components that constitute the network system according to a fourth embodiment. FIG. 11 is a block diagram showing the detailed configuration of a first component in FIG. 10.

Referring to FIGS. 10 and 11, the network system of this embodiment may include at least first to fourth components 92, 94, 96 and 98.

The first component 92 may communicate with the second to fourth components 94, 96 and 98. The fourth component 98 may communicate with the first to third components 92, 94 and 96.

Hereinafter, it will be described as an example that the first component 92 is a central management component (home server), the second and third components 94 and 96 are energy consumption components (electric home appliances), and the fourth component 98 is an energy metering component (smart meter).

The central management component (home server) may be understood as a component necessary for controlling at least a component that constitutes the HAN 20.

The first component 92 includes a communication unit 970 for performing communication with another component, a central manager 920 for managing the entire operation and/or information transmission/reception of the first component 92, and an application programming interface 930 (hereinafter, referred to as an "API") that serves as an interface between the communication unit 970 and the central manager 920 (specifically, application software).

The communication unit 970 may include a first communication component 972 for performing communication with the second to fourth components 94, 96 and 98, and a second communication component 974 for performing Internet communication.

The API 930 includes a first API 932 and a second API 934. The second API 934 is an interface between the central manager 920 and the second communication part 974, and the first API 930 is an interface between the first communication part 972 and the central manager 920.

The first component 92 further includes a local manager 950 and an interpreter 960. In a case where the information to be transmitted/received between the API 932 and the communication unit 970 is information related to operations of energy consumption components (electric home appliances), the local manager 950 outputs information corresponding to the respective energy consumption components. The interpreter 960 interprets information transmitted from the local manager 950 to the communication unit 970 or information received in the communication unit 970.

In this embodiment, the functions of the interpreter and the local manager are identical to those of the third embodiment, and therefore, their detailed descriptions will be omitted.

The information transmission process in the first component 92 will be described.

As an example, the first component 92 may receive energy information (e.g., energy reduction signal) from the fourth component 98 through the first communication part 972. Alternatively, the first component 92 may receive energy information from an external component connected to Internet through the second communication part 974.

The received energy information is transmitted directly to the first or second API 932 or 934 and then transmitted to the central manager 920. Since the energy information is information related to the energy consumption reduction of the energy consumption components, the central manager 920 transmits information related to the operations of the energy consumption components to the first API 932. As an example, the central manager 920 transmits information necessary for turning off power of a washing machine or refrigerator.

Then, the information is transmitted from the first API 932 to the local manager 950.

The local manager 950 transmits information for controlling the operation of each of the energy consumption components to the interpreter 960 based on the information transmitted from the first API 932. As an example, in a case where the information transmitted from the first API is information related to different kinds of energy consumption components, the local manager 950 transmits information related to the control of each of the energy consumption components to the interpreter 960.

Subsequently, the interpreter 960 interprets the information transmitted from the local manager 960 into a machine language (signal). Then, the interpreted signal is transmitted to the energy consumption components through the first communication part 972. Then, the energy consumption components are finally turned off so as to reduce energy.

Meanwhile, the second and third components 94 and 96 may transmit their own operation information to the first component 92. Since the information transmitted from the second and third components is information related to the operations of the energy consumption components, the signal received in the first communication part 972 is transmitted to the central manager 920 via the interpreter 960, the local manager 950 and the first API 932. In such an information transmission process, the information related to the first and second components is stored in the local manager 950.

The central manager 920 may transmit the received information to the first communication part 972. Then, the information of the second and third components 94 and 96 is transmitted to the fourth component 98.

The operation of the first component will be described. The information received through the communication unit 970 may be transmitted directly to the API 930, or may be converted (via the interpreter and the local manager) and then transmitted to the API 930, based on the kind of information (or the type of signal).

On the contrary, the information transmitted from the central manager 920 may be transmitted directly to the communication unit 970, or may be converted and then transmitted to the communication unit 970.

Meanwhile, in a case where the information transmitted to the API 930 through the second communication part 974 is information related to time-based pricing, the central manager 920 determines the presence of on-peak time. In the case of the on-peak time, the central manager 920 may transmit the information for controlling the operations of the energy consumption components to the API 930. Then, the information is transmitted to the energy consumption components through the local manager, the interpreter and the first communication part. In this case, the first component may be understood as an energy management component.

Although it has been described above that two energy consumption components communicate with the first component, the number of energy consumption components that communicate with the first component is not limited.

Although it has been described as an example that the first component is a home server, the first component may be an energy management component. In this case, the fourth component may be a central management component, an energy management component, a smart meter, or the like.

As another example, the first component may be a smart meter. In this case, the fourth component may be a central management component, an energy management component, or the like.

As still another example, the first component may be a terminal component (e.g., a gate way).

As still another example, each of the second and third components may be an energy generation component, an energy storage component or the like, which constitutes the HAN. That is, one or more of the energy generation component, the energy consumption component and the energy storage component may communicate with the first component. In addition to information related to the energy consumption component, information related to the energy generation component (e.g., information related to the operation of the energy generation component) and information related to the energy storage component (e.g., information related to the operation of the energy storage component) may be stored in the memory included in a local network or connected to the local network.

Although it has been described above that the first component performs Internet communication, the Internet communication may not be performed.

Although it has been described in the first embodiment that a single local manager is provided, a plurality of local managers may be provided. As an example, a first local manager may process information on an electric home appliance such as a refrigerator or washing machine, and a second local manager may process information on a display product such as a television or monitor.

Figure 12:
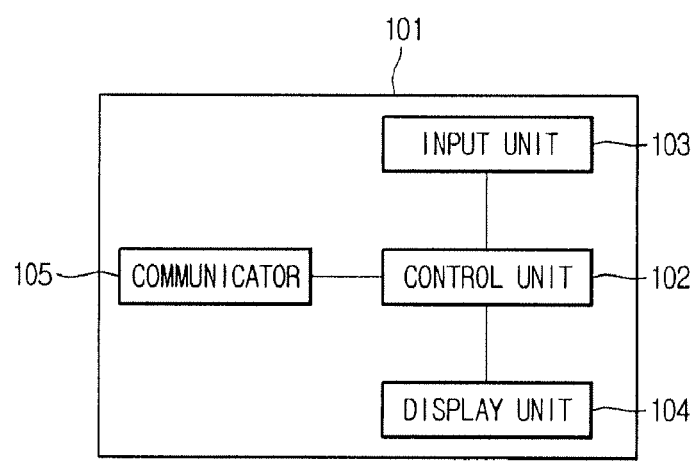
FIG. 12 is a block diagram showing an example an example of a component that constitutes the network system of the present disclosure.

FIG. 12 is a block diagram showing an example an example of a component that constitutes the network system of the present disclosure. The following component 100 may be one component of the UAN or HAN.

Referring to FIG. 12, the component 101 may include a control unit 102, an input unit 103 for inputting an operational command, and a display unit 104 for displaying information. In this instance, the input unit 103 may be provided in the form of a touch screen to the display unit 104. The control unit 102 may communicate with a communicator 105.

The component 101 may further include a sensor, a driver, a memory and the like according to the kind of the component 101. The input unit or display unit may not be provided to the component 101 according to the kind of the component 101. The component 101 may be a function performing component, or may include the function performing component.

Hereinafter, various examples of the operating method of the component 101 will be described.

As an example, if a start command is inputted by the input unit 103, optimal driving time information or time except information (driving method) of the component 101 is determined (determination of the optimal driving condition). The optimal driving time information or time except information is determined so that electricity usage cost or power consumption is decreased. The optimal driving time information may be determined so that the component is immediately driven at a current time, that the component is driven at a selected time or that the driving of the component is delayed. In a case where the optimal driving time is later than the time (current time) recognized by a user, information for informing the user of this fact may be displayed in the display unit 104. A driving method or time may be inputted through the input unit 120 before the start command is inputted through the input unit 103, and the inputted drying mode or time may be changed or maintained by the determination of the optimal driving time information or time except information. That is, in a case where a specific operation condition is inputted through the input unit, the driving condition of the component is determined based on at least information related to energy cost. Then, the component is operated based on the determined optimal driving condition. Information changed from the inputted driving operation condition in the optimal driving condition or information not inputted may be displayed in the display unit.

As still another example, if a specific condition is inputted through the input unit 103, at least one of energy information and time information related to the operation of the component may be displayed in the display unit. The energy information may be energy cost information per unit power or energy usage cost when the component is operated in a specific mode. The time information related to the operation of the component may be an operation start time, operation end time, or a time until the operation of the component is strated and then ended.

As still another example, if a specific information is inputted through the input unit 103, recommendation information (energy information or additional information) on the operation mode or time of the component or the like may be displayed in the display unit. The driving method, power consumption, power saving level or driving start time of the component 101 may be recommended. In this instance, the kind of information inputted through the input unit 103 and another information may be displayed. For example, if a driving method is inputted, information except the driving method may be recommended.

In addition to the recommendation information, information related to energy when the component is operated (when the component is operated in a specific course at a specific time), e.g., electricity usage cost may be further displayed as recommendation information. In this case, the user may select recommendation information, or may select a user's desired operation mode or time regardless of the recommendation information.

For example, if the time information related to the operation of the component is inputted through the input unit, at least a power-savable driving time of the component may be recommended based on the energy information and the time information, or the component may be operated at a specific time so that the energy usage cost of the component can be reduced. In this instance, the recommended driving time or specific time for power saving may be a time changed from the inputted time. The recommended driving time may include an operation start time or operation end time.

Alternatively, in a case where the driving method is inputted through the input unit, at least a power-savable driving time of the component may be recommended based on the energy information and the time information, or the component may be operated at a specific time so that the energy usage cost of the component can be reduced. In this instance, the recommended driving time or specific time for power saving may be a time changed from the inputted time.

Alternatively, in a case where the energy usage cost or energy usage amount of the component is inputted through the input unit, the driving method (including time or mode) of the component may be recommended so as to satisfy a lower value than that of the information inputted based on the energy information and inputted information, or the component may be driven in a specific driving method.

As still another example, if the component is turned on, an optimal time from a current time to a specific time may be recommended. For example, the optimal time may be a time when the energy cost is lowest for the current time to the specific time.

As still another example, if an operation mode is selected through the input unit 103, energy information related to the mode selected in the display unit may be displayed. For example, in a case where a specific operation mode is selected, electricity cost per unit power for each time zone, total electricity usage cost in the operation of a corresponding mode, total power consumption and the like may be displayed.

As still another example, the component 101 may be operated in a general mode in which it is operated without reducing electricity usage cost or power consumption, or may be operated in a power saving mode that reduces the electricity usage cost or power consumption as compared with the general mode. In a case where the general mode is selected, the component 101 may be driven based on a condition inputted by the user regardless of energy information. In a case where the power saving mode is selected, the driving method, operation time and operation period when the component 101 is operated in the general mode may be changed, so that the component 101 can be operated. That is, the operation method of the component in the general mode is different from that of the component in the power saving mode. In the power saving mode, energy information related to the information through the input unit or additional information and energy information not inputted through the input unit or additional information may be displayed.

The general or power saving mode may be manually set or changed by the user through the input unit, or the component 101 may automatically set or change the general or power saving mode based on the energy information. Alternatively, the general mode or power saving mode may be selected by receiving a setup or change command from another component. Any one of the general mode and the power saving mode may be set as a basic mode in the component 101.

Alternatively, the component 101 may be operated in one of a plurality of power saving modes. That is, the component 101 may be operated in any one of the plurality of power saving modes so as to reduce energy consumption or energy usage cost according to the kind of at least the energy information.

The plurality of power saving modes may include a manual mode in which information for driving the component 101 is manually selected, and an automatic mode in which the information for driving the component 101 is automatically selected.

The component may be operated in a time reduction mode in addition to the general mode and the power saving mode. In the time reduction mode, the operation time of the component is shorter than that of the component in the general mode. In this instance, the energy usage cost (or energy consumption) in the time reduction mode may be equal to or greater than the energy usage cost (or energy consumption) in the general mode. The energy usage cost (or energy consumption) in the time reduction mode may be changed by varying the operation method of the component. The operation time of the component in the power saving mode is equal to or longer than that of the component in the general mode. In this instance, performances (e.g., washing performances, cooking performances or the like) of the component in the general mode, the time reduction mode and the power saving mode may be identical or similar to one another.

As still another example, the plurality of power saving modes may include a mode labeled corresponding to the degree of reduction of electricity cost or power consumption. For example, the power consumption or electricity usage cost when the component is operated in a first power saving mode may be smaller than that when the component is operated in a second power saving mode. Alternatively, the plurality of power saving mode may include at least two modes that share a common control unit or method for the purpose of the power-saving driving of the component 101. The plurality of power saving modes may be mutually changed manually or automatically. Alternatively, the plurality of power saving modes may control the component using different methods from one another. That is, the control methods of the component are different from one another in the plurality of power saving modes.

The input unit 103 may include a button for selecting any one of the general mode and the power saving mode.

Alternatively, the input unit 103 may include a button for selecting any one of the plurality of power saving modes. Alternatively, the input unit 103 may include a button for selecting an operation limiting time or operable time of the component 101. For example, in a case where the operation limiting time is set as zero o'clock a.m. to 6 o'clock a.m., the component may be operated at a time except the operation limiting time.

Figure 13:
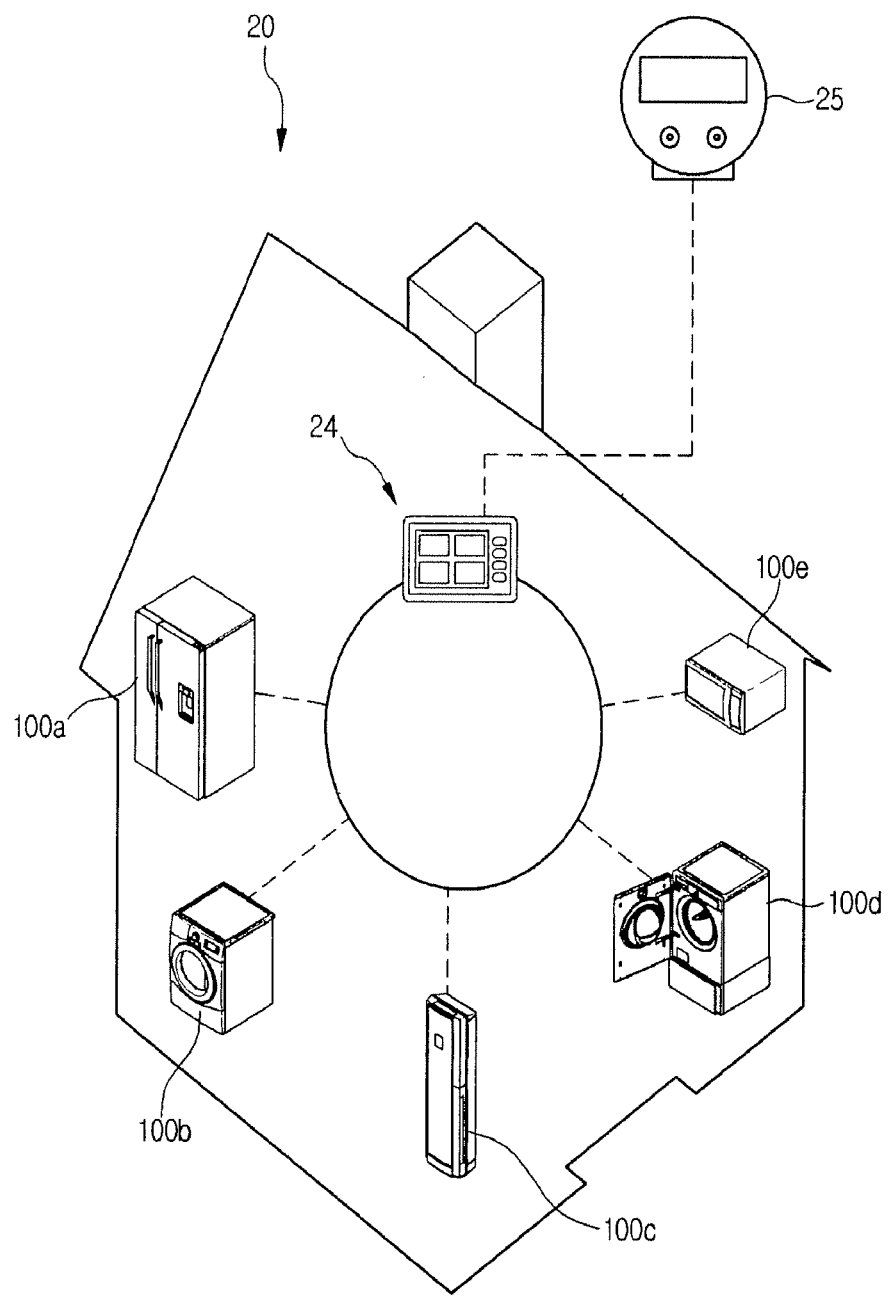
FIG. 13 is a schematic view of a home network according to an embodiment.

FIG. 13 is a schematic view of a home network according to an embodiment.

Referring to FIG. 13, the home network 20 includes an energy measurement unit 25 for measuring power and/or electricity charges in real time, which are supplied from the utility network 10 to each home, and an energy management unit 24 for managing operations of a smart meter, the energy measurement unit 25, and an electric product in connection with them.

Since the energy management unit 24 is connected to an electric product such as a refrigerator 100a, a washing machine 100b, an air conditioner 100c, a drier 100d, or a cooking appliance through the home network 20, interactive communication is possible. Home communication may be given with a wireless communication type such as Zigbee and Wi-Fi or a wire communication type such as Power Line Communication (PLC). Thus, one home appliance may be connected to other home appliances to communicate with each other.

Figure 14:
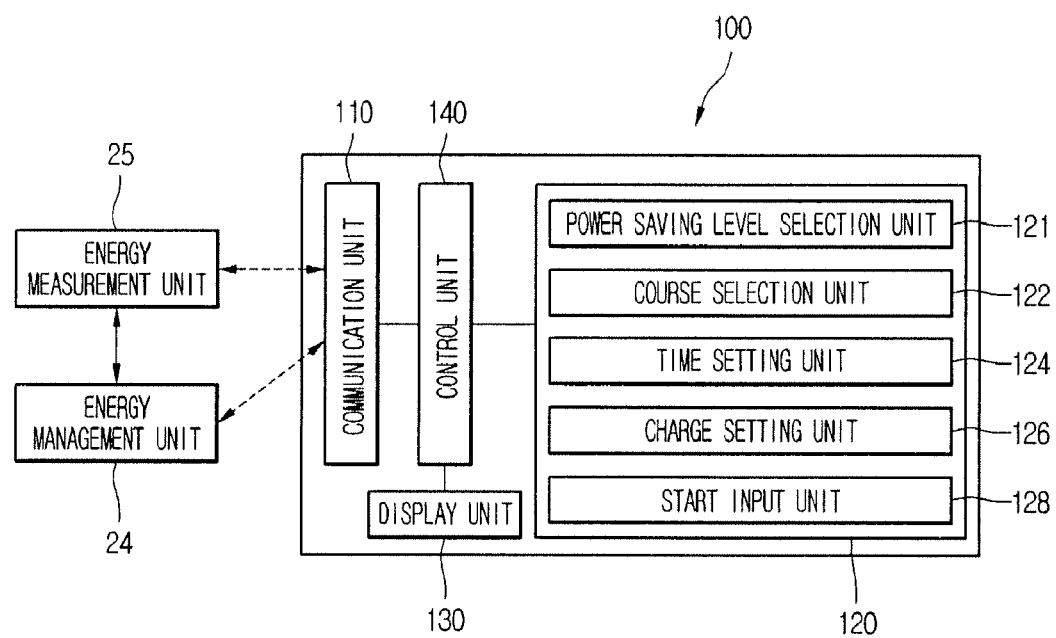
FIG. 14 is a block diagram illustrating a configuration of an electric product according to a first embodiment.
Figure 15:
FIG. 15 is a block diagram illustrating a configuration of a power saving level according to a first embodiment.

FIG. 14 is a block diagram illustrating a configuration of an electric product according to a first embodiment. FIG. 15 is a block diagram illustrating a configuration of a power saving level according to a first embodiment.

Referring to FIGS. 14 and 15, the electric product 100 as "an energy consumption unit" according to the first embodiment includes a communication unit 110. The communication unit 110 may communicate with at least one of an energy measurement unit 25 for recognizing energy information or additional information other than the energy information such as information related to energy charges and an energy management unit 24 for managing (or controlling) the driving of the energy consumption unit 100 according to the energy information or the additional information. Moreover, the energy measurement unit 25 and the energy management unit 24 may be connected to each other for interactive communication. Moreover, the communication unit 110 may be provided in the electric product 110 or may be provided, separated from the electric product 110.

The electric product 100 further includes an input unit 120 for inputting a predetermined command, a display unit 130 for displaying driving information of the electric product 100 or information recognized from the communication unit 110, and a control unit 140 for controlling configurations thereof.

In more detail, the input unit 120 includes a power saving level selection unit 121 for selecting a power saving intensity or a power saving mode (time) of the electric product 100, a course selection unit 122 for selecting a driving available course of the electric product 100, a time setting unit 124 for setting a driving time or a driving time interval of the electric product 100, a charge setting unit 126 for setting a reference value (e.g., the maximum value) of usage charges or an amount of power, and a start input unit 128 for inputting a start command of the electric product 100.

When a power saving mode is selected using a time interval, a course, or charges, the time setting unit 124, the course selection unit 122, or the charge setting unit 125 may be selected, respectively. That is, at least one power saving mode may be selected from a plurality of power saving modes by selecting one from a plurality of available selection units.

Additionally, each of the selection units 122, 124, and 126 may have a plurality of power saving modes. As one example, if the time setting unit 124 is selected, there is a plurality of optional time intervals. According to the selected time interval, a power saving mode related to time may be provided.

Once the power saving level selection unit 121 is selected, the contents of FIG. 15 are displayed on the display unit 130. A plurality of optional power saving modes may be displayed on the display unit 130. The plurality of power saving modes may be divided according to a power saving level (intensity) or a power saving method (or time). Here, a "mode" may be understood as a concept including a specific component, a specific driving course, or administration, which constitutes an electric product, in relation to functions that the electric product 100 performs.

The electric product 100 may be driven in a general mode or a power saving mode. The general mode is driven according to a driving method recognized by the electric product 100 itself, not on the basis of energy information or additional information. The power saving mode is driven on the basis of energy information or additional information. If the electric product 100 is driven in the power saving mode, energy charges may be saved than the general mode. The general mode may be changed into the power saving mode and vice versa. Then, one of the general mode and the power saving mode may be selected as an operating mode of the electric product 100.

Hereinafter, it is described as one example that the electric product 100 is driven for one hour in a specific course. Then, it is assumed that current time is 09:20; a high cost interval (e.g., an on-peak time interval) is 09:20 to 10:00; and a low cost interval (e.g., an off-peak time interval) is 10:00 to 11:00.

The plurality of power saving modes include a first power saving mode for controlling the electric product 100 to be driven in a low cost interval. The low cost interval includes an off-peak time interval. While the first power saving mode operates, the electric product 100 may be controlled to be driven in the off-peak time interval of 10:00 to 11:00. Moreover, the display unit 130 may display forecast expense (1,000 won) consumed during the first power saving mode. However, instead of the consumption costs, an amount of power used may be displayed.

The plurality of power saving modes include a second power saving mode in which the electric product 100 is driven only for a predetermined time at an on-peak time interval. If the second power saving mode operates, the electric product 100 is driven for a predetermined time (10 min) at an on-peak time interval, i.e., 09:20 to 09:30, and then is turned off. Then, the remaining driving may be controlled to be performed at the off-peak time interval of 10:00 to 10:50. The display unit 130 may display costs (1,200 won), which is spent during the second power saving mode.

The plurality of power saving modes include a third power saving mode driven under a condition that the electric product 100 operates. Here, the operating condition means that an information value related to the driving of an electric product is less than a predetermined reference. Moreover, the information value may include information related to electricity charges, an amount of power consumed, or an operating time. When an on-peak time interval is 09:20 to 10:00 but a time interval of 09:20 to 09:40 does not satisfies an operating condition, the electric product 100 may start to operate from 09:40. That is, when the third power saving mode operates, the electric product 10 is driven for 09:40 to 10:40 and then is turned off. Moreover, the display unit 130 displays costs (1,300 won), which is spent during the third power saving mode.

The plurality of power saving modes include a fourth power saving mode in which the electric product 100 reduces an output of at least one component and drives it at an on-peak time interval. When the fourth power saving mode operates, the electric product 100 may be driven for 09:20 to 10:20. Moreover, the display unit 130 may display costs (1,500 won), which is spent during the fourth power saving mode.

The plurality of power saving modes include a fifth power saving mode in which the electric product 100 increases an output of at least one component and drives it at an on-peak time interval. However, a total power consumed or electricity charges may be controlled to be reduced while the electric power 100 is driven. When the fifth power saving mode operates, the electric product 100 is driven for 09:20 to 10:00. That is, instead of increasing the output, a total power consumed or electricity charges may be reduced by decreasing the driving time. Also, the display unit 130 displays costs (1,700 won), which is spent during the fifth power saving mode.

As mentioned above, the first to fifth power saving modes may be displayed and a user may select a desired power saving mode. A method of selecting a power saving mode includes a touch on a display window or an input of an additional button. The display unit 130 may display costs of a general mode if an electric product is driven without received information. The general mode may be selectable or un-selectable. When the general mode is displayed, a user may confirm the degree of cost reduction if the first power saving mode is selected.

Referring to FIG. 14 again, the input unit 120 further includes a course selection unit 122 for selecting a course that a user wants for driving. Once the course selection unit 122 is selected, at least one predetermined driving course may be displayed and a user may select one of driving courses displayed. Then, a setting temperature (a target temperature) or RPM of a driving motor may be further set according to characteristics of the electric product 100 through the course selection unit 122.

Once one course is selected by the course selection unit 122, at least one factor of a driving time, an amount of power consumed, and a power saving level may be recommend according to the selected course. The display unit 130 may display the recommend contents and electricity charges corresponding thereto. The recommend driving time may be understood as a driving time to reduce electricity charges or an amount of power consumed.

The input unit 120 includes a time setting unit 126 for setting a driving time of the electric product 100. Here, the driving time may be a starting time including current time. Once the time setting unit 126 is selected, power information according to time, i.e., information such as charges or amount of power, may be displayed and then, a user may select one driving time on the basis of power information per hour displayed.

Once one diving time is selected by the time setting unit 126, at least one of a driving course, an amount of power consumed, and a power saving level is recommended according to the selected driving time. The display unit 130 may display recommended contents and electricity charges corresponding thereto. The recommend driving course may be understood as a driving time to reduce electricity charges or an amount of power consumed.

The input unit 120 includes a charge setting unit 126 for inputting the maximum usage charges or amount of power used of the electric product 100. Once the charge setting unit 126 is selected, at least one driving course and the time corresponding to limited charges or amount of power is displayed and recommend. Then, a user may select a course or time on the basis of the course and time displayed. Moreover, the control unit 140 may automatically determine an optimized driving according to the inputted contents of the charge setting unit 126. Here, "optimized operation" may be understood as an operation to reduce electricity charges or an amount of power consumed.

In brief, various input units are provided to input time information (e.g., a driving time), which is required for driving an electric product, or information other than the time information (e.g., a driving method). Moreover, once setting for driving an electric product is completed through the input unit, a driving command may be inputted through the start input unit 128.

Thus, once setting for driving an electric product is completed, a driving command may be inputted through the start input unit 128. As a result, after an electric product is turned on and before a start command is inputted, while time information (e.g., a driving time) or information besides the time information (e.g., a driving method) is selected, the display unit 130 may display one of energy information and additional information, especially, information related to energy charges. Then, a user may be recommended with an appropriate driving method and then may select it on the basis of the information displayed.

Figure 16:
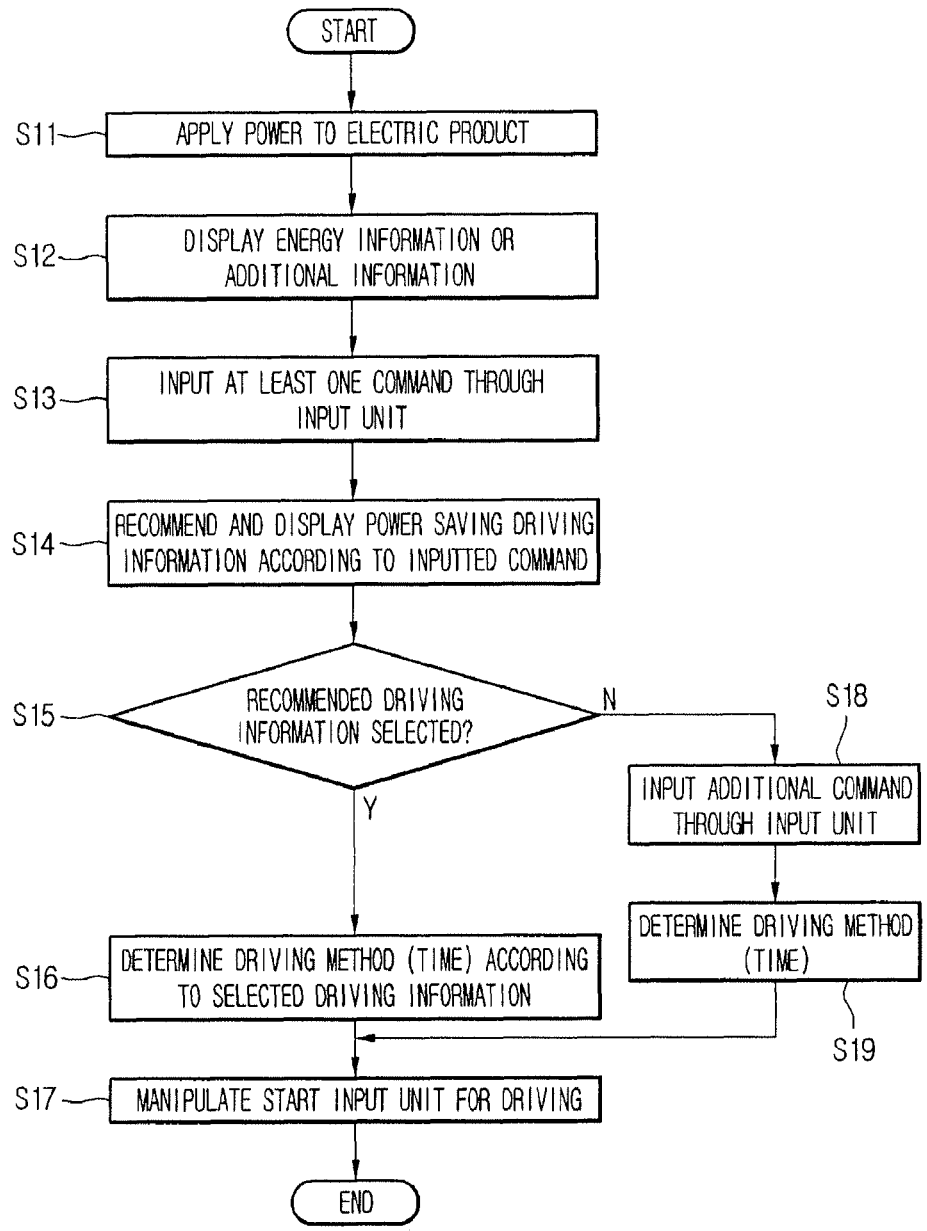
FIG. 16 is a flowchart illustrating a method of controlling an electric product according to a first embodiment.

FIG. 16 is a flowchart illustrating a method of controlling an electric product according to a first embodiment. Referring to FIG. 16, the method of controlling an electric product will be described. According to the first embodiment, a power saving mode of an electric product is configured to be set manually. This power saving mode is called a "power saving manual mode".

Then, the electric product may be understood as an "intermittent driving", which is driven when a start command is inputted by a user. For example, the electric product may be a washing machine, a drier, or a cooking appliance. One component constituting the electric product may be an ice maker or a special freeze room of a refrigerator.

Once power is applied to the electric product 100, the communication unit 110 receives energy information or additional information in communication with the energy measurement unit 25 or the energy management unit 24 in operation S11. The received information may be displayed through the display unit 130. The displayed information may be previously-stored schedule information or real-time information. However, when energy information or additional information after current time is displayed, stored information may be displayed in operation S12.

Moreover, at least one command may be inputted through the input unit 120. Here, the input unit 120 may be one of the power saving level selection unit 121, the course selection unit 122, the time setting unit 124, or the charge setting unit 124, except the start input unit 128, in operation S13. However, operation S12 and operation S13 may be performed in a different order. That is, once an input is provided through the input unit 12, energy information or additional information may be displayed in correspondence to an inputted command.

Once an input is provided through the input unit 120, the control unit 140 may recommend power saving driving information according to the inputted command. Moreover, the recommended information may be displayed through the display unit 130. For example, if the inputted command is time information, a driving course may be recommend and, when the inputted command is course information, a driving time (e.g., a starting time) may be recommend. Moreover, if the inputted command is a limit value of charges or amount of power, time or course information may be recommended in operation S14. When a user selects the recommended driving operation, a driving method (e.g., a driving course) or a driving time may be determined according to the selected driving information in operation S16. Also, once the start input unit 128 is selected, the electric product 100 may be driven according to the determined method (or time).

Meanwhile, if a user does not select the recommended driving information, a user may input an additional command through the input unit 120. That is, a user may ignore the recommended information and may input a new command in operation S18. Once an additional command is inputted, a driving method (or time) may be determined according to the inputted command. Here, the driving method may include a course, a temperature, and RPM of a motor, which needs to be determined to drive the electric product 100. And, once the start input unit 128 is selected, the electric product 100 may be driven according to a determined method (or time) in operation S19.

While the electric product 100 is driven, the display unit 130 may be selectively activated. Here, the "activation" may mean that the display unit 130 may be changed from a turn off state into a turn on state or from an on state into a screen darkening state.

If there is no additional input while the electric product 100 is driven, the display unit 130 may be in an inactivated state. However, when a user selects a specific input unit, information related to the driving of the electric product 100 may be displayed. Here, the specific input unit may be an existing input for inputting another command or an additional input unit for activating a display. If the specific input unit is an existing input unit, the number of button pressing or button pressing time may be set in advance as a condition for activating the display unit 130. For example, the display unit 130 may be configured to be activated when the existing input unit is pressed three times or for 3 sec. According to the above-mentioned embodiment, since a driving method (or time) to reduce electricity charges or an amount of power consumed is determined on the basis of information received through the communication unit 110, efficient power management is possible.

Figure 17:
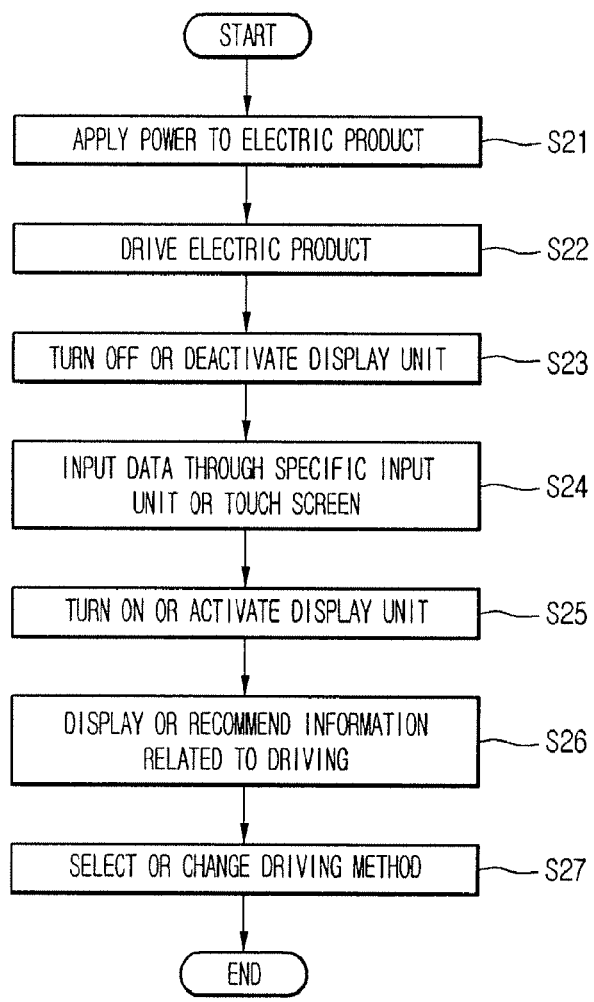
FIG. 17 is a flowchart illustrating a method of controlling an electric product according to a second embodiment.

FIG. 17 is a flowchart illustrating a method of controlling an electric product according to a second embodiment. Referring to FIG. 17, the method of controlling an electric product will be described. In this embodiment, during the power saving manual mode, an electric product may be understood as a "full-time driving" electric product, which is automatically driven once power is applied to the electric product. For example, the electric product may include a refrigerator and a water purifier.

Once power is applied to the electric product 100 in operation S21, the electric product 100 is driven in operation S22. When the electric product 100 is driven, the display unit 130 may be turned off or deactivated in operation S23. In this state, when a specific input unit is provided or a screen of the display unit 130 is touched in operation S24, the display unit 130 may be turned on or activated in operation S25. However, a method of turning on or activating the display unit 130 is not limited to the above.

Also, energy information or additional information may be displayed on the display unit 130 and a driving method may be recommended. For example, if the electric product 100 is a refrigerator, changeable temperature values of a storage and electricity charges corresponding thereto may be displayed. Here, the energy information or additional information may be updated in the electric product 100 in real time or at a specific time in operation S26.

A user may select or change a driving method on the basis of the recommend contents. For example, if the electric product is a refrigerator, one of the displayed temperature values may be selected or changed in operation S27. Moreover, a specific input unit for activating the display unit 130 may be an existing input unit for inputting another command or an additional input unit for activating a display. If the specific input unit is an existing input unit, the number of button pressing or button pressing time may be set in advance as a condition for activating the display unit 130. For example, the display unit 130 may be configured to be activated when the existing input unit is pressed three times or for 3 sec. Thus, in a case of the full-time driving electric product, only when a user wants, a display is turned on or activated, so that power consumption for driving a display can be reduced.

Hereinafter, other embodiments will be described, only differences between the previous embodiments and the other embodiments will be mainly described. With respect to the same components, the descriptions and reference numbers of previous embodiments will be quoted.

Figure 18:
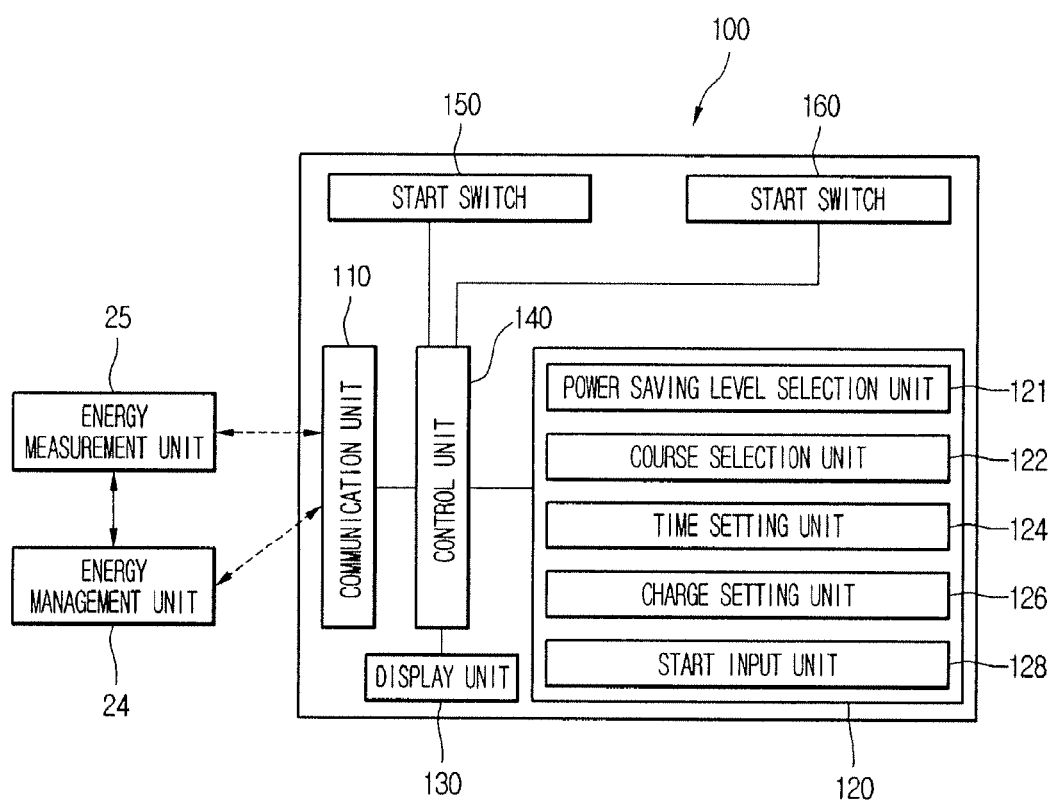
FIG. 18 is a block diagram illustrating a configuration of an electric product according to a third embodiment.

FIG. 18 is a block diagram illustrating a configuration of an electric product according to a third embodiment.

Referring to FIG. 18, the electric product 100 as an "energy consumption unit" according to the first embodiment includes a communication unit 110, an input unit 120 for inputting a predetermined command, a display unit 130 for displaying the driving information of the electric product 100 or information recognized from the communication unit 110, and a control unit 140 for controlling configurations thereof.

In more detail, the input unit 120 includes a power saving level selection unit 121 for selecting a power saving intensity of the electric product 100, a course selection unit 122 for selecting a driving available course of the electric product 100, a time setting unit 124 for setting a driving time of the electric product 100, a charge setting unit 126 for setting the maximum value of usage charges or an amount of power, and a start input unit 128 for inputting a start command of the electric product 100. Description for the input unit 120 and the display unit 130 may quote from those of FIGS. 14 and 15.

The electric product 100 may further include a sensor 150 for sensing a type or weight of a consumable provided to the electric product 100. The consumable may include the laundry in a washing machine, ingredients in a cooking appliance, a detergent or fabric softener for washing the laundry, and condiments for cooking.

Furthermore, the electric product 100 may include a start switch 160 for starting driving it. When power is applied to the electric product 100, the control unit 140 may turn on the start switch 160 and accordingly, the electric product 100 may start to be driven.

Figure 19:
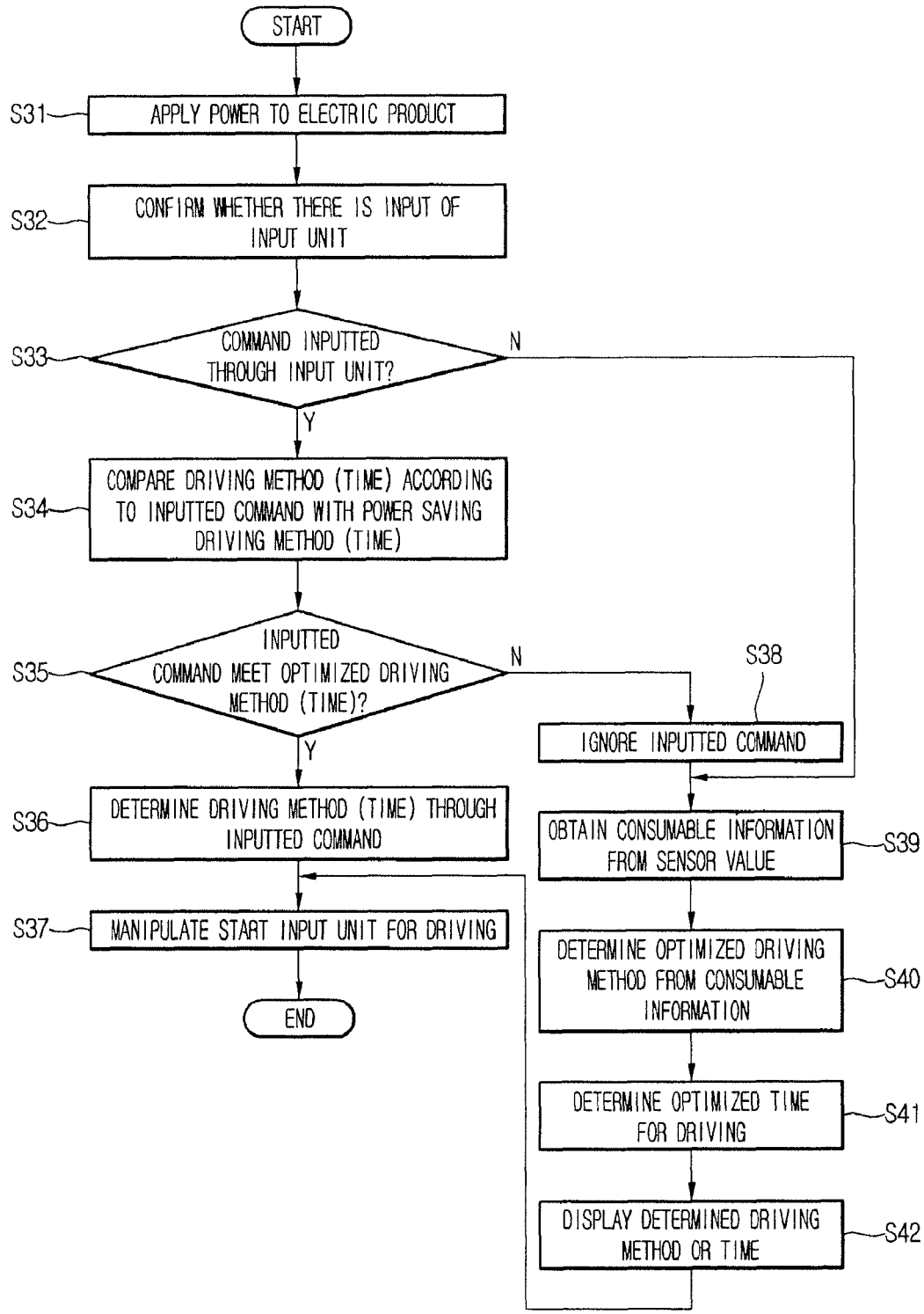
FIG. 19 is a flowchart illustrating a method of controlling an electric product according to a third embodiment.

FIG. 19 is a flowchart illustrating a method of controlling an electric product according to a third embodiment. Referring to FIG. 19, the method of controlling an electric product will be described. According to the third embodiment, a power saving mode of an electric product is configured to be set automatically. This power saving mode is called a "power saving auto mode".

Then, the electric product may be understood as an "intermittent driving", which is driven when a start command is inputted by a user. For example, the electric product may be a washing machine, a drier, or a cooking appliance. One component constituting the electric product may be an ice maker or a special freeze room of a refrigerator.

Once power is applied to the electric product 100 in operation S31, it is confirmed whether a predetermined command is inputted or not through the input unit 120. Here, the input unit 120 may be one of the power saving level selection unit 121, the course selection unit 122, the time setting unit 124, and the charge setting unit 124, except the start input unit 128, in operation S32.

Moreover, regardless of whether power is applied to the electric product 100, energy information or additional information may be received through the communication unit 110. At this point, an additional power for driving the communication unit 110, for example, a storage battery, may be provided. Moreover, the received energy information or additional information may be previously-stored schedule information or real-time information.

When at least one commend is inputted through the input unit 120, time information or information related to other than the time information (e.g., a driving method) according to the inputted command is compared with an optimized power saving driving method (or time) in operations S33 and S34. If the driving method (e.g., a first driving method) according to the inputted command meets the optimized power saving method (e.g., a second driving method), (i.e., the first driving method is included in at least one of the second driving method), a driving method of the electric product 100 may be determined by the inputted command. As a result, in relation to the driving of the electric product 100, a driving method or a driving time on the basis of the inputted command may be maintained in operations S35 and S36. Moreover, if the start input unit 128 is manipulated, the electric product 100 may be driven according to the determined driving method in operation S37.

Meanwhile, if the inputted command does not meet the optimal power saving driving in operation S35, the inputted command may be ignored in operation S38. Here, the "optimal power saving driving" may be a result of combination of an optimal driving method and a driving time.

Moreover, consumable information may be obtained from a sensor value sensed by the sensor 150. Here, the consumable information may be a type or weight value of the consumable in operation S39. An optimal driving method and an optimal driving time may be determined from the obtained consumable information. The determined optimal driving method may include a driving course, an operating component, a storage temperature, a washing water temperature, and rpm of a driving motor.

The electric product 100 may be instantly driven from now on, may be driven at a selected time, or may be driven after a predetermined delayed time from now on, according to the determined optimal driving time. Moreover, when the electric product 100 may not be instantly driven, or may be driven at a different time than a time that a user selects, a delayed time (a driving starting time) may be displayed.

The consumable information and a driving method or driving time corresponding thereto may be predetermined and then stored in a table. The determined optimal driving method or driving time may be understood as a driving method to reduce electricity charges or an amount of power consumed. As a result, in relation to the driving of the electric product 100, the driving method based on the inputted command is not maintained, a new driving method is determined in operation S40 and operation S41. The determined driving method or time may be displayed through the display unit 130. Accordingly, a user may confirm the driving method or time of the electric product 100 in operation S42. In operation S37, the electric product 100 may start to be driven.

Moreover, if an input is not provided through the input unit 120 in operation S33, it proceeds to operation S39. That is, an optimal driving method and a driving time are determined from the consumable information obtained from the sensor 150. Also, when the start input unit 129 is selected, the electric product 100 may be driven on the basis of the determined driving method and driving time.

In brief, regardless of whether a predetermined command is inputted or not by a user, an optimal condition for driving the electric product 100 may be determined. Also, when a user manipulates the start input unit 128, the electric product 100 starts to be driven according to the determined condition. As mentioned above, according to this embodiment, since a driving method (or time) to reduce electricity charges or an amount of power consumed is determined on the basis of the information received through the communication unit 110, efficient power management may be possible.

Figure 20:
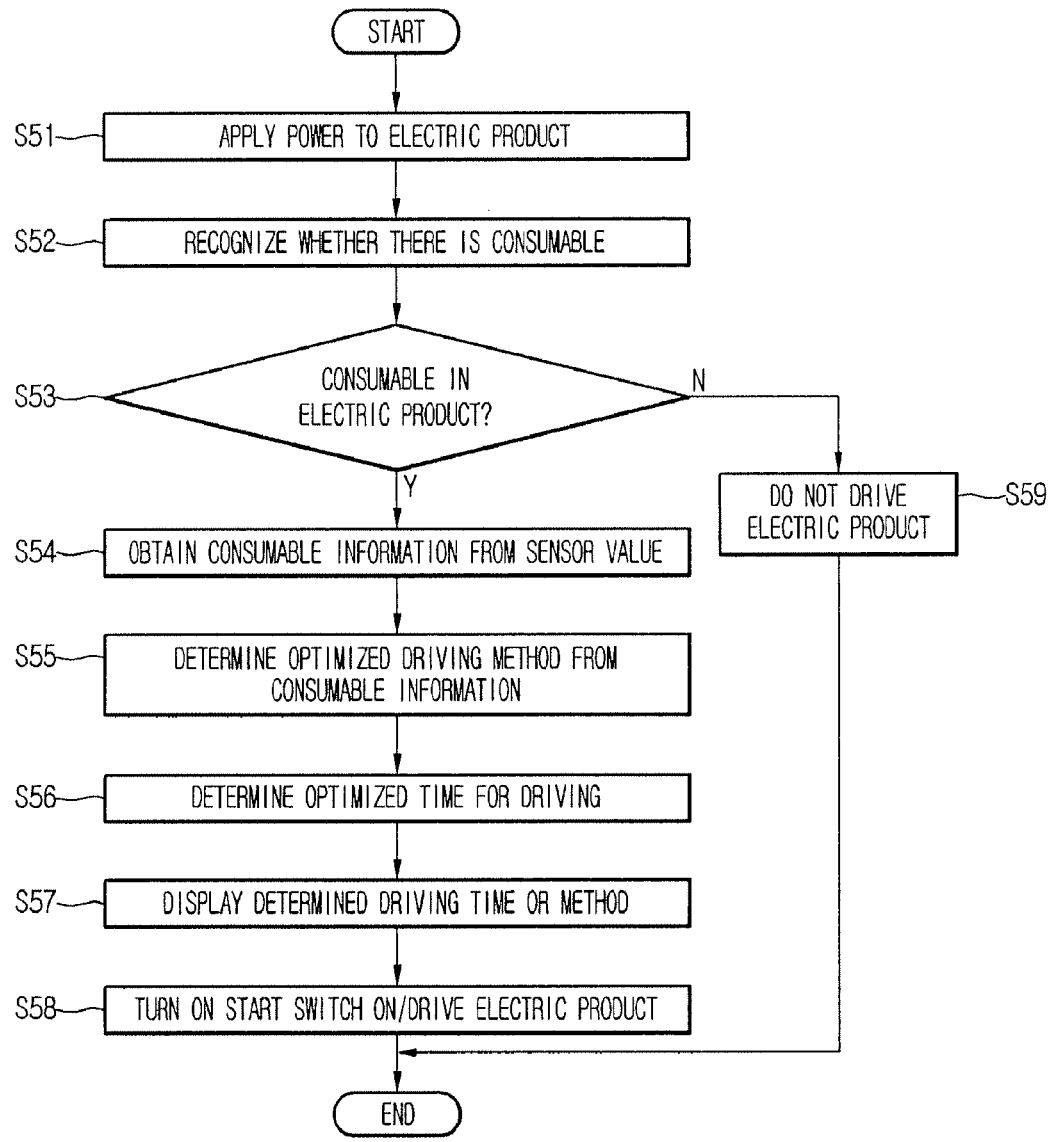
FIG. 20 is a flowchart illustrating a method of controlling an electric product according to a fourth embodiment.

FIG. 20 is a flowchart illustrating a method of controlling an electric product according to a fourth embodiment. Referring to FIG. 20, the method of controlling an electric product will be described. In the power saving auto mode, this embodiment may be applicable to a case that an additional input unit, especially, a start input unit, is not equipped in an electric product.

The electric product may determine whether it needs to be driven or not. If it needs to be driven, a user may recognize it through a display. While power is applied to the electric product 100, a consumable provided to the electric product 100 may be recognized. As mentioned above, the consumable may be sensed by the sensor 150 in operation S51 and operation S52.

If there is the consumable, information (e.g., a type or a weight value) of the consumable may be obtained from a sensor value of the sensor 150 in operation S53 and operation S54. An optimal driving method may be determined from the consumable information. In the determined optimal driving method may include a driving course, an operating component, a storage temperature, a washing water temperature, and rpm of a driving motor in operation S55. An optimal driving time may be determined from the consumable information. The determined driving time may include instant driving from now on and delayed driving (i.e., reservation) at a future time in operation S56.

The determined driving method or driving time may be displayed through the display unit 130 in operation S57 and the control unit 140 may control the start switch 160 to be turned on and accordingly, the electric product 100 may be driven according to the determined driving method or driving time in operation S58. Moreover, if there is no consumable in the electric product 100 in operation S53, the electric product 100 is not driven in operation S39.

In brief, even if a user does not manipulate a start button in order to drive the electric product 100, a control unit 140 operates the start switch 160 in order to drive the electric product 100. According to the above-mentioned embodiment, on the basis of the information received through the communication unit 110, an optimal driving method (or time) is determined, and the electric product 100 is automatically driven according to the determined driving method (or time). Thus, efficient power management is possible.

Figure 21:
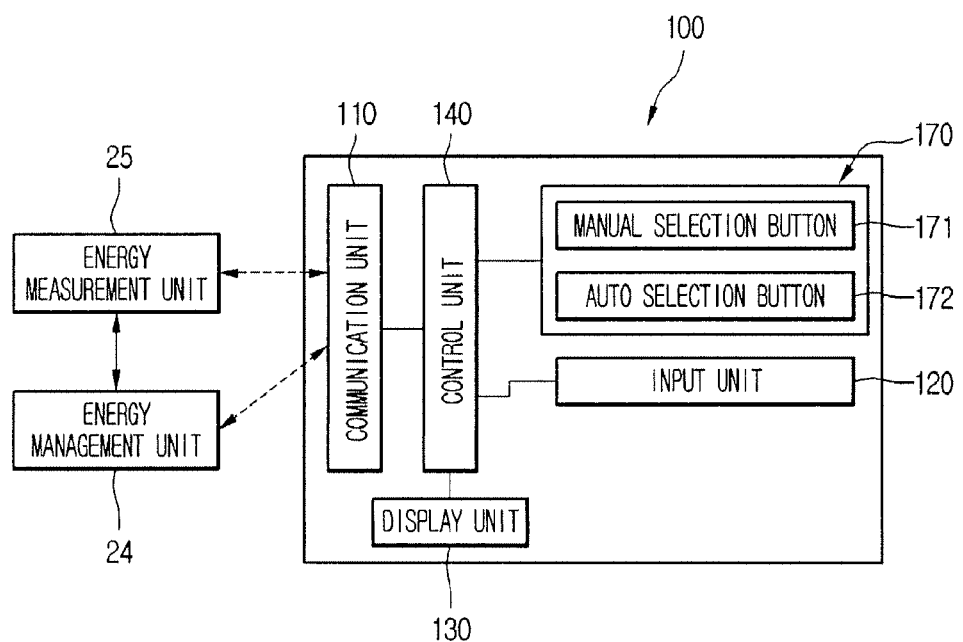
FIG. 21 is a block diagram illustrating a configuration of an electric product according to a fifth embodiment of the present invention.

FIG. 21 is a block diagram illustrating a configuration of an electric product according to a fifth embodiment of the present invention.

Referring to FIG. 21, the electric product 100 as an "energy consumption unit" according to the fifth embodiment includes a communication unit 110, an input unit 120 for inputting a predetermined command, a display unit 130 for displaying the driving information of the electric product 100 or information recognized from the communication unit 110, and a control unit 140 for controlling configurations thereof. Descriptions of the input unit 120 and the display unit 130 will quote from those of FIGS. 14 and 15 according to the first embodiment.

The electric product 100 may include a plurality of power saving modes having different driving methods or driving times. The plurality of power saving modes may be divided into two cases. One is that driving courses of an energy consumption unit are different from each other. The other one is that functions of special administration are different in the same course. The electric product 100 may include a selection input unit 170 for selecting one of the plurality of power saving modes.

In more detail, the selection input unit 170 may include a manual selection input unit 171 for manually selecting at least one power saving mode and an auto selection input unit 172 for automatically selecting the power saving mode.

The manual selection input unit 171 may include a button type, a touch type, or a knob type. Once the manual selection input unit 171 is provided, a plurality of power saving modes may be displayed and a user may select one of the plurality of displayed power saving modes. Then, after the one power saving mode is selected, it may be changed into another power saving mode. The changing into another power saving mode may be possible after or before the electric product 100 is driven.

Once the auto selection input unit 172 is provided, one of the plurality of power saving modes may be automatically selected. That is, the one power saving mode may be set as the first priority of the power saving mode in advance. Of course, even when one power saving mode is automatically selected, it may be changed (switched) into another power saving mode.

Thus, even when one power saving mode is selected by the manual selection input unit 171 or the auto selection input unit 172, it may be changed into another power saving mode. Also, this power saving mode may be manually changed by a user or may be changed into an optimal power saving mode automatically on the basis of energy information or additional information.

Hereinafter, a plurality of power saving modes will be exemplarily described and a refrigerator will be used as one example. The plurality of power saving modes may include various functions or control ways (methods) according to driving characteristics of the refrigerator.

TABLE 1

|  | First power saving mode | Second power saving mode | Third power saving mode | Forth power saving mode | Fifth power saving mode |
| --- | --- | --- | --- | --- | --- |
| High Peak Target Temperature + 2° C. | ○ | ○ | ○ | ○ | ○ |
| High Peak Defrost Time Change | ○ | ○ | ○ | ○ | ○ |
| High Peak Lowest Target Temperature Setting |  | ○ | ○ | ○ | ○ |
| Before High Peak Accumulating Cold Starting |  | ○ | ○ | ○ | ○ |
| High Peak Damper Linkage |  |  | ○ | ○ | ○ |
| High Peak Home Bar Heater Control |  |  | ○ | ○ | ○ |
| Low Peak Temperature Control Reference Change |  |  |  | ○ | ○ |
| Low Peak Target Temperature + 2° C. |  |  |  | ○ | ○ |
| Medium Peak Lowest Target Temperature Setting |  |  |  |  | ○ |

As shown in [Table 1], a plurality of power saving modes include the first to fifth power saving modes.

If the electric product 100 is a refrigerator, factors for controlling an operation of the refrigerator on the basis of energy information or additional information may include 1) control to increase a target temperature of a storage by 2° C.

2) control (change) a defrost time of an evaporator into a off-peak (low-peak) time interval 3) control a freeze room to the lowest target temperature (−16° C.)

4) store cool air before an on-peak time arrives 5) cool a cold room by opening a damper and drive a compressor simultaneously 6) reduce an operation of a heater in a home bar of a refrigerator 7) increase a temperature range of a control reference to maintain a target temperature of a storage.

The plurality of power saving modes may include at least one of the above seven factors.

As described above, although an interval is divided into a high cost information interval and a low cost information interval in relation to energy charges, according to the size (intensity) of information related to the energy charges, the high and low cost information intervals may be re-divided into a high peak time interval, a medium peak time interval, and a low peak time interval. As one example, the high peak time interval is understood as an interval where electricity charges are most expensive. Accordingly, it is an important control target to reduce electricity charges and an amount of power consumed at the high peak time interval.

Meanwhile, the high peak time interval and the medium peak time interval may be high cost information intervals and the low peak time interval may be a low cost information interval. On the contrary, the high peak time interval may be a high cost information interval and the medium peak time intervals and the low peak time interval may be a low cost information interval. Unlike this, a part of the high peak time interval and the medium peak time interval may be a high cost information interval and a part of the medium peak time interval and the low peak time interval may be a low cost information interval.

As shown in [Table], all power saving modes include a common control method including: 1) adjusting a target temperature by +2° C. in the high peak interval and 2) moving defrost time to the low peak interval. That is, among the plurality of power saving modes, at least more than two power saving modes have a common control method.

The first power saving mode performs the 1) and 2) control methods. In addition to the first power saving mode, the second power saving mode further perform the 3) and 4) control methods. The third to fifth power saving modes perform more control methods than the above.

Meanwhile, the fifth power saving mode performs the above seven control methods. That is, among the plurality of power saving modes, the fifth power saving mode performs the largest number of control methods to reduce electricity charges or an amount of power consumed. As a result, the fifth power saving mode may be understood as the most effective method of reducing electricity charges or an amount of power consumed. As one example, the fifth power saving mode and the first saving mode are understood as a "power saving high mode" and a "power saving low mode", respectively. This is a concept that meets the above-described power saving level (power saving intensity).

In brief, a power saving mode for driving an electric product may be provided in plurality and the plurality of power saving modes may vary with different administrations in an entire or part of courses in relation to functions of an electric product. Moreover, the plurality of power saving modes may be divided into stages with different levels in terms of reduction of electricity charges or reduction of an amount of power consumed.

The plurality of power saving modes may be selected and configured by a user. As one example, if an electric product is a washing machine, a course available in a power saving mode may be in plurality. A user may select the first course from a plurality of courses and may add one more rinse cycle after washing the laundry. Moreover, a driving time may be set with one hour, a temperature of washing water may be set with a first temperature value, and RPM of a driving motor may be set with a first RPM.

That is, a user may configure a power saving mode by inputting time or information other than the time. Here, the information other than the time may include a driving method or a setting available target temperature. One power saving mode may be configured with a combination of a first course, one additional rinse cycle, one hour, and a first RPM. This power saving mode may vary according to a target to be controlled or values. A power saving manual mode, i.e., a control method relates to an idea that a user manually selects a power saving mode, will be described quoting from the description of FIGS. 16 and 17.

Additionally, the plurality of power saving modes may be automatically set as an optimal power saving mode on the basis of energy information or additional information. The plurality of automatic setting available modes may be stored in a table in advance, in correspondence to the energy information or additional information. A power saving auto mode, i.e., a control method related to an ideal that an optimal driving mode is automatically set, will be described, quoting from the description of FIGS. 19 and 20.

Another embodiment is suggested.

The power saving manual mode and the power saving auto mode may be changed into each other. Once power is applied to an electric product, one of the power saving manual mode and the power saving auto mode is selected. Selecting one mode is completed through an input of a specific input unit.

The specific input unit may be an existing input unit for performing a specific function of an electric product or an additional input unit for selecting a mode. If the specific input unit is an existing input unit, the number of pressing for mode change (e.g., pressing three times) or pressing time (e.g., pressing for 3 sec) may be set in advance.

Moreover, the power saving manual mode or the power saving auto mode may be set in advance in an electric product. That is, once power is applied to an electric product, one of the two power saving modes may be already set. Of course, the previously set one mode may be changed into another mode.

Figure 22:
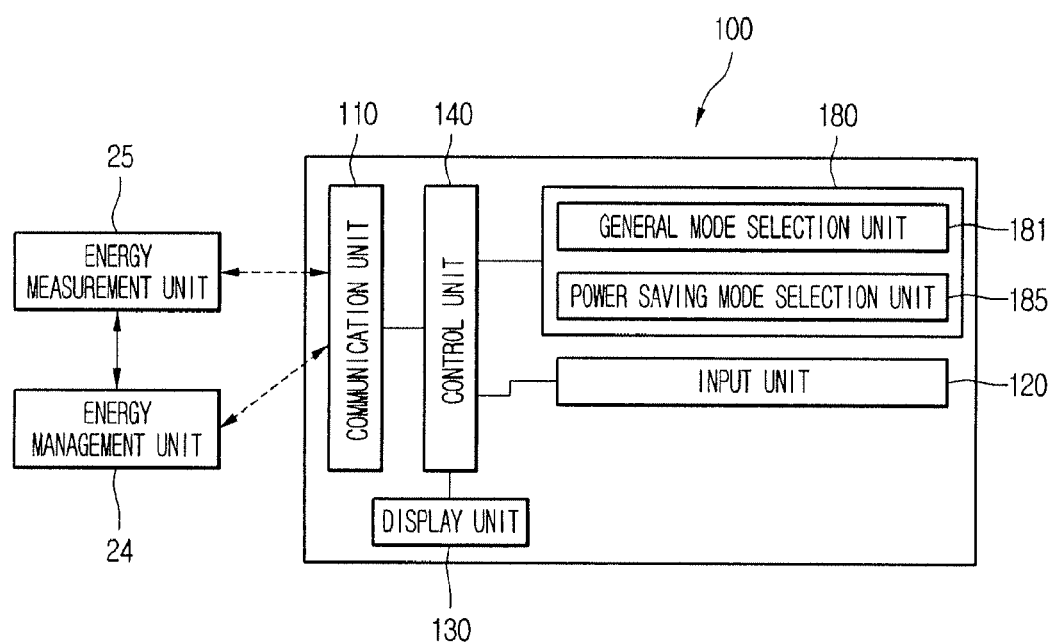
FIG. 22 is a block diagram illustrating a configuration of an electric product according to a sixth embodiment.

FIG. 22 is a block diagram illustrating a configuration of an electric product according to a sixth embodiment. Referring to FIG. 22, the electric product 100 as an "energy consumption unit" according to the sixth embodiment includes a communication unit 110, an input unit 120 for inputting a predetermined command, a display unit 130 for displaying the driving information of the electric product 100 or information recognized from the communication unit 110, and a control unit 140 for controlling configurations thereof.

The electric product 100 includes a mode selection unit 180 for selecting an operating mode of the electric product 100. The mode selection unit 180 may include a general mode selection unit 181 for operating the electric product 100 on the basis of information entered by a user, not on energy information or additional information, and a power saving mode selection unit 185 for reducing electricity charges or an amount of power consumed on the basis of the energy information or additional information. A user may determine an operating mode of the electric product 100 by selecting the general mode selection unit 181 or the power saving mode selection unit 185.

There are a plurality of power saving modes. The plurality of power saving modes include at least two power saving modes, which may be divided according to operating time, electricity charges, or a course (an operating way). Moreover, description of the input unit 120 will quote from that of FIG. 14 according to the first embodiment.

Figure 23:
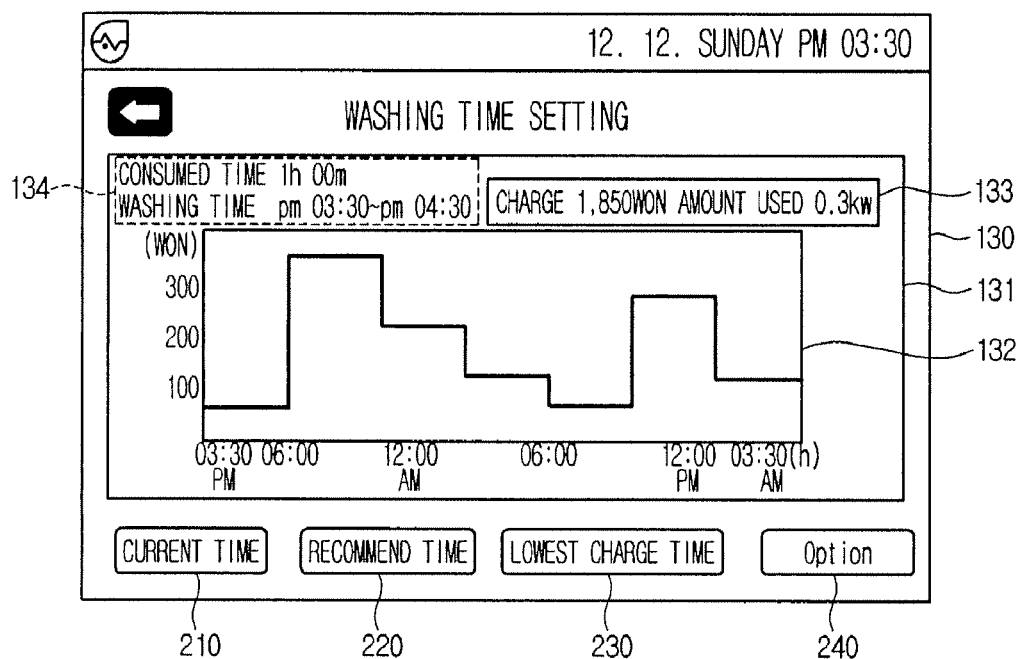
FIG. 23 is a view illustrating a configuration of a display unit according to a sixth embodiment.

FIG. 23 is a view illustrating a configuration of a display unit according to a sixth embodiment. FIG. 24 is a view illustrating a display unit of a course power saving mode according to a sixth embodiment. FIG. 25 is a view illustrating a display unit of a cost saving mode according to a seventh embodiment.

Referring to FIG. 23, once an operating time or an operating time interval of the electric product 100 is selected, a screen related to an operating time setting of the electric product 100 is displayed on the display unit 130. In the drawing, a washing machine is exemplarily shown but the scope of the present invention is not limited thereto, i.e. it is applicable to other electric products besides the washing machine.

The display unit 130 includes a setting screen 131 where information related to an operating time, an amount of power usage, or electricity charges of the electric product 100 is displayed. The setting screen 131 may include at least one of power charge information 132, power information 133 related to an operation, and time information 134 related to an operation.

The time information 134 related to an operation of the electric product 100 may include at least one of course running time information, laundry start time information, and laundry end time information. Power information 133 related to the operation may include at least one of power usage charge information and power usage amount information, when a corresponding course is performed.

The power charge information 132 may include graph information related to power charges. The graph information related to the power charges may be hourly charge graph information. The x-axis of the graph information is time and the y-axis is charge. Moreover, in the x-axis, the initial time (i.e., the reference time) is current time and the last time is a time after 24 hours from the current time. That is, a time range of the graph information is 24 hours. The graph information may include power charge information for 24 hours. The time range may be set manually or automatically and the time range has no limit.

The display unit 130 may include a first time power saving mode selection unit 210 for setting an operating time with current time and at least one time power saving mode selection unit 220 or 230 for setting an operating time with a recommend time. The at least one time power saving mode 220 or 230 includes a second time power saving mode selection mode 220 for selecting a recommended time interval and a third time power saving mode selection unit 230 for selecting the lowest charge time. The second time power saving mode and the third time power saving mode are altogether called a "recommend time power saving mode"

Once the first time power saving selection unit 210 is selected, the electric product 10 starts at current time. For example, after confirming the power charge information screen 132, the first time power saving mode selection unit 210 may be selected if a user wants to finish an operation of the electric product 10 as soon as possible.

Once the second time power saving mode selection unit 220 is selected, the power charge information screen 132 during a predetermined time interval (e.g., a first setting time interval) may be displayed. That is, the power charge information based on 24 hours is displayed in FIG. 23 but if the predetermined time interval is 6 hours, the time interval of the x-axis may be displayed in a range from current time to 6 hours later. Then, an interval of the lowest electricity charge within 6 hours may be recommended. A user confirms the displayed power charge information and then selects the recommend time interval as an operating time of the electronic product 100. Of course, a user may not select the recommended time interval. The second time power saving mode may prevent a user from delaying an operation of an electric product too long, in order to pay low electricity charges.

Once the third time power saving mode selection unit 230 is selected, the power charge information screen 132 during a predetermined time interval (e.g., a second setting time interval) may be displayed. The second setting time interval may be greater than the first setting time interval, for example, 18 hours or 24 hours. Of course, the second setting time interval may be set with another time interval in advance. Moreover, the lowest charge interval among the second setting time interval may be recommended as an operating time. At this point, the interval may be recommended on the basis of a driving time of a course that a user wants.

The display unit 130 includes an option selection unit 240. A user may select a first setting time interval or a second setting time interval through the option selection unit 240. That is, the first and second setting time intervals may be freely selected according to a user's preference. When a user inputs an arbitrary first or second setting time interval, the power charge information screen 132 corresponding to the inputted time interval may be displayed.

Referring to FIG. 24, once the course selection unit 122 is selected, a screen related to an operating course setting of the electric product 100 is displayed on the display unit 130.

In more detail, as shown in FIG. 24, the display unit 130 displays a plurality of course power saving modes related to a course (i.e., an operating mode) of the electric product 100. A course determination factor may be displayed for each course power saving mode. The course determination factor may include the washing power of the laundry, a water temperature of the laundry, and the number of rinsing. Then, the course determination factor may be provided with a plurality of levels. The washing power of the laundry may be divided into strong, medium, and weak. The water temperature of the laundry may be divided into 25° C. corresponding to cold water and 40° C. corresponding to hot water. The number of rinsing may be two times, three times, and four times.

A plurality of course power saving modes are provided with respectively different ranges.

As one example, a first course power saving mode is a power saving mode with strong washing power, 25° C. washing water, and three times of rinsing. A second course power saving mode is a power saving mode with medium washing power, 40° C. washing water, and two times of rinsing. A third course power saving mode and a fourth course power saving mode may be provided as shown in FIG. 24. A user selects one of the plurality of course power saving modes and determines it as an operating method of the electric product 100.

The display unit 130 includes an option selection unit 250. Specific values related to washing power, washing water temperature, or the numbers of rinsing may be freely selected through the option selection unit 250. In this case, course information may be displayed on the display unit 130 according to a set specific value.

Referring to FIG. 25, once the charge setting unit 126 is selected, a screen related to a course setting of the electric product 100 is displayed on the display unit 130.

In more detail, as shown in FIG. 25, a plurality of charge power saving modes related to electricity charges according to the driving of the electric product 100 may be displayed on the display unit 130. The plurality of charge power saving modes include a plurality of power saving modes with respectively different reference charges. Here, the reference charge may be understood as an allowable marginal charge at which the electric product 100 operates.

As one example, a course selected for an operation of the electric product 100 may be a basic course. The first charge power saving mode may be understood that a reference charge is 1,000 won and once an electric product operates, it has an operating time interval of 10:00 to 11:00 based on current time (08:00).

Also, the second charge power saving mode may be understood that a reference charge is 1,200 won and once an electric product operates, it has an operating time interval of 9:45 to 10:45 based on current time (08:00). The third and fourth charge power saving modes may have reference charge information and operating time information as shown in FIG. 25.

The display unit 130 includes an option selection unit 260. A reference charge value may be differently set through the option selection unit 260. Accordingly, a user may arbitrarily select an allowable electricity charge value while the electric product 100 operates. If a user inputs a different charge value than a reference charge shown in FIG. 25, the display unit 130 may display operating time information corresponding to the charge value.

A user may select one of the above charge power saving modes to determine an operating method of the electric product 100. Thus, a power saving mode to save electricity charge includes a plurality of power saving modes related to time, a course, or charge. In each power saving mode, a plurality of power saving modes having respectively different information may be provided according to a time interval, a course combination, or a reference charge value. Through these configurations, a user may have more power saving choices for driving the electric product 100 according to user's preferences.

Another embodiment is suggested.

In the above embodiments, a plurality of power saving modes related to time, a course (i.e., an operating method), or charge are provided. Unlike this, a power saving mode for each of the components (e.g., a driving motor, a display unit, or a heater) constituting the electric product 100 may be provided.

For example, a plurality of power saving methods or modes for limiting the driving of a high power consuming component and allowing other low power consuming components may be suggested. There may be a plurality of combinations of power saving modes according to the on/off driving of the component or output limit. The plurality of combinations may set a plurality of power saving methods and power saving modes.

Another embodiment is suggested.

Among the plurality of power saving modes related to time, a course, or charge, at least two power saving modes may be selected simultaneously. As one example, a first time power saving mode in time power saving modes and a second course power saving mode in course power saving modes may be simultaneously selected and a second time power saving mode and a third charge power saving mode may be simultaneously selected. Of course, one time power saving mode, one course power saving mode, and one charge power saving mode may be simultaneously selected.

Figure 26:
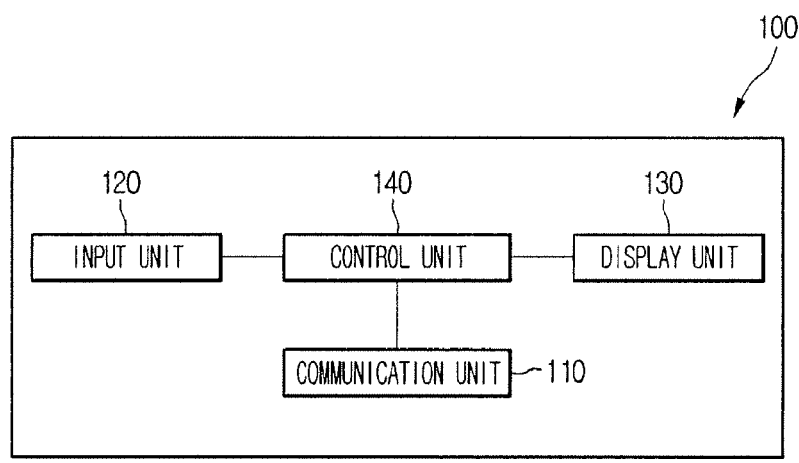
FIG. 26 is a block diagram illustrating a configuration of an electric product according to an eighth embodiment.

FIG. 26 is a block diagram illustrating a configuration of an electric product according to an eighth embodiment. Hereinafter, as one sample of the electric product, a refrigerator will be described as an energy consumption unit. It is apparent that description of the refrigerator is applicable to another energy consumption unit. Moreover, description of the energy consumption unit may be applied to other components.

Referring to FIG. 26, the electric product 100 for a network system according to an embodiment includes a communication unit 110 for communicating with other components constituting a network system.

The electric product 100 may include an input unit 120 for inputting a predetermined command, a display unit 130 for displaying driving information of the electric product 100 or information recognized from the communication unit 110, and a control unit 140 for controlling configurations thereof.

If the display unit 130 includes a touch screen for inputting a command through touching, an entire or part of the input unit 120 may be included in the display unit 130. That is, the entire or part of the input unit 120 may be realized in the display unit 130.

The electric product 100 may be set to perform a power saving function or a general function. The power saving function is to more reduce an amount of energy consumed or energy charge than the general function. The power saving function may be performed on the basis of energy information or user's setting. As one example, the power saving or general function may be selected and changed through the input unit 120 or the display unit 130.

As another example, according to whether the electric product 100 communicates with other components, one of the power saving function and the general function may be automatically set. Or, while one of the power saving function and the general function is automatically set, it may be changed into the other one automatically or through a function switch button.

A mode for performing the power saving function is called the power saving mode and a mode for performing the general function is called the general mode. Also, in this embodiment, the power saving mode may include a plurality of modes.

Figure 27:
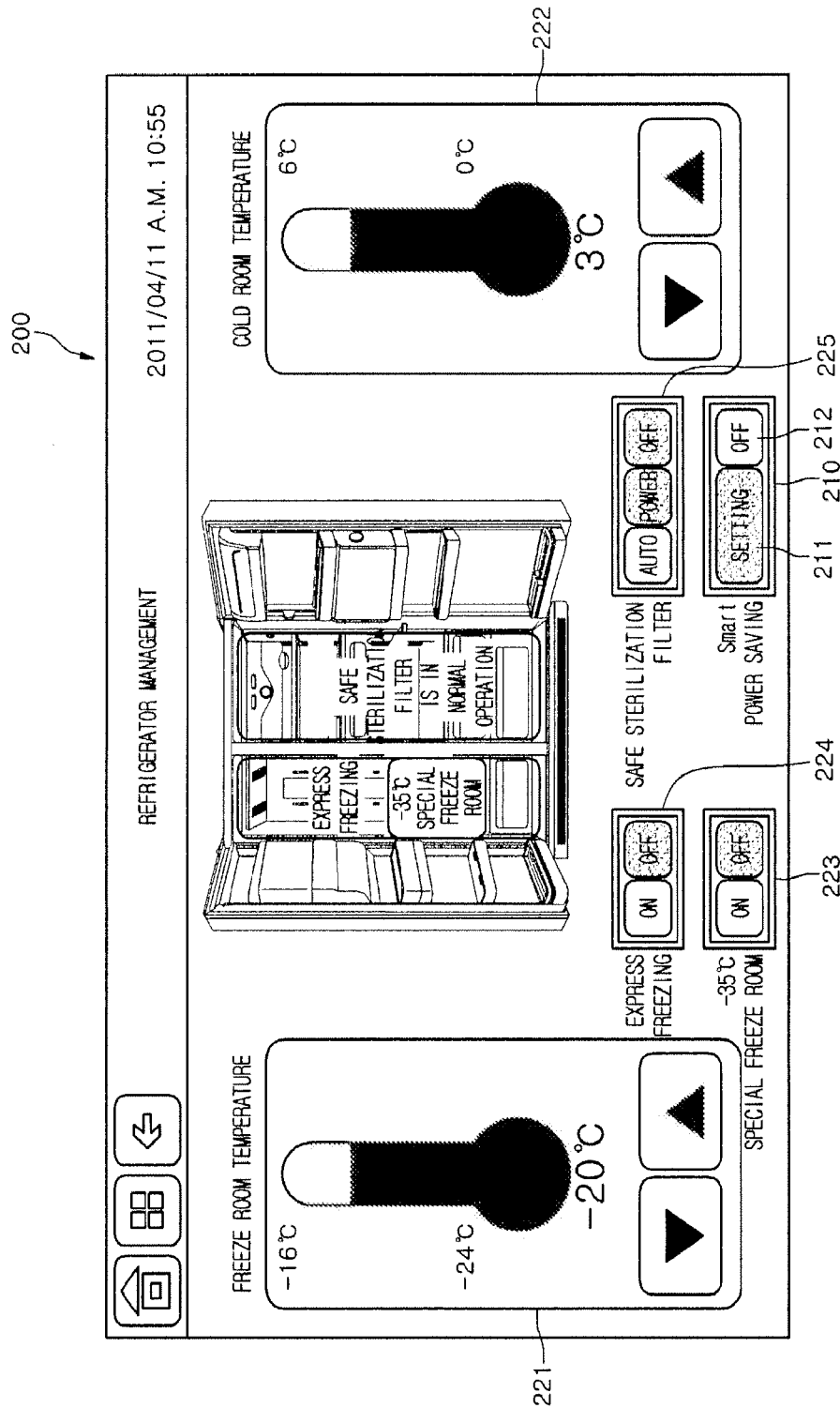
FIG. 27 is a view illustrating one example of a display unit in an electric product according to an eighth embodiment.

FIG. 27 is a view illustrating one example of a display unit in an electric product according to an eighth embodiment. Referring to FIG. 27, a screen is displayed on a display unit of a refrigerator exemplarily.

Referring to FIG. 27, the display unit 130 may display a management screen 200 for managing a component (i.e., management of a refrigerator). The management screen 200 may be a main screen, which is a screen displayed first when power of the refrigerator is on, a screen switched from the main screen, or a pop-up screen displayed when a command is inputted to display the management screen.

The management screen 200 may display at least freeze room temperature information and cold room temperature information. Additionally, the management screen 200 includes a freeze room temperature change unit 221 for changing a temperature of the freeze room, a cold room temperature change unit 222 for changing a temperature of the cold room, and a function selection unit 210 for selecting one of a power saving function and a general function. Additionally, the management screen 200 may further include at least one of a selection unit 223 for selecting an operation of express freezing, a selection unit 224 for selecting an operation of a special freeze room, and a selection unit 225 for selecting an operation of a filter.

The function selection unit 210 may include a power saving function selection unit 211 for selecting a power saving function and a power saving release unit 212 (or a general function selection unit) for releasing a power saving function (or selecting a general function). That is, once the power saving function selection unit 211 is selected, a power saving function is turned on and once the power saving function release unit 212 is selected, the power saving function is turned off and a general function is turned on. At this point, in order to easily distinguish the power saving function selection unit 211 from the power saving function release unit 212, one of their colors, brightness, sizes may be different from each other. That is, the power saving function selection unit 212 and the power saving function selection unit 212 may have different display states.

Figure 28:
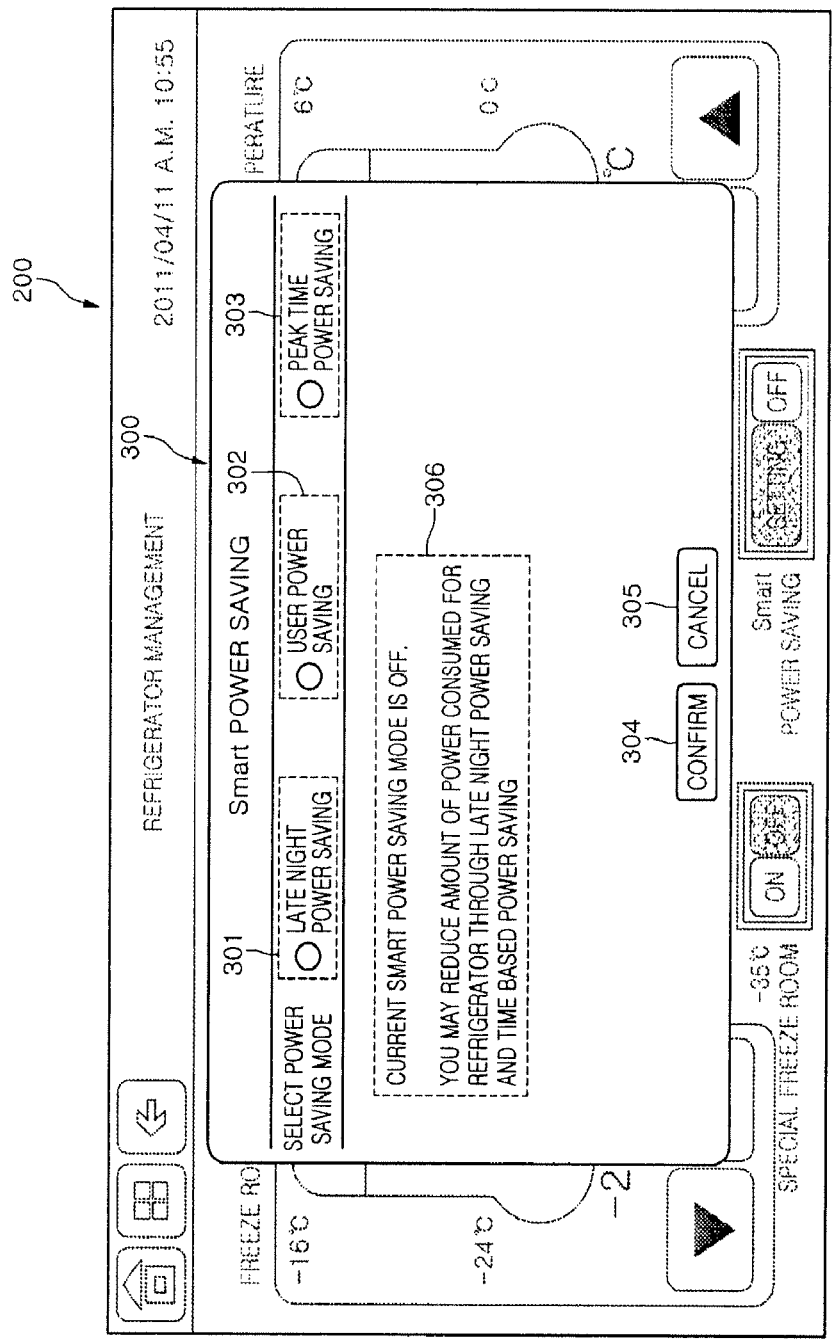
FIG. 28 is a view illustrating one example of a mode selection screen according to an eighth embodiment.

FIG. 28 is a view illustrating one example of a mode selection screen according to an eighth embodiment.

Referring to FIG. 28, once the power saving selection unit 211 is selected from the screen of FIG. 27, the display unit 130 displays a mode selection screen 300 for selecting a specific mode related to a power saving function. The mode selection screen 300 may be a pop-up screen or a screen switched from the management screen 200. Or, the management screen 200 and the mode selection screen 300 may be simultaneously displayed on a single screen.

A plurality of mode selection units 301, 302, and 303 may be simultaneously displayed on the mode selection screen 300. Additionally, description information 306 for guiding mode selection may be displayed on the mode selection screen 300. The description information 306 may include information about whether to select a power saving function and guide information for mode selection.

In order to select a desired mode, one of the plurality of mode selection units 301, 302, and 303 may be selected. The plurality of mode selection units 301, 302, and 303 may be divided according to setting reference of a power saving time interval or change availability of a power saving time interval. The plurality of mode selection units 301, 302, and 303 may include at least two modes of a first selection unit (i.e., a late night power saving selection unit) 301 for selecting a late night interval, a second selection unit (i.e., a user power saving selection unit) 302 for selecting a time interval that a user wants, and a third selection unit (i.e., a smart power saving unit) 303 for selecting a high cost interval on the basis of energy information.

A mode selected by the first selection unit 301 may be called a late night power saving mode. A mode selected by the second selection unit 302 may be called a user power saving mode. A mode selected by the third selection unit 303 may be called a smart power saving mode (or a peak time power saving mode). In this embodiment, one of the three modes is exemplarily selected and described.

In this embodiment, if the first selection unit 301 and the third selection unit 303 are selected, a power saving time interval may be automatically set. If the second selection unit 302 is selected, a user may set a power saving time interval. Accordingly, the late night power saving mode and the smart power saving mode (or a peak time power saving mode) may be called an auto setting mode. The user power saving mode may be called a manual setting mode. Also, if one of the modes is selected, a component operates with power saving at a power saving interval corresponding to a corresponding mode. In this embodiment, a plurality of modes may include both a manual setting mode and an auto setting mode, only a plurality of manual setting modes, or only a plurality of auto setting modes.

Figure 29:
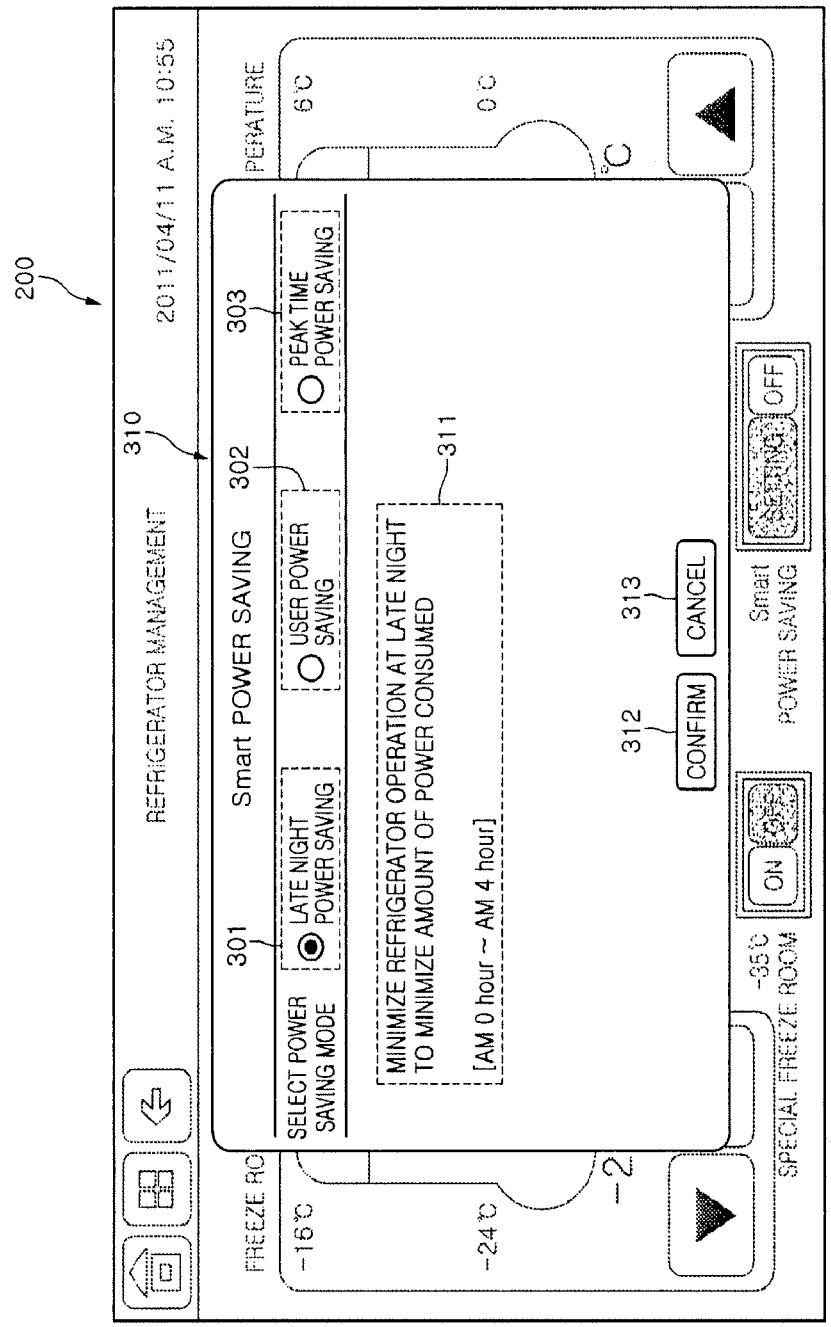
FIG. 29 is a screen displayed on a display unit when the first selection unit is selected from the screen of FIG. 28.

FIG. 29 is a screen displayed on a display unit when the first selection unit is selected from the screen of FIG. 28.

Referring to FIGS. 29 and 29, once the first selection unit 301 is selected from the mode selection screen 300 of FIG. 28, a late night power saving screen 310 for selecting a late night power saving mode is displayed. The late night power saving screen 310 may be a screen switched from the mode selection screen 300 or a screen where a part of the contents of the mode selection screen 300 is modified.

Once the late night power saving screen 310 is displayed, information for notifying that the first selection unit 301 is selected may be displayed on the first selection unit 301. Or, a display state of the first selection unit may be different from that of the third selection unit.

Or, description information 311 related to the late night power saving mode may be displayed on the late night power saving screen 310. Additionally, selection units 312 and 313 for finally selecting the late night power saving mode or cancelling the late night power saving mode may be displayed on the late night power saving screen 310. If selection of the late night power saving mode is cancelled, another mode may be selected. Or, if another mode is selected from the late night power saving screen 310, the late night power saving mode is changed into another mode.

A power saving time interval corresponding to the late night power saving mode may be set in advance. The predetermined power saving time interval may be stored in a memory. As one example, a 4 hour interval from 12:00 a.m. to 04:00 a.m. may be set. A power saving time interval corresponding to the late night power saving mode may be fixed or vary.

If the power saving time interval is changeable, a time selection unit for selecting a power saving time interval may be further displayed on the late night power saving screen 310. Even if the power saving time interval is changed, a settable power saving time interval may be limited. That is, the limited start time and the limited end time constituting a power saving time interval in the late night power saving mode are set and a user may change the power saving time interval in a range of the limited start time and the limited end time. As one example, the limited start time may be set with 12:00 p.m. and the limited end time may be set with 06:00 a.m. A user may select a power saving time interval in a range of the limited start time and the limited end time.

Figure 30:
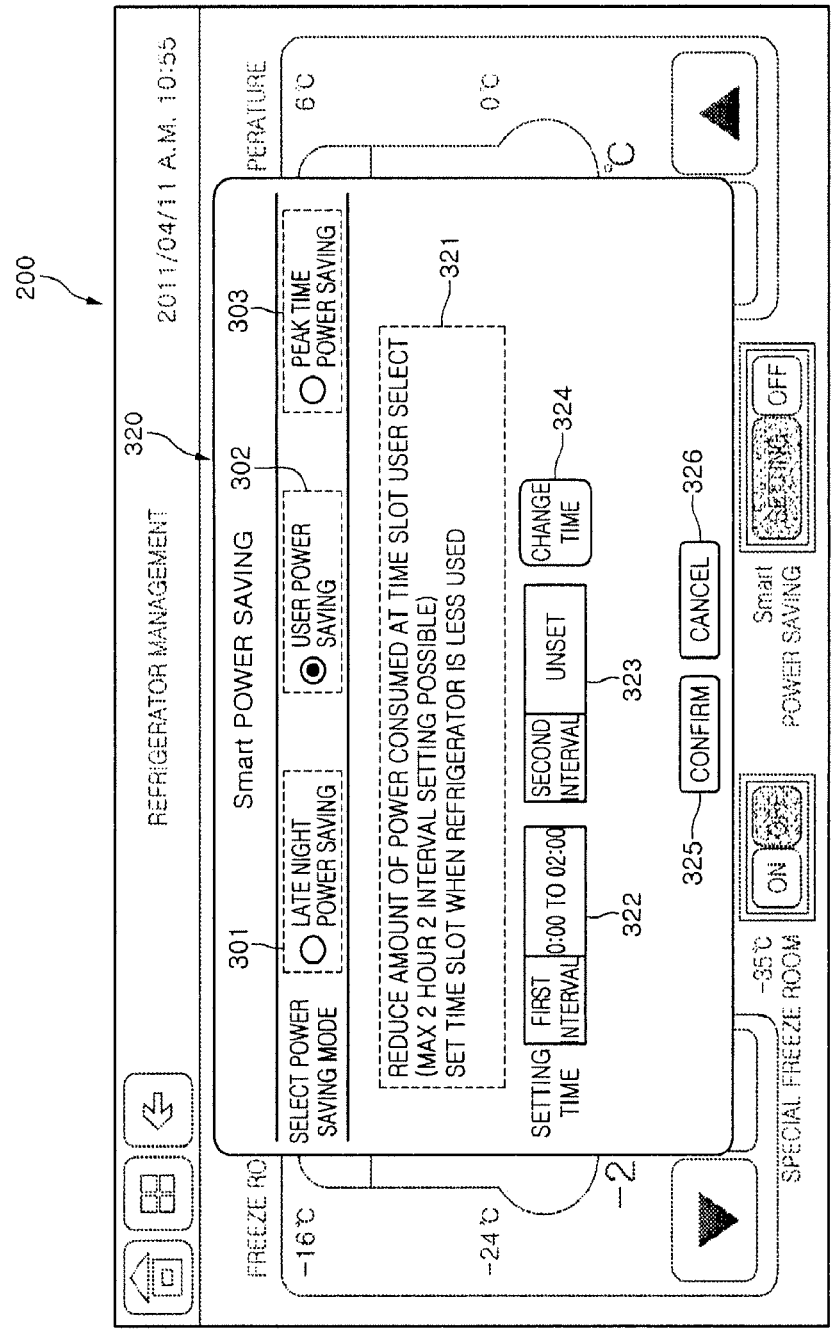
FIG. 30 is a screen displayed on a display unit when a second selection unit is selected from the screen of FIG. 28.

FIG. 30 is a screen displayed on a display unit when a second selection unit is selected from the screen of FIG. 28.

Referring to FIGS. 28 and 30, once the second selection unit 302 is selected from the mode selection screen 300 of FIG. 28, a user power saving screen 320 is displayed. The user power saving screen 320 may be a screen switched from the mode selection screen 300 or a screen where a part of the contents of the mode selection screen 300 is modified.

Once the user power saving screen 320 is displayed, information for notifying that the second selection unit 302 is selected may be displayed on the second selection unit 302. Or, a display state of the second selection unit may be different from those of the first selection unit and the third selection unit.

Additionally, interval information 322 and 323 displaying at least one power saving time interval information may be displayed on the user power saving screen 320. In FIG. 30, as one example, two interval informations are divided and displayed. The number of power saving time intervals that a user sets is not limited. The interval information 322 and 323 may include unset information of the power saving time interval or previously set time information. The time information includes start time information and end time information.

Additionally, a time change selection unit 324 for setting and changing a power saving interval may be displayed on the user power saving screen 320. As another example, once the interval information 322 and 323 is selected, a time setting unit for setting a power saving time interval may be displayed.

Additionally, description information 321 related to a user power saving mode may be displayed on the user power saving screen 320. Additionally, selection units 325 and 326 for finally selecting a user power saving mode or cancelling (or releasing) the selection of a user power saving mode may be displayed on the user power saving screen 320.

Figure 31:
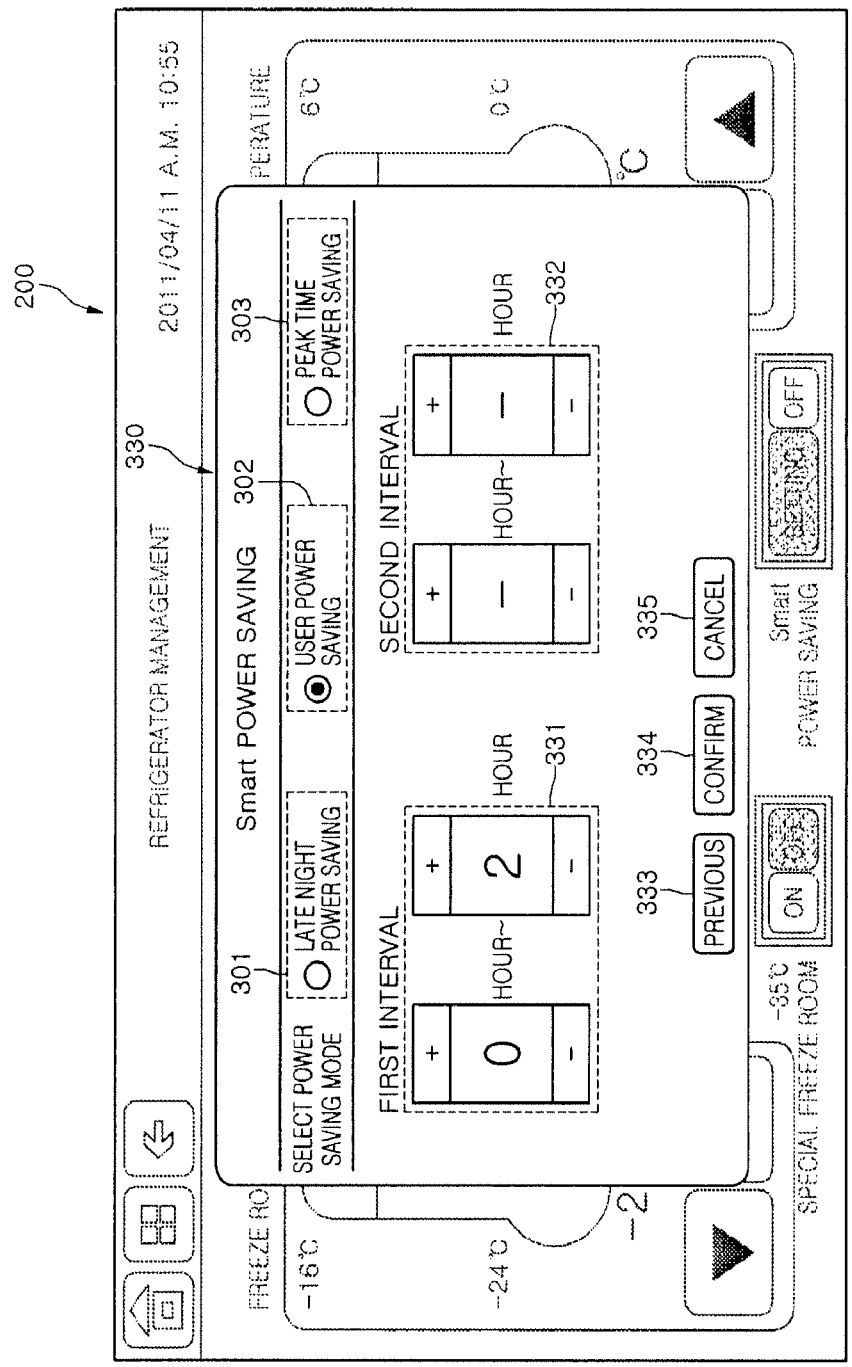
FIG. 31 is a view illustrating a time change screen for setting a power saving time interval according to an eighth embodiment.

FIG. 31 is a view illustrating a time change screen for setting a power saving time interval according to an eighth embodiment.

Referring to FIGS. 30 and 31, once the time change selection unit 324 is selected in FIG. 30, a time change screen (or a time setting screen) 330 is displayed. At least one time change unit (or a time setting unit) 331 and 332 may be displayed on the time change screen 330. At least one of start time and end time may be set through the time change units 331 and 332.

At this point, the length of a power saving time interval may be set in advance in the user setting mode. In this case, when a user selects a start time, an end time may be automatically set on the basis of the predetermined interval length. Or, when a user select an end time, a start time may be automatically set on the basis of the predetermined interval length. For example, if the predetermined interval length is 2 hours, when a user selects a start time as 12:00 a.m., an end time may be automatically set as 02:00 a.m. As another example, if there is no restriction on the length of a power saving time interval, a user may arbitrarily set a start time and an end time.

A previous selection unit 333 for returning to a previous screen and selection units 334 and 335 for finally selecting a changed time or cancelling (or releasing) the changed time may be displayed on the time change screen 330.

Figure 32:
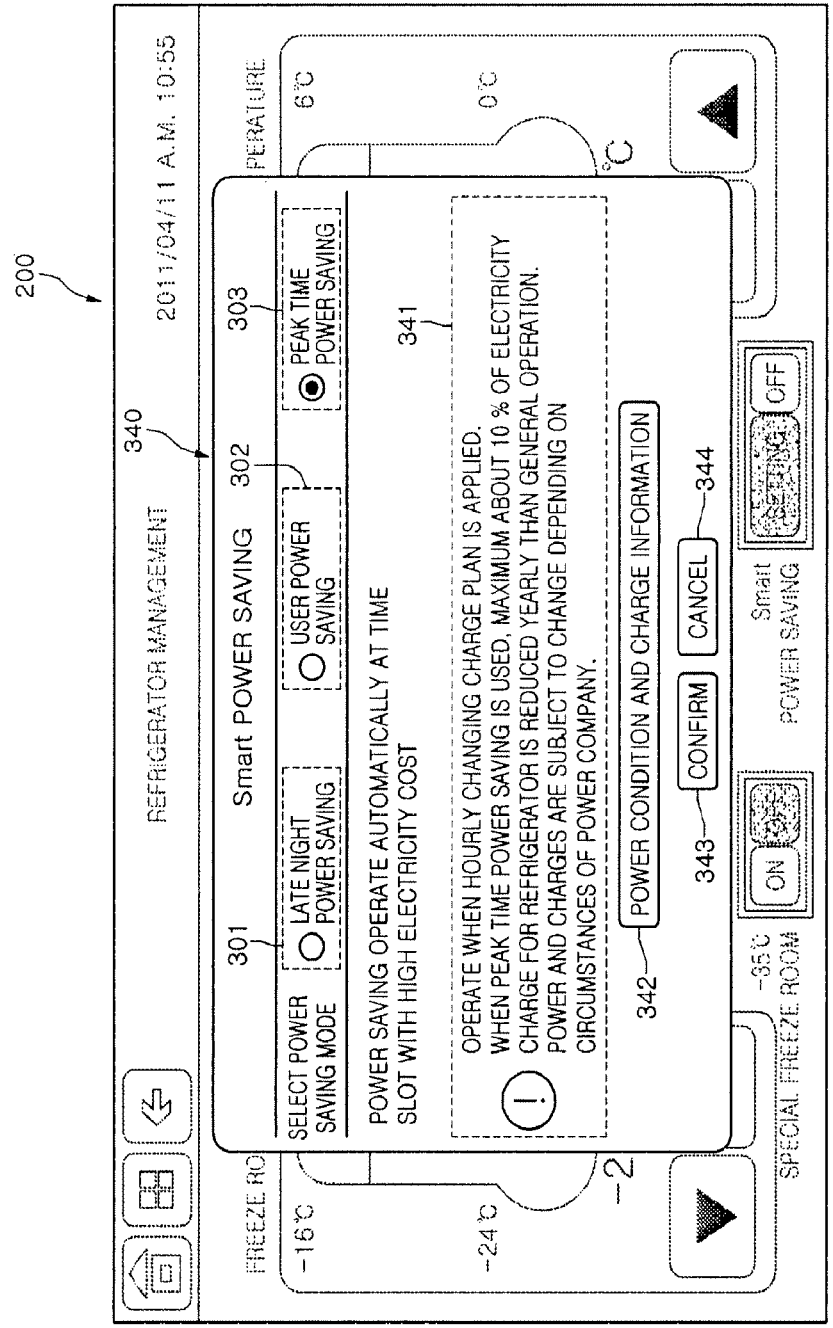
FIG. 32 is a screen displayed on a display unit when a third selection unit is selected from the screen of FIG. 28.

FIG. 32 is a screen displayed on a display unit when a third selection unit is selected from the screen of FIG. 28.

Referring to FIGS. 28 and 32, once the third selection unit 303 is selected from the mode selection screen 300 of FIG. 28, a peak time power saving screen 340 is displayed. The peak time power saving screen 340 may be a screen switched from the mode selection screen 300 or a screen where a part of the contents of the mode selection screen 300 is modified.

Once the peak time power saving screen 340 is displayed, information for notifying that the third selection unit 303 is selected may be displayed on the third selection unit 303. Or, a display state of the third selection unit may be different from those of the first and second selection units.

Additionally, a charge information confirmation selection unit 342 for confirming power charge information may be displayed on the peak time power saving screen 340. Additionally, description information 341 related to the peak time power saving mode may be displayed on the peak time power saving screen 340. Additionally, selection units 343 and 344 for finally selecting a peak time power saving mode or cancelling (or releasing) a peak time power saving mode may be displayed on the peak time power saving screen 340. If the selection of the peak time power saving mode is cancelled, another mode may be selected. Or, if another mode selection unit is selected from the peak time power saving screen 320, another mode may be selected.

Figure 33:
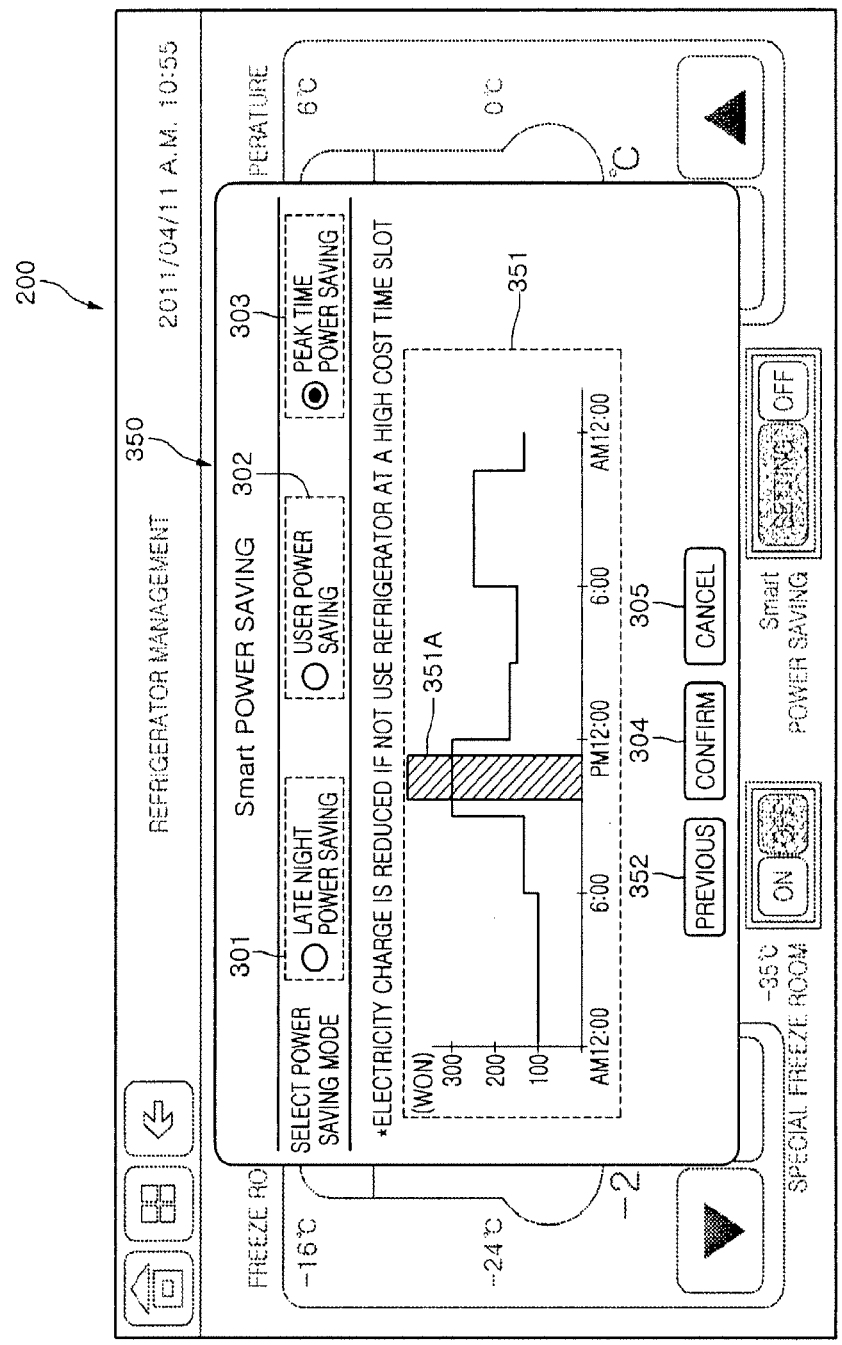
FIG. 33 is a charge information screen displayed when a charge information confirmation selection unit is selected from the screen of FIG. 32.

FIG. 33 is a charge information screen displayed when a charge information confirmation selection unit is selected from the screen of FIG. 32.

Referring to FIGS. 32 and 33, once a charge information confirmation selection unit 324 is selected from the peak time power saving screen 340, a charge information screen 350 is displayed. Graph information 351 related to power charge may be displayed on the charge information screen 350. In the graph information, the x-axis is time and the y-axis is power charge. A time range displayed in the graph information 351 may be 24 hours but there is no limit in the time range. A time based charge graph may be displayed with a plurality of levels. Moreover, each level may have respectively different colors. Also, the graph information 351 may include a current time display unit 351A to display current time. Accordingly, a user may confirm a power change of the current time.

The charge information in the graph information 351 may be information from the utility network or an external server. The charge information may be received from the external server and the utility network.

A previous selection unit 352 for returning to a previous screen (e.g., the screen of FIG. 31) and selection units 353 and 354 for finally selecting a peak time power saving mode or cancelling (or releasing) a peak time power saving mode may be displayed on the peak time power saving screen 340. In FIG. 33, if the peak time power saving mode is selected from the peak time power saving screen 340 in FIG. 33, since the current time is a peak time (i.e., a high cost interval), the driving with power saving is performed at the current time.

Figure 34:
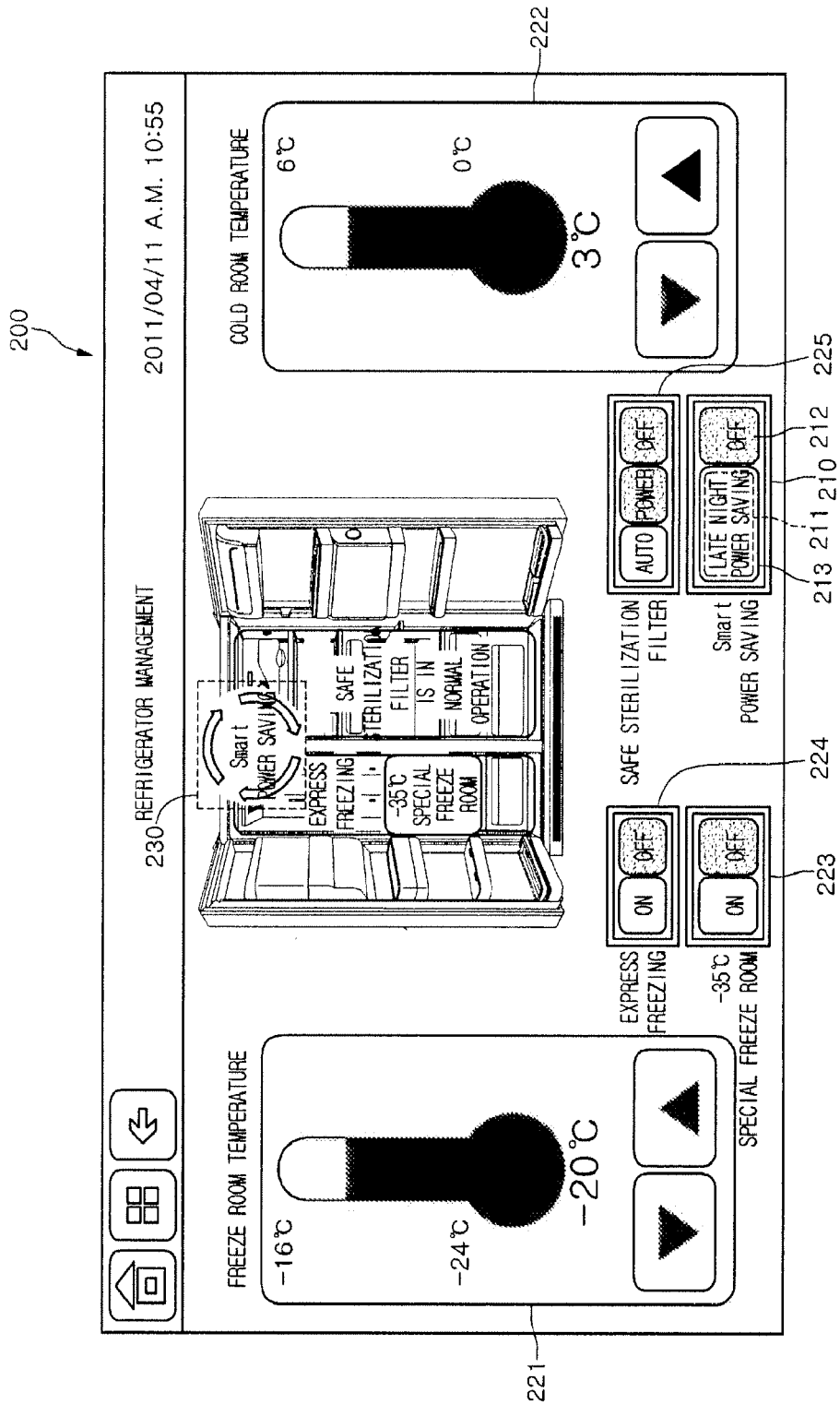
FIG. 34 is a management screen displayed when a specific mode is selected from the mode selection screen.

FIG. 34 is a management screen displayed when a specific mode is selected from the mode selection screen.

Referring to FIG. 34, when a specific mode is selected from the plurality of modes, a management screen 200 is displayed. Notify information 213 for notifying that a power saving mode is selected is displayed on the management screen 200. The notify information 213 may be displayed on the power saving function selection unit 211. The notify information 213 includes type information of the selected power saving mode. Additionally, icon information 230 for notifying that a power saving mode is selected may be displayed on the management screen 200.

Figure 35:
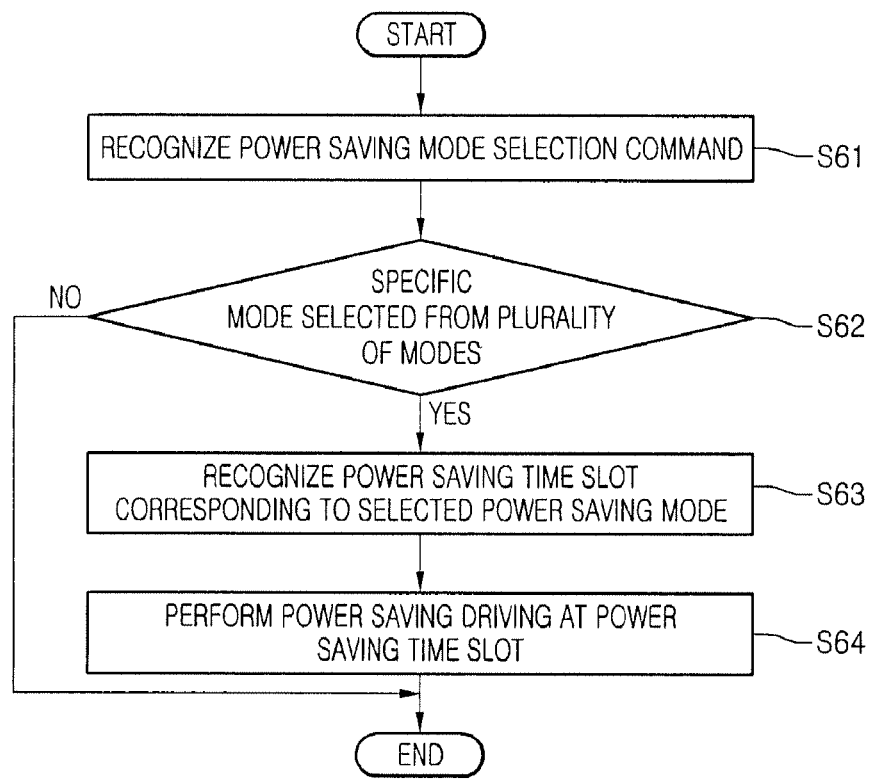
FIG. 35 is a flowchart illustrating a method of controlling a component according to an eighth embodiment.

FIG. 35 is a flowchart illustrating a method of controlling a component according to an eighth embodiment.

Referring to FIG. 35, a component recognizes a power saving mode selection command in operation S61. Once the power saving function selection unit 221 is selected, the power saving mode selection command is recognized. Then, it is determined in operation S62 whether a specific mode is selected from a plurality of modes constituting a power saving mode. That is, it is determined whether one of a late night mode, a user power saving mode, a peak time power saving mode is selected.

Once one of the plurality of modes is selected, a power saving time interval corresponding to the selected power saving mode is recognized in operation S63. At this point, since a power saving time interval corresponding to a late night power saving mode is stored in a memory, it is recognized by receiving power saving time interval information from the memory. Once a user power saving mode is selected, a power saving time interval that a user selects may be recognized. Once a peak time power saving mode is selected, a peak time (i.e., a high cost interval) may be determined and then recognized.

Then, a component operates with power saving at a power saving time interval in operation S64. The driving with power saving may include at least one of the above. As one example, an output of an energy consumption unit in an entire or part of a component may vary. If the component is a refrigerator, a home bar heater may be turned off for a predetermined time at a power saving interval. Or, a target temperature of a cold room or a freeze room may be raised. Or, in a case of a refrigerator, since a temperature of an evaporator is increased when a door of the refrigerator is open, in order to lower a temperature of the evaporator, a load corresponding control to lower a temperature of the evaporator to a predetermined temperature may be performed by controlling a compressor.

In this embodiment, each of a control of a home bar heater, target temperature adjustment, and load corresponding control may be an individual power saving driving method. A component may be driven with power saving at a power saving time interval through at least one power saving driving method. That is, a plurality of power saving methods may be applied during power saving driving. As another example, a power saving driving method may vary according to a plurality of modes.

According to the present invention, since a component is driven with power saving after a user selects a power saving time interval or a power saving time interval is automatically selected, an amount of energy consumed or energy usage charge may be reduced. Additionally, since a user selects one of a plurality of power saving modes, a user can have various choices.

The above-mentioned power saving mode may further include a usage count power saving mode for selecting a time interval when a usage count (e.g., the number of opening a door) is small. In this case, time information when a door is opened is stored in a memory. When a usage count power saving mode is selected, a time interval with no door open or a time interval with less door open may be automatically set as a power saving time interval. At this point, the power saving time interval may vary daily, weekly, monthly, or yearly.

As described above, a power saving time interval may be fixed until the power saving time interval is changed in the late night power saving mode and the user power saving mode. In a peak time power saving mode, a power saving interval may vary according to power charges. Accordingly, the late night power saving mode and the user power saving mode are called as a power saving time fixed mode and the peak time power saving mode may be called as a variable mode. The above mentioned selection unit serves to input a specific command, so that it is understood as a role of an input unit.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to embodiments, since energy source is efficiently produced, used, distributed, and stored, effective energy source management is possible and thus its industrial applicability is extensive.

The invention claimed is:

1. An electric product capable of communicating with an outside device, comprising:
   a communication unit to receive information related to energy from the outside device, the information related to energy includes at least one of time-based pricing, curtailment, grid emergency, grid reliability, energy increment, or operation priority;
   a display part to display a listing of a plurality of power saving modes in a display screen such that one of the plurality of power saving modes is selectable by a user; and
   a control unit to determine whether one of the plurality of power saving modes is selectable by a user and to operate the electric product in a selected mode of the plurality of power saving modes,
   wherein the display part comparably displays in the display screen an estimated driving time of each of the power saving modes and estimated energy cost when the electric product is operated in the selected power saving mode,
   wherein the estimated driving time includes a start time of an operation of the electric product and an end time of the operation of the electric product; and
   wherein when the electric product is operated in the selected power saving mode, a driving method or a driving time of the electric product is determined on the basis of the information related to energy.

2. The electric product according to claim 1, wherein the display part further displays a general mode in the display screen such that one of the plurality of power saving modes and the general mode is selectable by a user,
   wherein when the electric product is operated in the selected general mode, a driving method or a driving time of the electric product is determined not on the basis of the information related to energy.

3. The electric product according to claim 1, further comprising an input unit to select one of a driving course, time, charge, an amount of power consumed, and a power saving level.

4. The electric product according to claim 3, where the control unit recommends a different value than the one of the driving course, the time, the charge, the amount of power consumed, and the power saving level selected through the input unit on the basis of the information related to energy.

5. The electric product according to claim 1, wherein the information related to energy is displayed in a display unit before a start operation is performed after power is applied to the electric product.

6. The electric product according to claim 1, further comprising:
   a start input unit to input a driving start command to the electric product,
   wherein when the start input unit is selected, the control unit determines optimized driving time or driving method information on the basis of the information related to energy.

7. The electric product according to claim 1, wherein the control unit determines the driving of the electric product on the basis of whether a consumable is provided in the electric product.

8. The electric product according to claim 7, wherein if the consumable provided in the electric product is recognized by the control unit, an optimized driving method or driving time is determined by the control unit on the basis of information obtained regarding the consumable.

9. The electric product according to claim 1, wherein the plurality of power saving modes comprise power saving modes with levels corresponding to a degree of reducing electricity charge or an amount of power consumed.

10. The electric product according to claim 1, wherein the plurality of power saving modes comprise at least two power saving modes sharing a driving method, for a power saving driving of the electric product.

11. The electric product according to claim 1, wherein the plurality of power saving modes comprise:
    at least two time saving modes related to a driving time of the electric product;
    at least two course power saving modes related to a driving method of the electric product; and
    at least two charge power saving modes related to a reference charge of the electric product.

12. The electric product according to claim 11, wherein the time power saving mode comprises a recommended time power saving mode setting an operating time of the electric product with a recommended time.

13. The electric product according to claim 12, wherein the recommended time power saving mode comprises:
    one time power saving mode recommending the lowest charge among a first setting time interval; and
    another time power saving mode recommending the lowest charge during a greater second setting time interval than the first setting time interval.

14. The electric product according to claim 11, wherein the course power saving mode is divided into a plurality of course power saving modes on the basis of a reference factor determining the driving method, and
wherein the reference factor is divided into a plurality with a plurality of levels.

15. The electric product according to claim 11, wherein the reference charge is an allowable limit charge for an operation of the electric product; and
wherein the charge power saving mode is divided into a plurality of charge power saving modes according to the allowable limit charge.

16. The electric product according to claim 11, wherein the plurality of power saving modes further comprise a power saving method power saving mode where the power saving method is determined on the basis of ON/OFF or an output limit of one of a plurality of components constituting the electric product.

17. The electric product according to claim 1, wherein the plurality of power saving modes are divided according to a setting method of a power saving time interval, and
wherein one of a start time and an end time in relation to the power saving time interval can be set.

18. The electric product according to claim 17, wherein a length of the power saving time interval is limited, and
when one of the start time and the end time is set, the other one is automatically set on the basis of the length of the power saving time interval.

19. The electric product according to claim 17, wherein the power saving time interval is set as a high cost interval or is set with a time slot in which the number of using the electric product is less.

20. The electric product according to claim 17, wherein the plurality of power saving modes comprise a power saving time fixed mode having a power saving time interval fixed and a power saving time variable mode having a power saving time interval variable.

21. An electric product capable of communicating with an outside device, comprising:
a communication unit to receive information related to energy from the outside device, the information related to energy includes at least one of time-based pricing, curtailment, grid emergency, grid reliability, or operation priority;
a display part to display a listing of a plurality of power saving modes in a display screen such that one of the plurality of power saving modes is selectable by a user; and
a control part to determine whether one of the plurality of power saving modes is selectable by a user and to control the electric product in the selected power saving mode,
wherein a driving method according to one of the plurality of power saving modes is different from a driving method according to another one of the plurality of power saving modes,
wherein the display part displays a plurality of selection parts corresponding to the plurality of power saving modes in the display screen, and
wherein the display part comparably displays an estimated driving time of each of the power saving modes and estimated energy cost when the electric product is operated in the selected power saving mode of the power saving modes,
wherein the estimated driving time includes a start time of an operation of the electric product and an end time of the operation of the electric product.

22. The electric product according to claim 21, wherein the display part displays a limit time period on which an operation of electric product is limited.

23. The electric product according to claim 22, wherein a length of the limit time period is varied.

* * * * *